(12) United States Patent
Goto et al.

(10) Patent No.: US 6,506,143 B1
(45) Date of Patent: Jan. 14, 2003

(54) APPARATUS FOR FINISHING INSIDE DIAMETER OF WORK

(75) Inventors: Kaname Goto, Saitama (JP); Yuzo Abe, Saitama (JP); Koichi Arai, Saitama (JP); Tsugio Ueno, Saitama (JP); Yasuo Kondo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 168 days.

(21) Appl. No.: 09/685,861

(22) Filed: Oct. 5, 2000

(30) Foreign Application Priority Data

| Oct. 5, 1999 | (JP) | ......... 11-284331 |
| Oct. 5, 1999 | (JP) | ......... 11-284429 |
| Oct. 5, 1999 | (JP) | ......... 11-284430 |
| Oct. 5, 1999 | (JP) | ......... 11-284432 |
| Oct. 5, 1999 | (JP) | ......... 11-284433 |
| Oct. 5, 1999 | (JP) | ......... 11-284502 |
| Oct. 5, 1999 | (JP) | ......... 11-284503 |

(51) Int. Cl.⁷ .................. B23Q 3/157; B23Q 3/06; B23Q 11/02; B23C 1/02; B23B 49/00

(52) U.S. Cl. .................. 483/54; 483/67; 483/10; 483/12; 483/13; 29/888.09; 409/133; 409/136; 409/137; 409/173; 409/186; 409/193; 409/207; 409/164; 409/224; 409/225; 408/2; 408/707; 279/2.23; 279/121; 279/137; 279/141; 269/32; 269/155; 269/224; 269/234; 33/603

(58) Field of Search .................. 483/14, 7, 10, 483/11, 12, 13, 54, 55, 56, 67, 66; 29/888.09; 409/133, 225, 224, 219, 164, 136, 137, 172, 173, 231, 232, 186–187, 193–194, 207–208; 33/603; 408/2, 707; 279/2.23, 121, 123, 110, 137, 141; 269/224, 234, 238, 152, 155, 32; 407/58, 60

(56) References Cited

U.S. PATENT DOCUMENTS

| 1,438,138 A | * | 12/1922 | Rossignol | ............. 279/2.23 |
| 1,492,062 A | * | 4/1924 | Baker | ............. 29/888.09 |
| 1,604,940 A | * | 10/1926 | Hempy | ............. 29/888.09 |
| 1,697,276 A | * | 1/1929 | Green | ............. 29/888.09 |
| 1,810,214 A | * | 6/1931 | Johnson | ............. 29/888.09 |
| 2,614,442 A | * | 10/1952 | Arp | ............. 408/707 |
| 2,690,702 A | * | 10/1954 | Romans et al. | ............. 409/133 |
| 2,844,053 A | * | 7/1958 | Wagner et al. | ............. 408/707 |

(List continued on next page.)

FOREIGN PATENT DOCUMENTS

| GB | 1 356 156 | 6/1974 |
| GB | 2 163 873 | 3/1986 |
| JP | 10-217012 | 8/1998 |

Primary Examiner—A. L. Wellington
Assistant Examiner—Erica E Cadugan
(74) Attorney, Agent, or Firm—Arent Fox Kintner Plotkin & Kahn, PLLC

(57) ABSTRACT

In a finishing apparatus, a plurality of works are retained at distances from each other in a direction of an X-axis. A single spindle is disposed on a table movable in the direction of the X-axis, the spindle has an axis parallel to an axis of each of bores to be finished, and is capable of being advanced and retracted axially. A measuring device is provided that measures an inside diameter of each finished bore and which is advanced and retracted independently from the spindle in a direction along the axis of each finished bore. A combination tool is mounted at a tip end of the spindle and finishes an inner surface of any of the bores to be finished, even if the position of insertion of the combination tool into each of the bores is changed.

20 Claims, 28 Drawing Sheets

U.S. PATENT DOCUMENTS

| | | | | |
|---|---|---|---|---|
| 3,191,294 A | * | 6/1965 | Daugherty | 408/2 |
| 3,529,510 A | * | 9/1970 | Albright et al. | 408/2 |
| 3,623,216 A | * | 11/1971 | Aihara et al. | 408/2 |
| 3,740,160 A | * | 6/1973 | Kimura et al. | 408/2 |
| 4,040,763 A | * | 8/1977 | Assenmacher | 408/707 |
| 4,404,728 A | * | 9/1983 | Ishikawa | 483/13 |
| 4,420,912 A | * | 12/1983 | Gehring | 269/234 |
| 4,523,367 A | * | 6/1985 | Burkhardt et al. | 483/59 |
| 4,581,811 A | * | 4/1986 | Eckle | 483/31 |
| 4,629,384 A | * | 12/1986 | Beshke et al. | 269/309 |
| 4,761,877 A | * | 8/1988 | Rupp | 483/54 |
| 4,945,628 A | * | 8/1990 | Novak | 483/66 |
| 5,066,176 A | * | 11/1991 | Johnstone | 409/133 |
| 5,353,823 A | * | 10/1994 | Peter | 134/186 |
| 5,382,213 A | * | 1/1995 | Kopel et al. | 483/7 |
| 5,718,155 A | | 2/1998 | Asada et al. | |
| 5,908,270 A | * | 6/1999 | Araki | 408/707 |
| 5,946,790 A | * | 9/1999 | Graham et al. | 29/888.09 |
| 6,203,478 B1 | * | 3/2001 | Gorrochategui | 409/224 |
| 6,228,007 B1 | * | 5/2001 | Quak et al. | 483/56 |
| 6,287,245 B1 | * | 9/2001 | Randecker | 483/14 |
| 6,338,705 B1 | * | 1/2002 | Cavallo et al. | 483/14 |

* cited by examiner

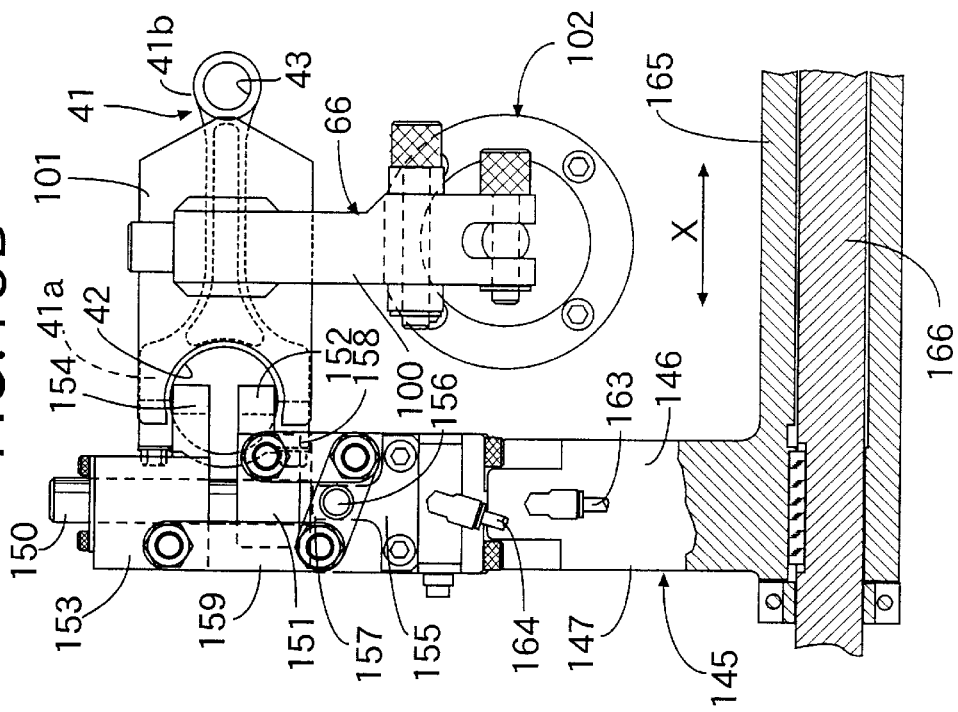
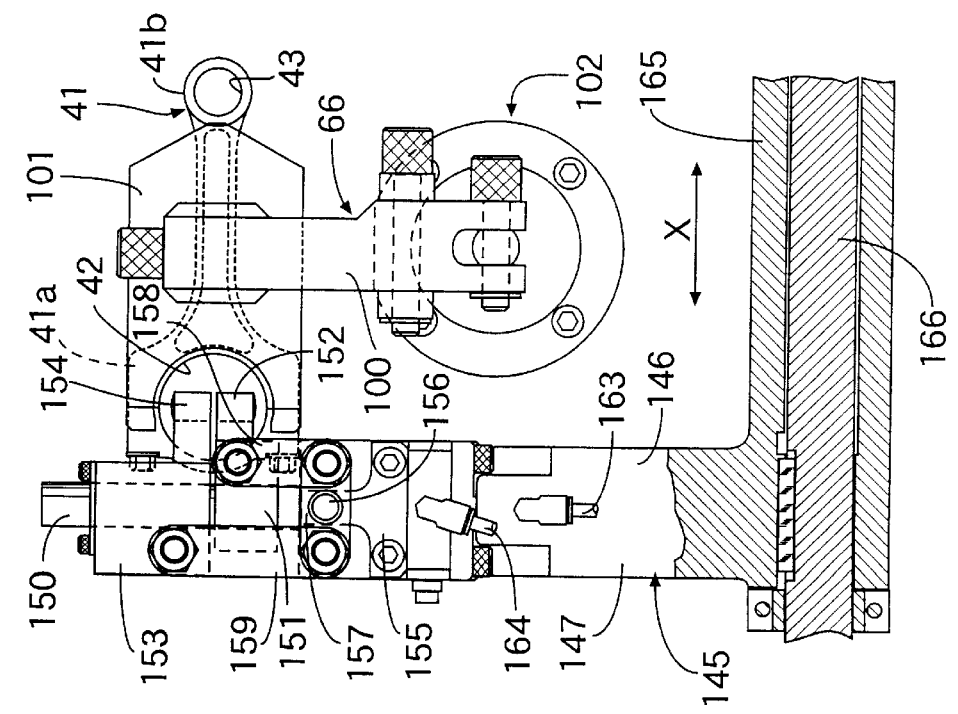

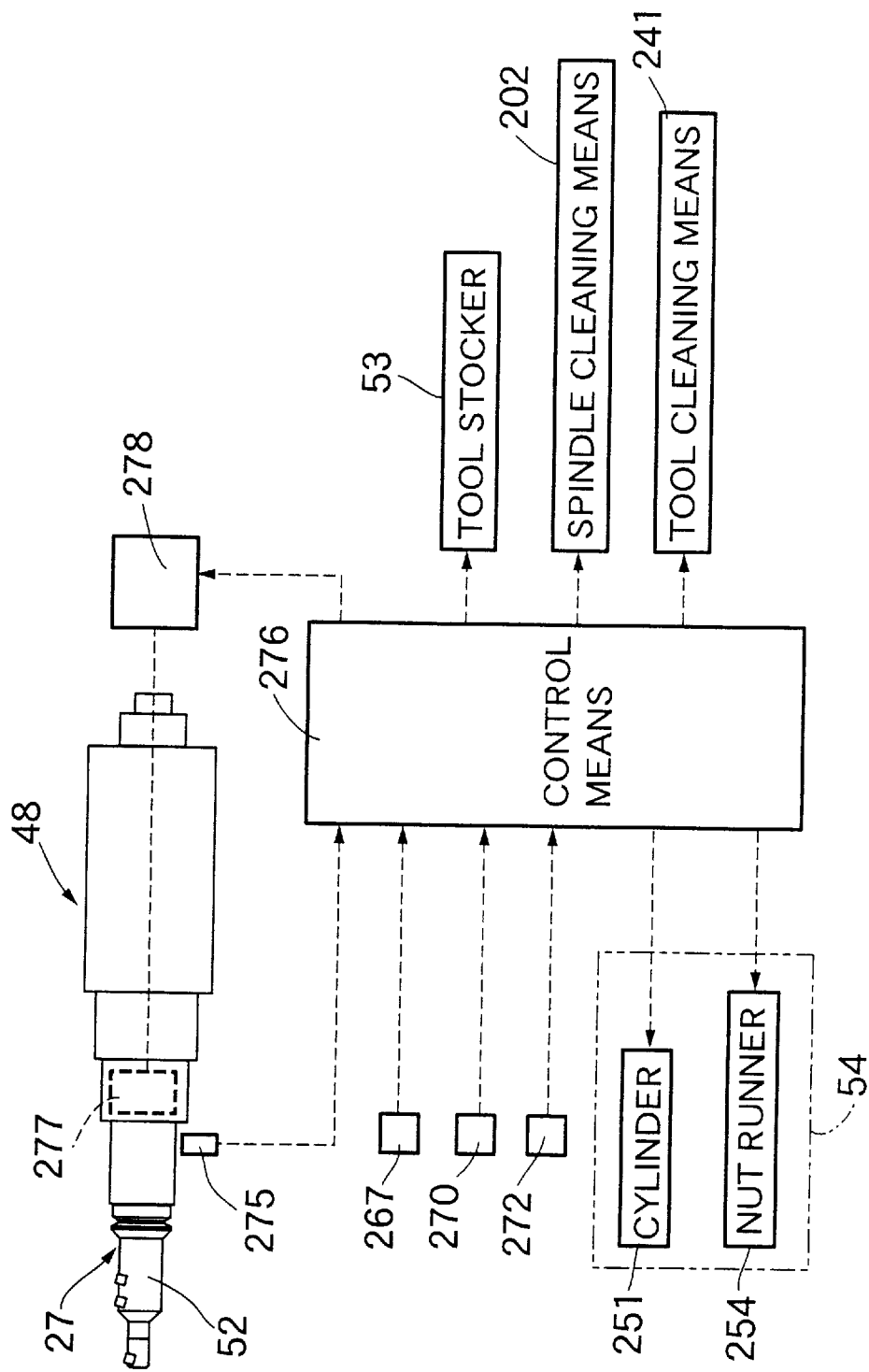

APPARATUS FOR FINISHING INSIDE DIAMETER OF WORK

BACKGROUND OF THE INVENTION

1. Field of the Invention

The present invention relates to an apparatus for finishing an inside diameter of a work, which is designed to finish inner surfaces of a plurality of bores to be finished, which are provided in the work and have diameters different from one another and axes parallel to one another, and to measure inside diameters of the bores after completion of the finishing treatment.

2. Description of the Related Art

Such an apparatus has been already known, for example, from Japanese Patent Application Laid-open No.10-217012 and the like.

In the above known apparatus, however, spindles and tools individually corresponding to a plurality of bores to be finished provided in the work are provided for each of a plurality of works, so that the finishing treatments of the plurality of works are conducted simultaneously. For this reason, when the type of the work is changed, a large number of operations of exchanging the tools on the spindles must be carried out. Therefore, the above apparatus is not suitable for the finishing treatment for multiple types of works. Moreover, after completion of the finishing treatment, each of the works is transported to a measuring station by use of a large-sized loader, resulting in an increased equipment cost.

SUMMARY OF THE INVENTION

Accordingly, it is an object of the present invention to provide an apparatus for finishing an inside diameter of a work, which is designed at a low cost to accommodate a variation in type of the work in a simple manner in carrying out the finishing treatment of a plurality of works each having a plurality of bores to be finished, which bores have different diameters, and in conducting the measurement of the diameters of the finished bores.

To achieve the above object, according to a first aspect and feature of the present invention, there is provided an apparatus for finishing an inside diameter of a work, in which inner surfaces of a plurality of bores to be finished, which are provided in the work and have diameters different from one another and axes parallel to one another, are subjected to a finishing treatment, and after completion of the finishing treatment, inside diameters of the bores are measured, the apparatus comprising a retaining frame for retaining a plurality of works at distances in a direction of an X-axis perpendicular to the axis of each of the bores to be finished, a movable table which is movable in the direction of the X-axis, a single spindle having an axis parallel to the axis of each of the bores and disposed on the movable table for advancing and retracting movements in an axial direction, a combination tool mounted at a tip end of the spindle and capable of doing the finishing treatment to the inner surfaces of the bores in accordance with a change in position of the tool inserted into each of the bores, and a measuring means which is capable of being inserted into each of the finished bores to measure an inside diameter of each of the finished bores, the measuring means being disposed on the movable table at a location displaced in the direction of the X-axis from the spindle, and capable of being be advanced and retracted in a direction along the axis of each of the bores independently from the spindle.

With such arrangement of the first feature, the plurality of works are supported side by side in the direction of the X-axis on the retaining frame. The inner surfaces of the plurality of bores provided in each of the works can be finished by the combination tool mounted at the tip end of the spindle by moving the movable table in the direction of the X-axis and axially advancing and retracting the single spindle on the movable table. If the type of the work is changed, only exchanging the combination tool is needed. Therefore, it is possible to accommodate the change in type of the work in a simple manner. Moreover, the measuring means capable of measuring the inside diameter of each of the bores is disposed at the location displaced in the direction of the X-axis from the spindle on the movable table for advancing and retraction movements independent from the spindle in the direction along the axis of the each of the bores. Therefore, when the finishing treatment of a certain work is being conducted by the combination tool, an inside diameter of a finished bore provided in another work can be measured. Thus, as compared with the prior art apparatus in which a work is transported to a measuring station by use of a large-sized loader, the time taken till the completion of the measurement can be shortened, and such a large-sized loader is not required, leading to a reduction in equipment cost.

According to a second aspect and feature of the present invention, in addition to the first feature, the apparatus further includes a correcting means provided on the spindle and capable of regulating the position of the combination tool in the radial direction of the spindle, a tool stocker in which a plurality of the combination tools are stocked in a manner that the combination tools can be alternatively brought into a previously established exchanging position at which the spindle can be moved and a combination tool removed from the tip end of the spindle can be newly retained, a deflection detector for detecting a deflection of the combination tool newly mounted at the tip end of the spindle in the exchanging position, a tool mounting and removing unit for carrying out the removal of the combination tool from the tip end of the spindle and the mounting of a combination tool to the tip end of the spindle in the exchanging position, a tool cleaning means equipped on the tool stocker and capable of cleaning that portion of one combination tool retained in the tool stocker, which is to be mounted to the spindle, a spindle cleaning means equipped on the tool stocker and capable of cleaning the tip end of the spindle, and a control means for controlling the operations of the correcting means, the tool stocker, the tool mounting and removing unit, the tool cleaning means and the spindle cleaning means as to regulate the position of the combination tool by the correcting means, based on a detection result provided by the deflection detector after the exchange of the tool in the exchanging position, or to carry out the cleaning by the tool cleaning means and the spindle cleaning means.

With such arrangement of the second feature, in a state in which the spindle has been moved to the exchanging position, the combination tool removed from the spindle by the tool mounting and removing unit can be newly retained in the tool stocker, and in a state in which one of the plurality of combination tools stocked in the tool stocker has been brought into the exchanging position, the new combination tool can be equipped on the tip end of the spindle by the tool mounting and removing unit. Moreover, when it is determined, as a result of detection of the deflection of the combination tool by the deflection detector after exchange of the combination tool, that the combination tool has been deflected largely to such an extent that the deflection can be dealt with by the correction provided by the correcting means, the correcting means can be operated to regulate the position of the combination tool in the radial direction of the spindle. When it is determined that the combination tool has been deflected largely to such an extent that it is difficult to deal with the deflection by the correction provided by the correcting means, it is determined that the incorporation of chips or the like has been caused, whereby the combination tool is removed from the spindle, and the equipped portion of the combination tool on the spindle and the tip end of the spindle are cleaned by the operation of the tool cleaning mans and the spindle cleaning means. Thereafter, the new combination tool can be equipped on a good accuracy by carrying out the exchange of the combination tool again. In this way, the automatic exchange of the combination tool is ensured, while confirming the accuracy of equipping of the combination tool on the tip end of the spindle and hence, the combination tool can be exchanged automatically, while avoiding a reduction in finishing accuracy.

According to a third aspect and feature of the present invention, in addition to the second feature, the tool stocker includes a rotor rotatable about an axis parallel to the axis of the spindle, tool grasping means which are disposed at a plurality of points equally spaced from one another in a circumferential direction of the rotor, excluding one point at which the spindle cleaning means is disposed, each of the tool grasping means being capable of releasably grasping the combination tool, and a rotor driving means for driving the rotor in such a manner to bring the tool grasping means and the spindle cleaning means alternatively into the exchanging position.

With such arrangement of the third feature, the plurality of tool grasping means for releasably grasping the combination tools and the spindle cleaning means can be alternatively brought into the exchanging position. Therefore, one of the plurality of combination tools can be selected and equipped on the tip end of the spindle by moving the tip end of the spindle to the exchanging position, and the combination tool removed from the tip end of the spindle can be stocked in the tool stocker. When the tip end of the spindle is stained, the tip end of the spindle can be cleaned automatically by bringing the spindle cleaning means to the exchanging position.

According to a fourth aspect and feature of the present invention, in addition to the second feature, the spindle is provided at its tip end with a cam clamp mechanism which includes a clamp bolt rotatable about an axis perpendicular to the rotational axis of the spindle and which is capable of being switched over between a clamping state of clamping the composition tool provided by rotating the clamp bolt in a normal direction, and an unclamping state of unclamping the composition tool provided by rotating the clamp bolt in a reverse direction, and the tool mounting and removing unit includes a moving member reciprocally movable in a direction perpendicular to the rotational axis of the spindle in the exchanging position, a moving member driving means for reciprocally moving the moving member, a rotary shaft carried on the moving member for rotation about an axis perpendicular to the rotational axis of the spindle, a wrench which is coaxially connected at a base end thereof to one end of the rotary shaft against relative rotation about the axis of the rotary shaft but for relative movement in a limited region in an axial direction of the rotary shaft, the wrench being capable of being brought into engagement with a tip end of the clamp bolt, a spring mounted under compression between the base end of the wrench and the one end of the rotary shaft, and a rotary shaft driving means capable of rotating the rotary shaft in either of normal and reverse directions irrespective of the moved position of the moving member, and the operations of the moving member driving means and the rotary shaft driving means are controlled by the control means, based on detection results provided by an engaged-state detector for detecting whether the tip end of the wrench has been brought into engagement with the clamp bolt, in accordance with the axial relative positions of the rotary shaft and the wrench, a rotation-number detector for detecting a number of rotations of the wrench in the reverse direction and an output torque detector for detecting an output torque in the normal direction from the rotary shaft driving means.

With such arrangement of the fourth feature, to remove the combination tool from the tip end of the spindle, first, the moving member is moved toward the cam clamp mechanism by the moving member driving means in a state in which the cam clamp mechanism at the tip end of the spindle has been brought into the exchanging position, and the tip end of the wrench is brought into engagement with the clamp bolt. In this case, when the engagement of the tip end of the wrench with the clamp bolt has been failed, the axial relative positions of the rotary shaft and the wrench are changed. Therefore, the reliable engagement of the wrench with the clamp bolt can be confirmed by detecting the failure of the engagement by the engaged-state detector. After confirmation of the engagement of the wrench with the clamp bolt, the cam clamp mechanism can be brought into the unclamping state by operating the rotary shaft driving means in the reverse direction. When a predetermined number of rotations has been detected by the rotation-number detector, the operation of the rotary shaft driving means is stopped, and the moving member is moved in a direction away from the cam clamp mechanism by the moving member driving means. This releases the engagement of the wrench with the clamp bolt, whereby the wrench is moved away from the cam clamp mechanism. To newly mount the combination tool to the tip end of the spindle, the moving member is moved toward the cam clamp mechanism which is in the exchanging position, and the tip end of the wrench is brought into engagement with the clamp bolt. It is detected by the engaged-state detector that the tip end of the wrench has been engaged with the clamp bolt, and then, the rotary shaft driving means is operated in the normal direction. In this manner, the cam clamp mechanism can be brought into the clamping state. When a predetermined torque has been detected by the torque detector, the operation of the rotary shaft driving means is stopped, and the moving member is moved in the direction away from the cam clamp mechanism by the moving member driving means. This releases the engagement of the wrench with the clamp bolt, whereby the wrench is moved away from the cam clamp mechanism. In this manner, the clamping state and the unclamping state of the cam clamp mechanism can be switched over automatically from one to another, thereby enabling the automatic mounting and removal of the combination tool to and from the tip end of the spindle.

According to a fifth aspect and feature of the present invention, in addition to the first feature, the apparatus further includes a first positioning means capable of being switched over between a locking state in which it is put into abutment against an inner surface of a smaller-diameter bore provided as a bore to be finished in a smaller end of a connecting rod as a work at a plurality of circumferential points, thereby positioning the smaller end, and an unlocking state in which the positioning of the smaller end is released at the finishing treatment of the smaller-diameter bore, whereby the first positioning means is retracted from the smaller-diameter bore, a second positioning means capable of being switched over between a locking state in which it is put into abutment against an inner surface of a larger-diameter bore provided as a bore to be finished in the connecting rod at a plurality of circumferential points, thereby positioning the larger end, and an unlocking state in which the positioning of the larger end is released at the finishing treatment of the larger-diameter bore, whereby the second positioning means is retracted from the larger-diameter bore, and a clamp means capable of urging the connecting rod, with the larger and smaller ends put into abutment against reference support faces, toward the reference support faces to retain the connecting rod on the retaining frame.

With such arrangement of the fifth feature, the first and second positioning means are brought into abutment against the inner surfaces of the smaller-diameter and the larger-diameter bores at the pluralities of points to position the smaller and larger ends, respectively. Therefore, even if the connecting rod is an as-cast product, the connecting rod with the larger and smaller ends put into abutment against the reference support faces can be positioned precisely, and the connecting rod in the precisely positioned state can be retained on the retaining frame by the clamp means.

According to a sixth aspect and feature of the present invention, in addition to the fifth feature, the first positioning means comprises a guide member releasably fixed to the retaining frame and having the reference support face against which the smaller end of the connecting rod is put into abutment, a holder which is formed into a cylindrical shape, so that one end thereof can be coaxially inserted and removed into and out of the smaller-diameter bore, and whose axial movement is guided by the guide member, a plurality of steel balls retained at one end of the holder for movement in a radial direction of the holder, a tapered pin which has, at one end thereof, a tapered face for pushing up the steel balls radially outwards to put the steel balls against the inner surface of the smaller-diameter bore at a plurality of points, the tapered pin being axially relatively movably and coaxially inserted into the holder, and a rotation-inhibiting means provided between the guide member and the holder to inhibit the rotation of the holder about an axis, the holder being connected at the other end thereof to a holder drive member provided on the retaining frame for axial reciprocal movement in a direction along the axis of the smaller-diameter bore and against rotation about the axis of the smaller-diameter bore, so that the holder can be switched over between a connected state in which the axial movement of the holder relative to the holder drive member is inhibited, and a disconnected state in which the connected state is released by rotating the holder in a predetermined amount from the connected state about the axis relative to the holder drive member, the retaining frame having a pin drive member provided thereon for axial reciprocal movement in a direction along the axis of the smaller-diameter bore and connected to the other end of the tapered pin to coaxially abut against the other end of the tapered pin.

With such arrangement of the sixth feature, the guide member, the holder guided in axial reciprocal movement by the guide member, the plurality of steel balls retained by the holder and the tapered pin axially relatively movably inserted into the holder are prepared as a single unit for every type of the work. Thus, the unit can be exchanged easily and promptly in accordance with a change in type of the work. More specifically, the connection and disconnection of the holder to and from the holder drive member can be switched over from one to another by rotating the holder about the axis in a state in which the fixing of the guide member to the retaining frame has been released. When the holder has been connected to the holder drive member, the connection and disconnection of the tapered pin to and from the pin drive member can be switched over from one to another by putting the pin drive member into coaxial abutment against the tapered pin. Moreover, the connection of the holder drive member and the holder with the guide member fixed to the retaining frame can be reliably maintained by inhibiting the rotation of the holder about the axis by the rotation inhibiting means, and accordingly, the abutting connection of the pin drive member and the tapered pin can be reliably maintained.

According to a seventh aspect and feature of the present invention, in addition to the fifth feature, the apparatus further includes a natural lock means capable of being switched over between a state in which an outer side of either one of the larger and smaller ends is resiliently retained, so that it can be released by a human's power, and a state in which an outer side of either one of the larger and smaller ends is fixedly retained. With such arrangement, when the connecting rod is positioned, the operator's load can be alleviated by resiliently retaining either one of the larger and smaller ends by the natural lock mans. When either one of the larger and smaller ends is being subjected to the finishing treatment, the misalignment of the connecting rod due to a force caused by such processing can be prevented by the natural lock mans.

According to an eighth aspect and feature of the present invention, in addition to the seventh feature, a mounting and removing position for carrying out the mounting and removal of the connecting rod and a processing position for carrying out the finishing treatment of the larger-diameter and smaller-diameter bores are established on opposite sides of the retaining frame which is rotatable through every 180 degrees about a horizontal rotational axis; a pair of the reference support faces against which the larger and smaller ends can be brought into abutment, a pair of the first positioning means, a pair of the clamp means and the natural lock means are disposed symmetrically with respect to the horizontal rotational axis on a side of the retaining frame facing to the mounting and removing position and on a side of the retaining frame facing the processing position; a pair of the second positioning means are disposed in the mounting-removing position; and the retaining frame is provided with a positioning drive means for commonly driving both of the first positioning means symmetrical with respect to the rotational axis in such a manner that one of the first positioning means in the mounting and removing position is brought into the locking state and the other first positioning means in the processing position is brought into the unlocking state, and a natural lock driving means for commonly driving both of the natural lock means symmetrical with respect to the rotational axis in such a manner that one of the natural lock means in the mounting-removing position is brought into the unlocking state and the other natural lock means in the processing position is brought into the locking state.

With such arrangement of the eighth feature, in the mounting and removing position, the connecting rod with the smaller and larger ends in abutment against the reference support faces can be positioned in such a manner that the smaller and larger ends are positioned by the first and second positioning means in a state in which the larger end has been retained by the natural lock means in the unlocking state. In this case, the operator's load can be alleviated in the positioning of the connecting rod by resiliently retaining the larger end by the natural lock means. In addition, the smaller and larger ends are positioned in abutment against the inner surfaces of the smaller-diameter and larger-diameter bores at the pluralities of points, respectively, and hence, even if the connecting rod is an as-cast product, the connecting rod with the larger and smaller ends in abutment against the reference support faces can be positioned precisely. After completion of the positioning of the connecting rod by the first and second positioning means, the connecting rod can be fixedly retained on the retaining frame by the clamp means, and after retaining of the connecting rod by the clamp means, the retaining frame can be turned through 180 degrees to bring the connecting rod to the processing position by bringing the second positioning means into the unlocking state. On the other hand, in the processing position, the finishing treatment of the smaller-diameter and larger-diameter bores can be carried out by bringing the first positioning means into the unlocking state in a state in which the connecting rod has been retained on the retaining frame by the clamp means, and the misalignment of the connecting rod can be prevented from being produced by a force applied to the connecting rod by such finishing treatment, by the natural lock means in the locking state. Moreover, when the processing of the connecting rod is being conducted in the processing position, the removal of the treated connecting rod from the retaining frame and the positioning and retaining of the new connecting rod on the retaining frame can be carried out in the mounting and removing position. Therefore, the operator can mount and remove the connecting rod easily without loss in time required for mounting and removal of the connecting rod in a continuous processing cycle for the connecting rods. Thus, a reduction in equipment cost can be provided, because the mounting and removing operation by the operator is possible, as described above. Further, since the pair of first positioning means are driven by the common positioning drive means, and the pair of natural lock means are driven by the common natural lock drive means, the number of parts can be reduced.

According to a ninth aspect and feature of the present invention, in addition to the eighth feature, one of the clamp means comprises a clamper which is provided at one end of a clamp arm carried on the retaining frame for upward and downward movement about an axis parallel to the horizontal rotational axis of the retaining frame, the clamper abutting against the connecting rod, and a clamp driving cylinder is connected to the other end of the clamp arm to drive the clamp arm upwards and downwards, the clamp means and the clamp driving cylinder being mounted on the retaining frame in such an arrangement that the clamper is located above the clamp driving cylinder in the mounting and removing position and below the clamp driving cylinder in the processing position. With such arrangement, in the processing position, chips produced by the processing can be prevented to the utmost from being accumulated on the clamp arm and the clamp driving cylinder, thereby inhibiting arising of a trouble due to the chips.

BRIEF DESCRIPTION OF THE DRAWINGS

FIGS. 1 to 28 show an embodiment of the present invention, wherein

FIG. 1 is a side view of a machine tool system;

FIG. 2 is a plan view taken in the direction of an arrow 2 in FIG. 1;

FIG. 3 is a front view taken in the direction of an arrow 3 in FIG. 1;

FIG. 4 is a back view taken in the direction of an arrow 4 in FIG. 2;

FIG. 5 is an enlarged sectional view taken along a line 5—5 in FIG. 2;

FIG. 6 is a sectional view taken along a line 6—6 in FIG. 5;

FIG. 7 is a sectional view taken along a line 7—7 in FIG. 5;

FIG. 8 is a sectional view taken along a line 8—8 in FIG. 5;

FIG. 9 is an enlarged sectional view taken along a line 9—9 in FIG. 8;

FIG. 10 is an enlarged sectional view taken along a line 10—10 in FIG. 9;

FIG. 11 is an enlarged sectional view of a second positioning means, taken along a line 11—11 in FIG. 5;

FIG. 12 is a sectional view similar to FIG. 11, but showing the second positioning means which is in an unlocking state;

FIGS. 13A and 13B are sectional views taken along a line 13—13 in FIG. 11 for explaining the locking operation of the second positioning means;

FIG. 14 is a sectional view similar to FIG. 8, but during measuring by a measuring means;

FIG. 15 is a view taken along a line 15—15 in FIG. 14;

FIG. 16 is an enlarged view taken in a direction of an arrow 16 in FIG. 2;

FIG. 17 is a partially cut-away side view taken in the direction of an arrow 17—17 in FIG. 16;

FIG. 18 is a sectional view taken along a line 18—18 in FIG. 17;

FIG. 19 is a view taken along a line 19—19 in FIG. 17;

FIG. 20 is an enlarged view of a portion indicated by an arrow 20 in FIG. 19;

FIG. 21 is a sectional view taken along a line 21—21 in FIG. 20;

FIG. 22 is a sectional view taken along a line 22—22 in FIG. 20;

FIG. 24 is a sectional view taken along a line 24—24 in FIG. 16;

FIG. 25 is a sectional view taken along a line 25—25 in FIG. 24;

FIG. 26 is a sectional view taken along a line 26—26 in FIG. 24;

FIG. 27 is an enlarged sectional view taken along a line 27—27 in FIG. 24; and FIG. 28 is a diagram showing a control system.

DESCRIPTION OF THE PREFERRED EMBODIMENTS

Figure 1:
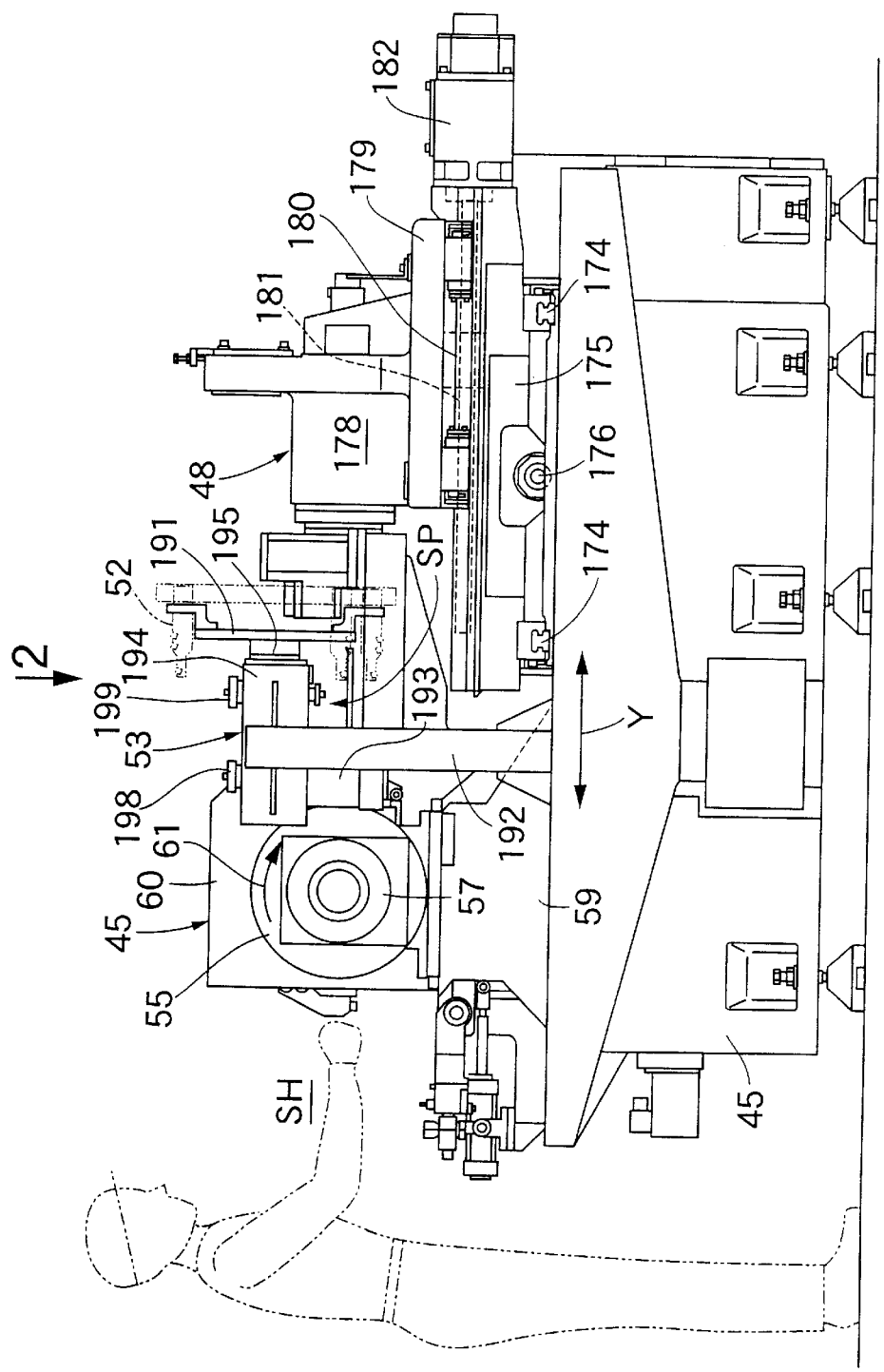
Figure 2:
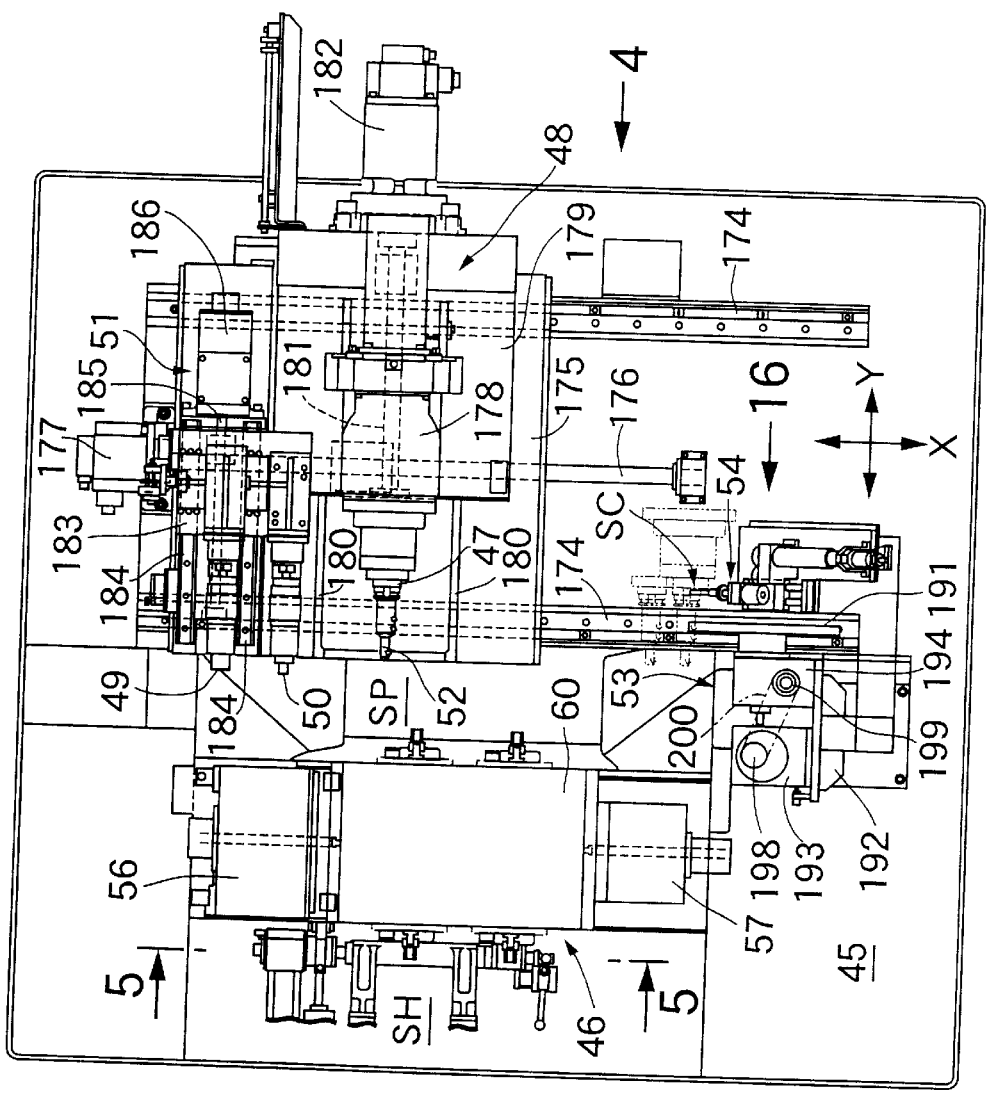
Figure 3:
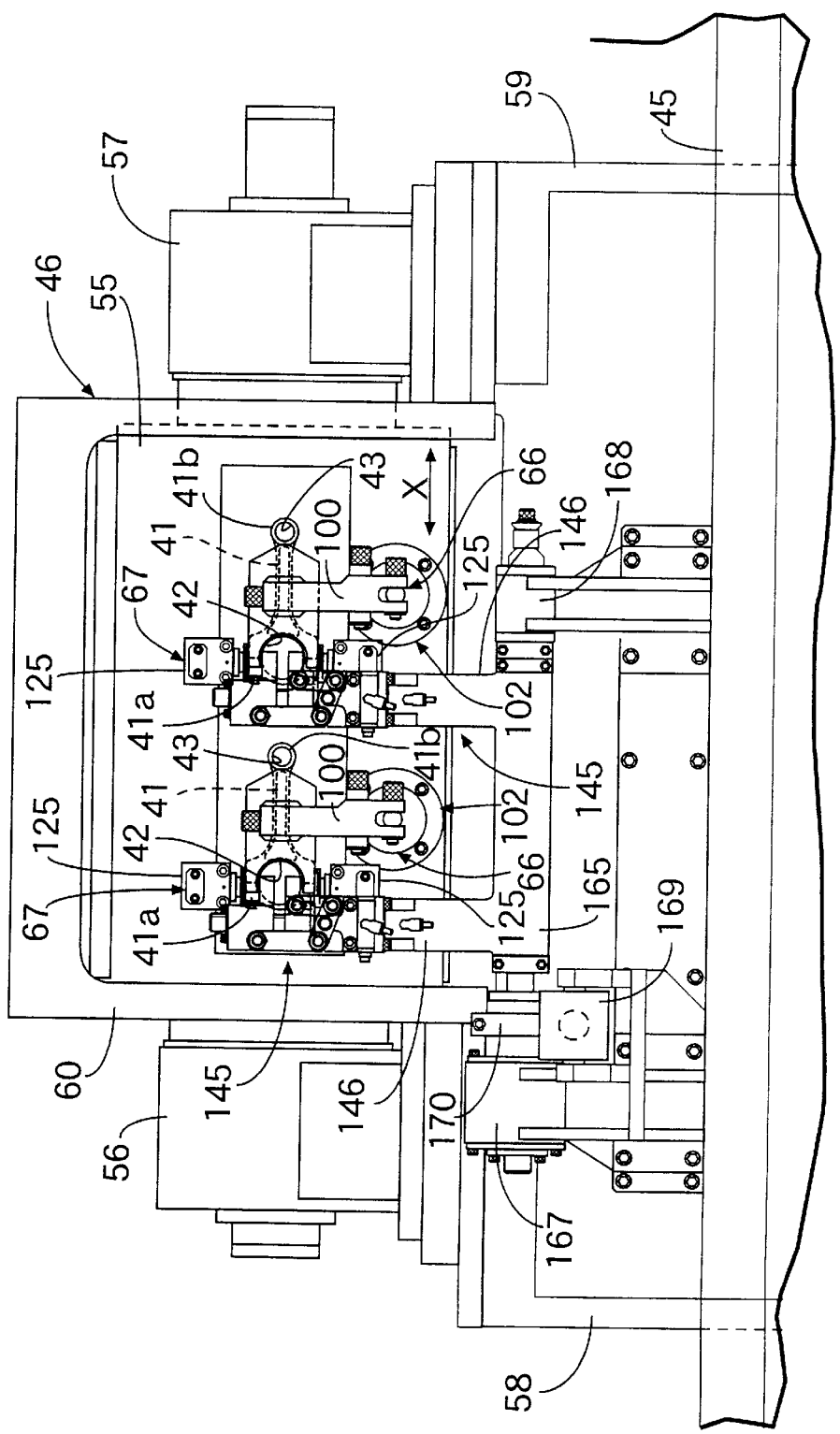
Figure 4:
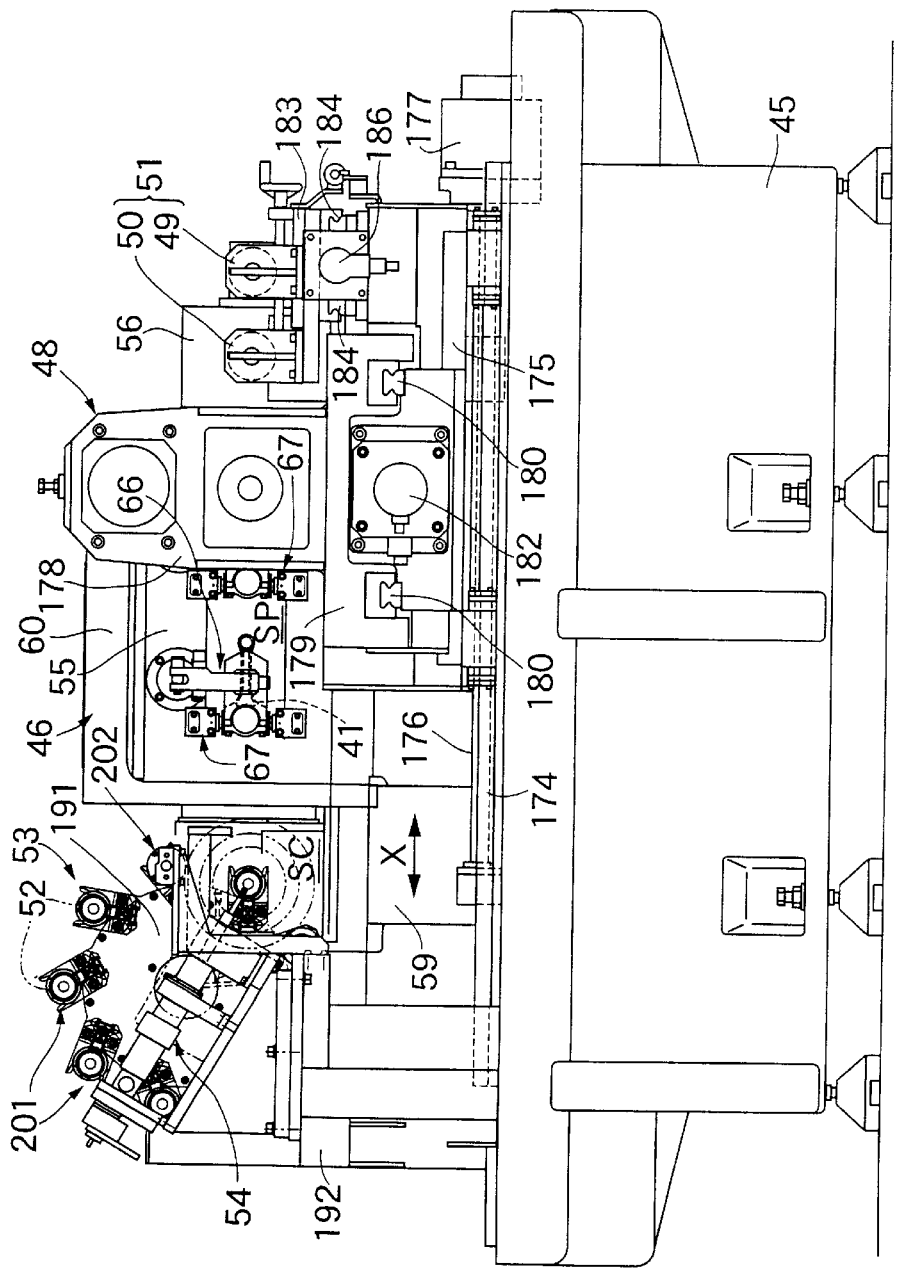
Figure 5:
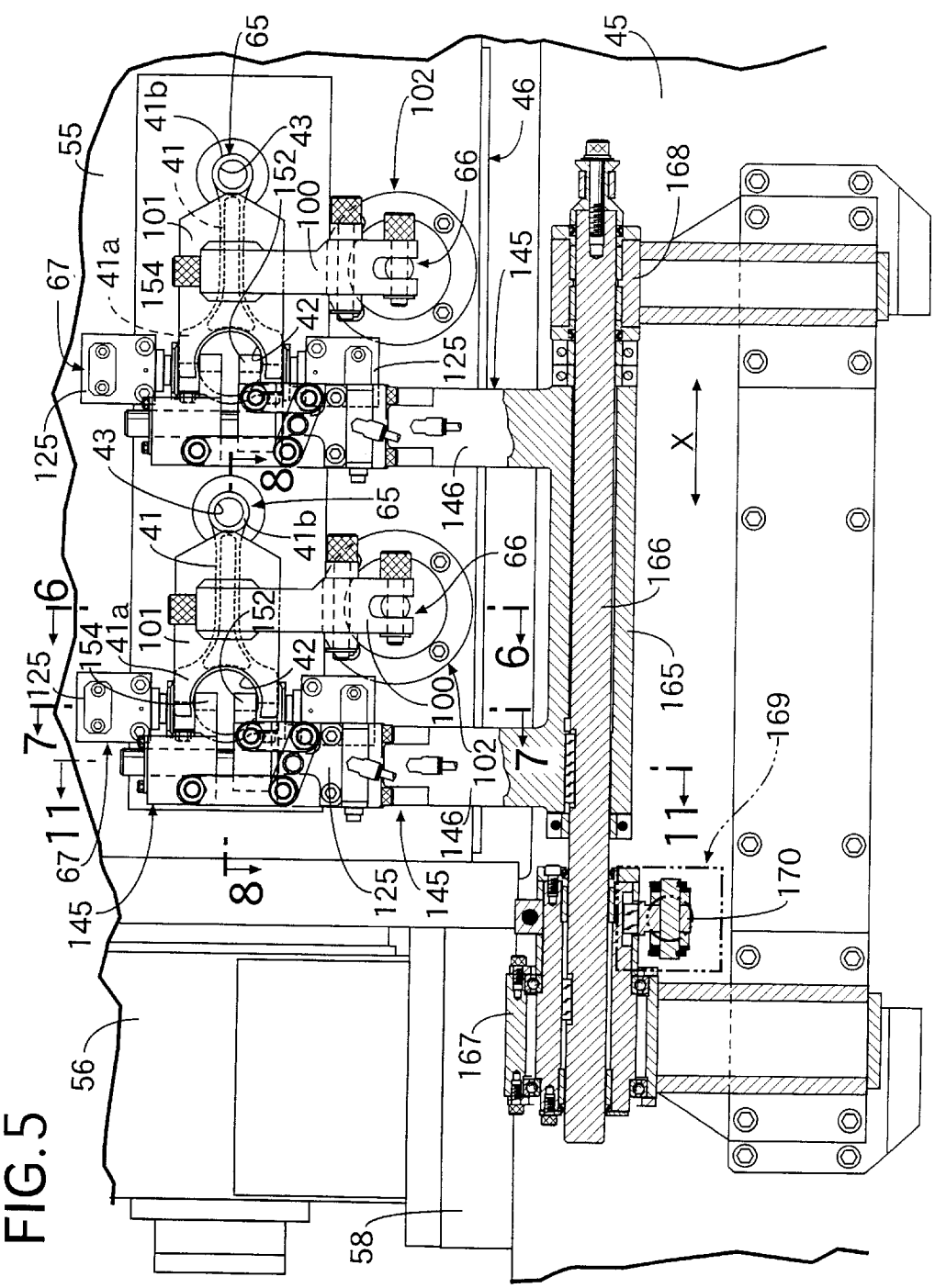

The present invention will now be described by way of an embodiment with reference to FIGS. 1 to 28.

Referring first to FIGS. 1 to 4, a machine tool system finishes for example, an inner surface of a larger-diameter bore 42 as a bore to be finished, which is provided in a larger end 41a of a connecting rod 41 as a work used in an engine for a vehicle, as well as an inner surface of a smaller-diameter bore 43 as a bore to be finished, which is provided in a smaller end 41b of the connecting rod 41. Disposed on a base 45 placed on a floor surface are a positioning and retaining device 46 for positioning and retaining a plurality of, for example, four connecting rods 41, a processing means 48 including a single spindle 47 for finishing the larger-diameter bores 42 and the smaller-diameter bores 43 in the connecting rods 41 retained by the positioning and retaining device 46, a measuring means 51 including a pair of inside-diameter measurers 49 and 50 for measuring inside diameters of the larger-diameter bore 42 and the smaller-diameter bore 43 in the connecting rod 41 after completion of the finishing, respectively, a tool stocker 53 for stocking a plurality of combination tools 52 each of which is to be exchangeably mounted at a tip end of the spindle 47, and a tool-mounting and removing unit 54 capable of carrying out the removal of the combination tool 52 from the tip end of the spindle 47 and the mounting of a new combination tool to the tip end of the spindle 47.

An X-axis and a Y-axis perpendicular to each other are established within a horizontal plane on the base 45, and the positioning and retaining device 46 includes a retaining frame 55 which is disposed at a location closer to one end of the base 45 along the Y-axis (a left end as viewed in FIGS. 1 and 2), and which is rotatable about an axis parallel to the X-axis.

A mounting and removing position SH, in which an operator mounts and removes a plurality of, e.g., a pair of connecting rods 41 on and from the retaining frame 55, is established on one side of the retaining frame 55, which is on an outer side of the base 45. A processing position SP, in which the plurality of, e.g., the pair of connecting rods 41 are finished by the processing means 48, is established on the other side of the retaining frame 55, which is on an inner side of the base 45.

An index unit 56 and an index support unit 57 are coaxially connected to opposite ends of the retaining frame 55 and fixedly supported on supports 58 and 59 which are fixed to the base 45 in a manner to protrude upwards from the base 45, so that the retaining frame 55 is rotated through every 180 degrees in a direction indicated by an arrow 61 in FIG. 1 by the units 56 and 57. The retaining frame 55 is covered with a cover 60, which is capable of allowing the retaining frame 55 to face to the mounting and removing position SH and the processing position SP.

Referring to FIGS. 5 to 8 in combination, two sets of pluralities, e.g., pairs of the connecting rods 41 are positioned and retained in their horizontal attitudes at distances in the direction of the X-axis on sides of the retaining frame 55 facing to the mounting and removing position SH and the processing position SP. Two sets of pairs of reference support faces 62 and two sets of pairs of reference support faces 63 are formed on opposite sides of the retaining frame 55 facing to the mounting and removing position SH and the processing position SP at locations symmetrical with a horizontal rotational axis 64 of the retaining frame 55, so that the larger end 41a of the connecting rod 41 is put into abutment against the reference support faces 62, and the smaller end 41b of the connecting rod 41 are put into abutment against the reference support faces 63.

Two sets of pairs of first positioning means 65, two sets of pairs of clamp means 66 and two sets of pairs of natural lock means 67 are mounted on the opposite sides of the retaining frame 55 facing to the mounting and removing position SH and the processing position SP at locations symmetrical with the horizontal rotational axis 64.

The first positioning means 65 is capable of being switched over between a locking state in which the smaller end 41b of the connecting rod 41 abutting against the reference support face 63 is positioned by the contact with a plurality of circumferential points on the inner surface of the smaller-diameter bore 43, and an unlocking state in which the positioning of the smaller end 41b is released, so that the smaller end 41b is moved out of the smaller-diameter bore 43.

Figure 9:
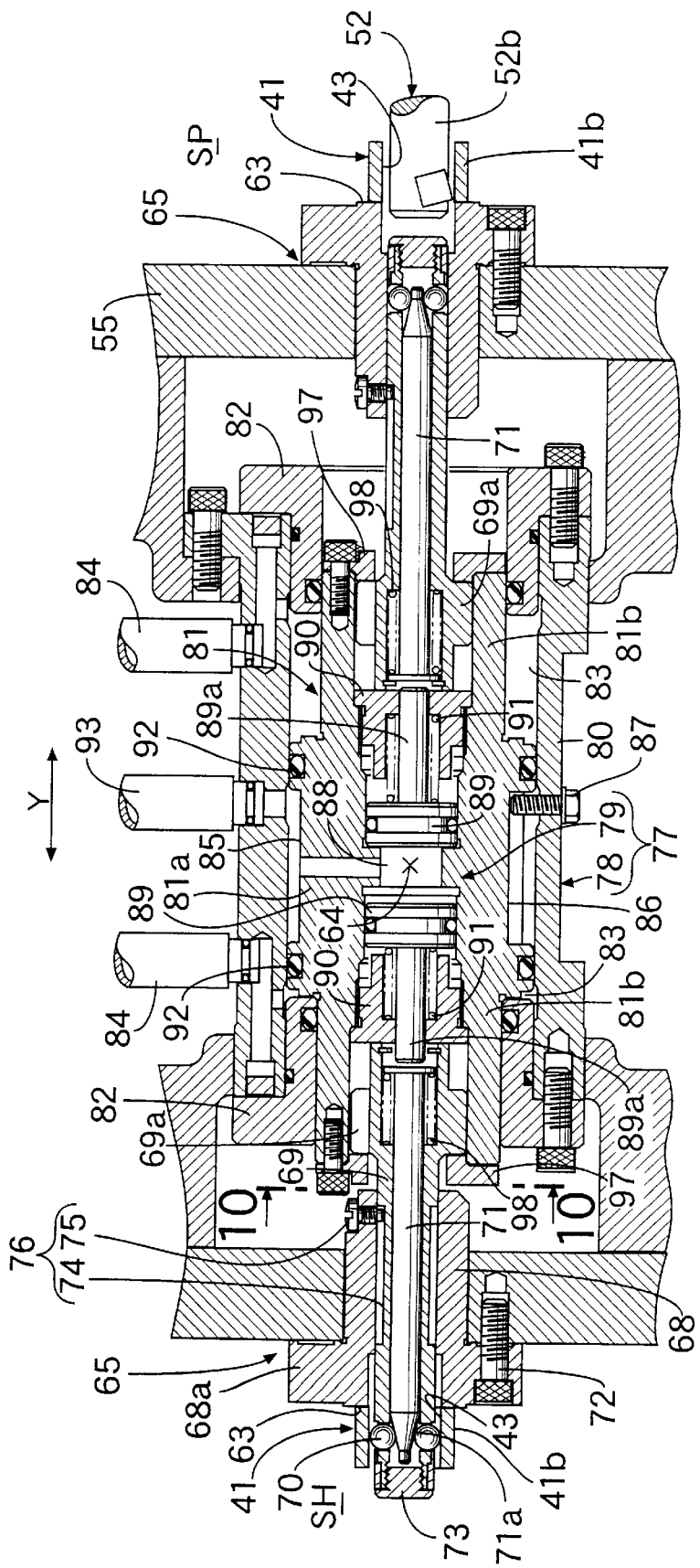

Referring also to FIG. 9, the first positioning means 65 is adapted to position the smaller end 41b by utilizing the smaller-diameter bore 43 provided in the smaller end 41b of the connecting rod 41 as a positioning bore, and includes a guide member 68 releasably fastened to the retaining frame 55 and having at its outer end face the reference support face 63 against which the smaller end 41b of the connecting rod 41 is put into abutment, a holder 69 which is formed into a cylindrical shape, so that one end thereof can be coaxially inserted into and removed from the smaller-diameter bore 43 in the smaller end 41b, and whose axial movement is guided by the guide member 68, a plurality of steel balls 70 retained at one end of the holder 69 for movement in a radial direction of the holder 69, a tapered pin 71 which has, at one end thereof, a tapered face 71a which is coaxially inserted into the holder 69 for axial movement relative to the holder 69, and against which the steel balls 70 are pushed up radially outwards into abutment at a plurality of points on the inner surface of the smaller-diameter bore 43, and a rotation-inhibiting means 76 mounted between the guide member 68 and the holder 69 for inhibiting the rotation of the holder 69.

The guide member 68 is formed into a cylindrical shape and has at its outer end a flange portion 68a, which is releasably fastened to the side of the retaining frame 55 by a plurality of bolts 72. The holder 69 is formed into a cylindrical shape and axially slidably received in the guide member 68. One end of the holder 69 is closed by a cap 73, and the plurality of steel balls 70 are retained at one end of the holder 69 for movement in the radial direction of the holder 69.

The rotation-inhibiting means 76 is comprised of a single groove 74 provided in an outer surface of the holder 69 at a location corresponding to the inside of the guide member 68 to extend axially, and a screw member 75 threadedly fitted into the guide member 68 to engage the groove 74. The holder 69 is guided in an axial direction by the guide member 68 in a state in which the rotation of the holder 69 about the axis has been inhibited by the rotation-inhibiting means 76.

In such first positioning means 65, the steel balls 70 are pushed by the tapered face 71a into contact with the inner surface of the smaller-diameter bore 43 at the plurality of circumferential locations by moving the tapered pin 71 leftwards as viewed in FIG. 9 relative to the holder 69 in a state in which the one end of the holder 69 has been inserted into the smaller-diameter bore 43 in the connecting rod 41 in the mounting-removing position SH. Thus, the first positioning means 65 is brought into the locking state in which the smaller-diameter portion 41b abutting against the reference support face 63 has been positioned. To bring the first positioning means 65 into the unlocking state in which the positioning has been released, the tapered pin 71 may be moved axially relative to the holder 69 to a position in which the application of a pushing-up force to the steel balls 70 is eliminated, and then, the holder 69 may be moved axially to a position in which the holder 69 is removed out of the smaller-diameter bore 43.

The pair of first positioning means 65 disposed symmetrically with respect to the rotational axis of the retaining frame 55 are driven commonly by a positioning drive means 77. The positioning drive means 77 includes a first drive portion 78 supported on the retaining frame 55 to be able to reciprocally operate the holder 69 axially along the axis of the smaller-diameter bore 43 in the connecting rod 41, and a second drive portion 79 supported on the retaining frame 55 to be able to reciprocally operate the tapered pin 71 axially along the axis of the smaller-diameter bore 43.

The first drive portion 78 includes a cylindrical cylinder 80 fixed to the retaining frame 55 and having an axis corresponding to the axis of the smaller-diameter bore 43, and a holder drive 81 slidably received in the cylinder 80. Guide tubes 82 are fastened to opposite ends of the cylinder 80.

The holder drive 81 includes cylindrical rod portions 81b fluid-tightly and axially slidably fitted in the guide tubes 82 and coaxially and integrally connected to opposite ends of a main drive portion 81a which is slidably received in the cylinder 80 between both the guide tubes 82. First annular fluid pressure chambers 83 are defined between outer peripheries of opposite ends of the main drive portion 81a and inner ends of the guide tubes 82, with their outer peripheries defined by the inner surface of the cylinder 80 and with their inner peripheries defined by outer peripheries of the rod portions 81b. First fluid pressure conduits 84 individually leading to the first fluid pressure chambers 83 are connected to the cylinder 80.

In such first drive portion 78, the holder drive 81 is reciprocally moved axially by applying a fluid pressure to one of the first fluid pressure chambers 83 and releasing a fluid pressure from the other first fluid pressure chamber 83.

Moreover, provided in an outer surface of the main drive portion 81a of the holder drive 81 are an annular recess 85, and a groove 86 extending axially deeper than the annular recess 85. The rotation of the holder drive 81 about the axis is inhibited by threadedly inserting a screw member 87 engaged in the groove 86 into the cylinder 80.

The second drive portion 79 includes a pair of pin drive members 89, 89 fluid-tightly and axially slidably fitted into an axially intermediate portion of the holder drive 81 to define a second fluid pressure chamber 88 leading to the annular recess 85 therebetween, guide tubes 90, 90 fixed within the holder drive 81 axially outside the pin drive members 89, 89, and return springs 91, 91 mounted between the pin drive members 89, 89 and the guide tubes 90, 90 to exhibit a spring force for biasing the pin drive members 89, 89 toward the second fluid pressure chamber 88. Each of rods 89a, 89a is integrally and coaxially connected at one end thereof to each of the pin drive members 89, 89 and slidably received in each of the guide tubes 90, 90.

Annular seal members 92, 92 are mounted on the outer surface of the main drive portion 81a of the holder drive 81 for sealing the first fluid pressure chambers 83, 83 and the annular recess 85 from each other, respectively. A second fluid pressure conduit 93 leading to the annular recess 85 and thus to the first fluid pressure chamber 85 irrespective of the axial position of the holder drive 81 is connected to the cylinder 80.

In such second drive portion 79, the pair of pin drive members 89, 89 can be moved axially relative to the holder drive 81 by switching-over a state in which the fluid pressure is applied to the second fluid pressure chamber 88 and a state in which the fluid pressure is released from the second fluid pressure chamber 88.

The first fluid pressure conduits 84, 84 and the second fluid pressure conduit 93 are connected commonly to a fluid pressure dispensing plate 94 constituting a portion of the retaining frame 55. The fluid pressure dispensing plate 94 is disposed at an upper portion or a lower portion of the retaining frame 55 in response to the rotation of the retaining frame 55 through every 180 degrees.

Figure 10:
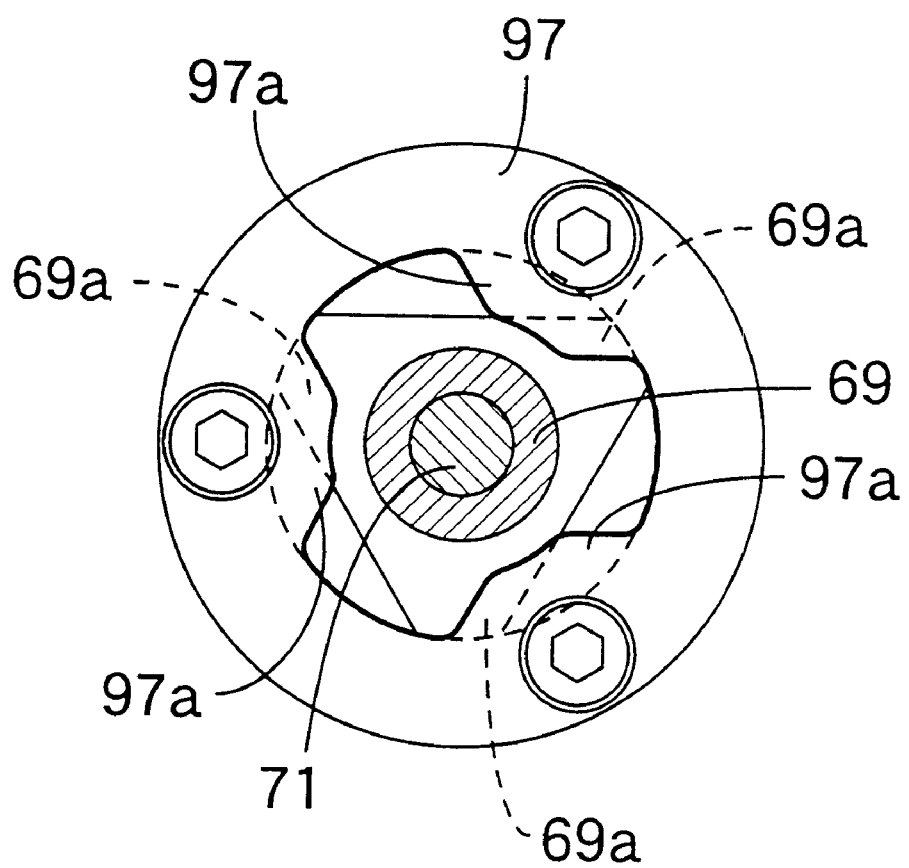
Figure 11:
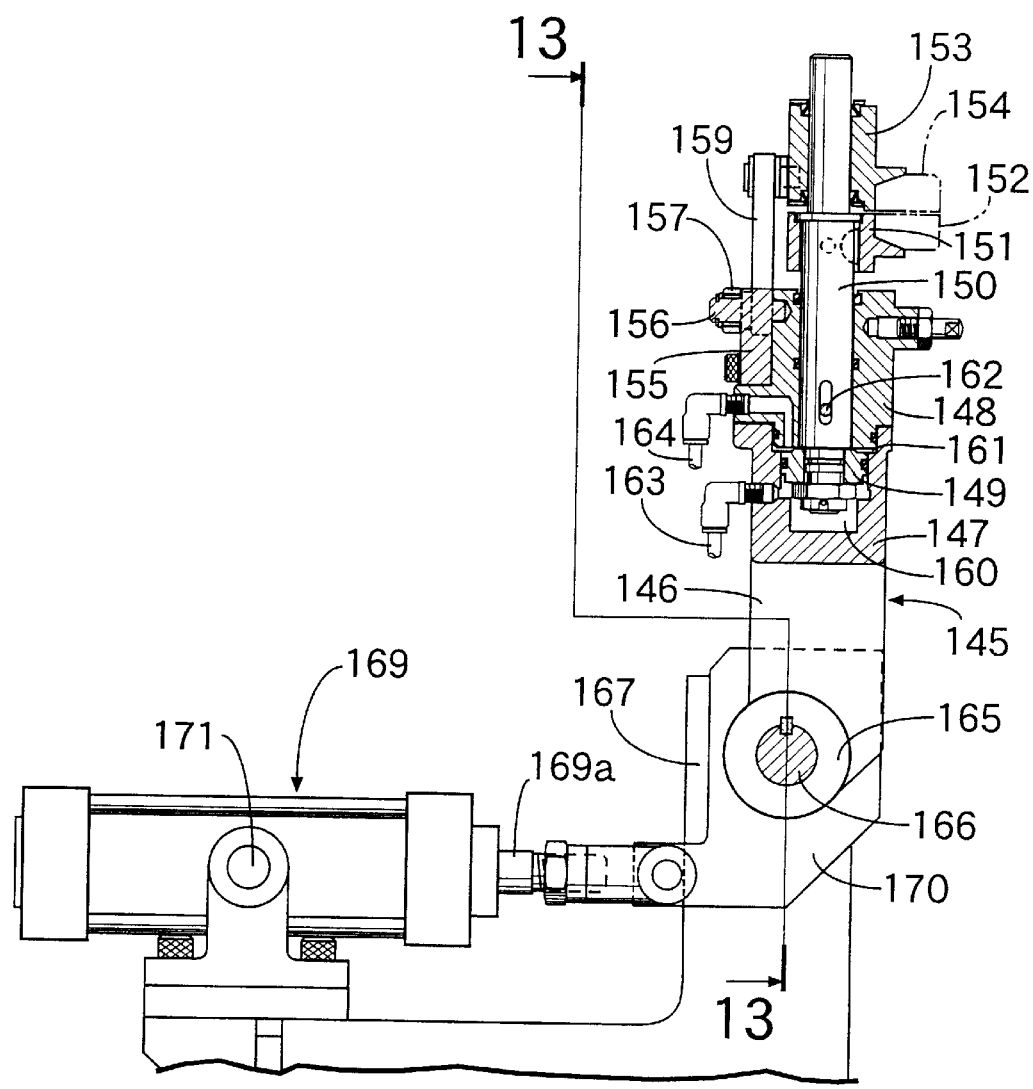
Figure 12:
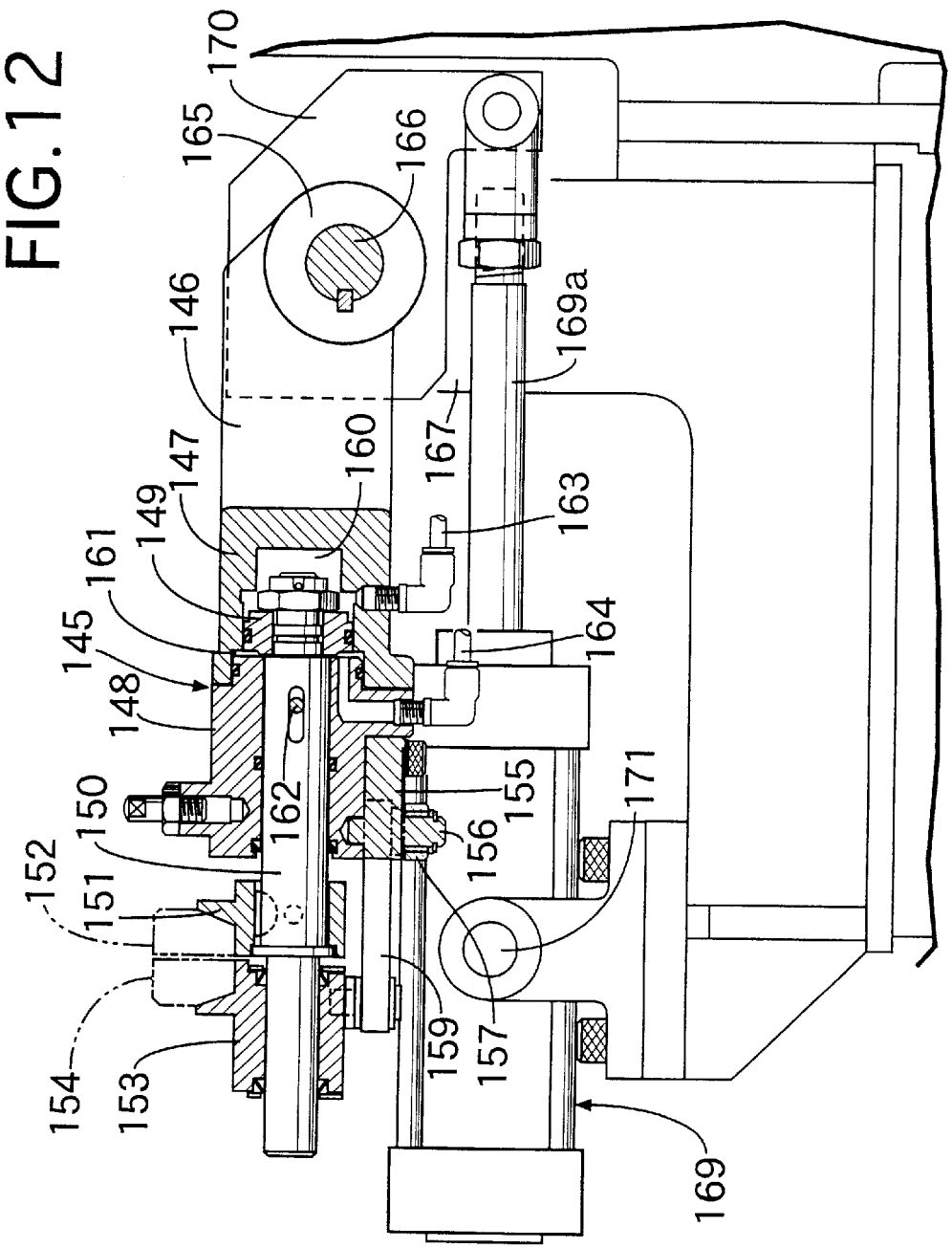

Referring also to FIG. 10, ring-shaped limiting plates 97, 97 are fastened to tip ends of the rod portions 81b, 81b of the holder drive 81. Limiting projections 97a are provided on the limiting plate 97 at a plurality of points (three points in the present embodiment) spaced at equal distances apart from one another circumferentially of an inner periphery of the limiting plate 97 to protrude radially inwards from the limiting plate 97. On the other hand, the other end of the holder 69 of the positioning means 65 is inserted through the limiting plate 97 into the rod portion 81b to abut against the guide tube 90.

Engage projections 69a are provided on the outer surface of the other end of the holder 69 at a plurality of points (three points in the present embodiment) circumferentially spaced at equal distances apart from one another to engage the limiting projections 97a of the limiting plate 97 from the inside. The engage projections 69a are formed so that the relative positions of the holder 69 and the holder drive 81 about the axis are determined as positions corresponding to between the limiting projections 97a, the other end of the holder 69 can be moved away from the limiting plate 97. In this manner, the other end of the holder 69 is connected to the holder drive 81, so that the holder 69 can be switched over between a connected state in which the axial movement of the holder 69 relative to the holder driver 81 is inhibited, and a disconnected state in which the connected state is released by rotating the holder 69 about the axis by a preset amount relative to the holder drive 81 from the connected state.

A spring 98 is mounted between the other end of the holder 69 and the other end of the tapered pin 71 for exhibiting a spring force in a direction to move the tapered pin 71 toward the guide tube 90 relative the holder 69, and the tip end of the rod 89a axially movably passed through the guide tube 90 is put into coaxial abutment against the other end of the tapered pin 71. Namely, the pin drive member 89 is put into coaxial abutment against the other end of the tapered pin 71.

With such positioning drive means 77, both of the first positioning means 65 can be driven in such a manner that one of the pair of first positioning means 65 connected to the positioning drive means 77, which is adjacent the mounting and removing position SH, is brought into the locking state, and the first positioning means 65 adjacent the processing position SP is brought into the unlocking state.

Figure 6:
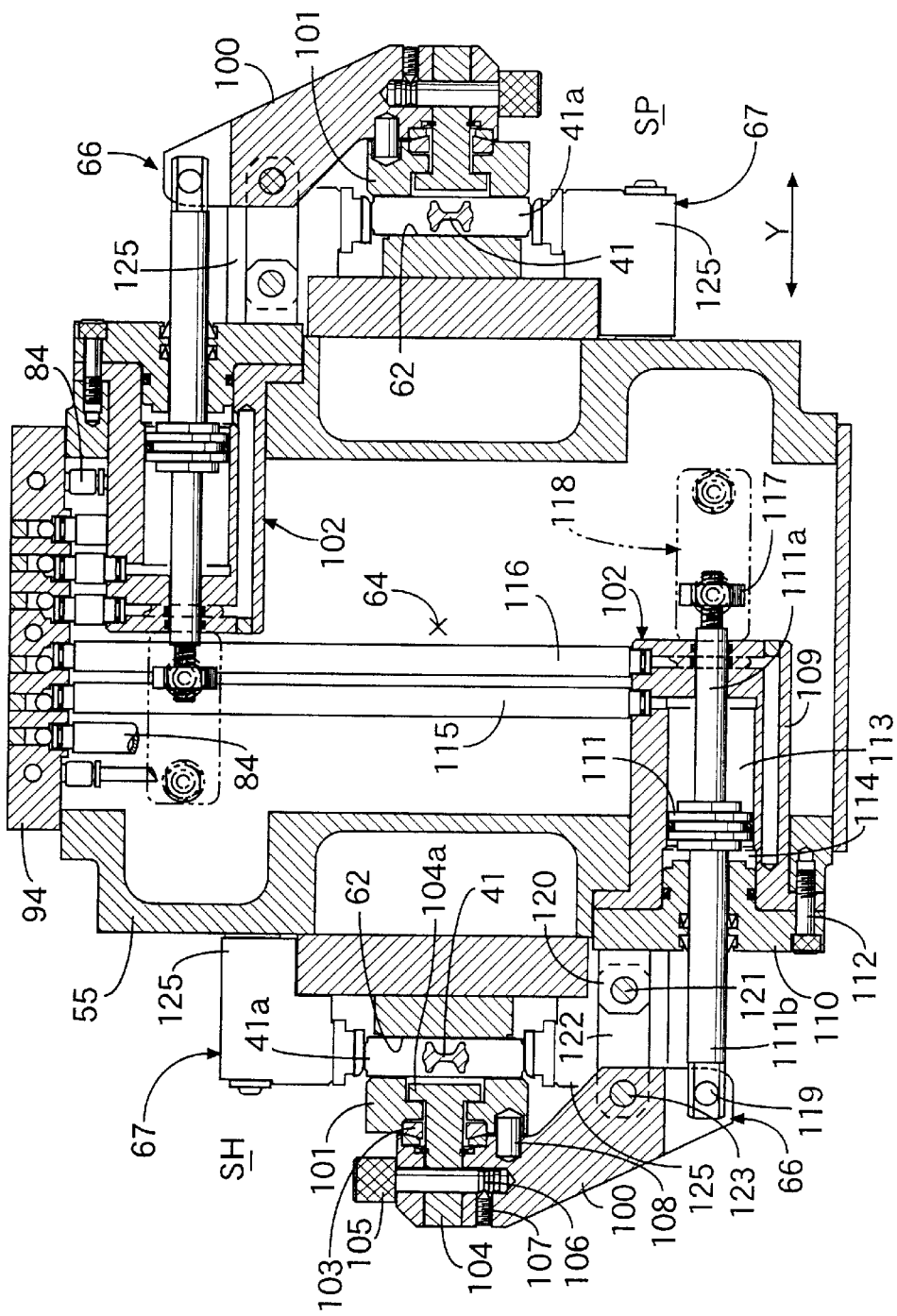

Referring particularly carefully to FIG. 6, the clamp means 66 urges the connecting rod 41 to the reference support faces 62 and 63 to retain the connecting rod 41 on the retaining frame 55. The clamp means 66 includes a clamp arm 100 carried on the retaining frame 55 for upward and downward movements about an axis parallel to the horizontal rotational axis 64 of the retaining-frame 55, and a damper 101 provided at one end of the clamp arm 100 for abutment against the connecting rod 41. A clamp-driving cylinder 102 for driving the clamp arm 100 upwards and downwards is connected to the other end of the clamp arm 100.

The damper 101 is capable to abutting against an intermediate portion of the connecting rod 41 which is in a state in which its larger end 41a and smaller end 41b are in abutment against the reference support faces 62 and 63. The damper 101 is swingably mounted to one end of the clamp arm 100 by (1) a retaining pin 104 which has at one end an engage collar 104a engaged with the damper 101 with a spherical washer interposed between damper 101 and one end of the clamp arm 100, and which is inserted through the spherical washer 103 and the clamp arm 100, (2) a pin 105 inserted into one end of the clamp arm 100 to extend through an intermediate portion of the retaining pin 104 along one diametric line, and (3) a screw member 107 threadedly inserted into the clamp arm 100 to engage in an annular engage groove 16 provided in an outer surface of the pin 105. A positioning pin 108 is embedded in one end of the clamp arm 100 and inserted into the damper 101 to determine the position of the damper 101, while permitting a slight looseness.

The clamp-driving cylinder 102 includes a cylinder body 109, which has an axis extending in the direction of the Y-axis and formed into a bottomed cylindrical shape with one end closed, and which has, at the other end, an opening disposed outside the retaining frame 55, a cylinder cap 110 which closes the opening at the other end of the cylinder body 109, and a piston 111 slidably received in the cylinder body 109. The cylinder body 109 and the cylinder cap 110 are commonly fixed to the retaining frame 55 by a plurality of bolts.

A third fluid pressure chamber 113 is defined in the cylinder body 109 between one end wall of the cylinder body 109 and the piston 111, and a fourth fluid pressure chamber 114 is defined in the cylinder body 109 between the cylinder cap 110 and the piston 111. Third and fourth fluid pressure conduits 115 and 116 provided to extend from the fluid pressure dispensing plate 94 of the retaining frame 55 are connected to the cylinder body 109 to individually lead to the third and fourth fluid pressure chambers 113 and 114. Therefore, the application of a fluid pressure to one of the third and fourth fluid pressure chambers 113 and 114 and the releasing of the fluid pressure from the other of the third and fourth fluid pressure chambers 113 and 114 can be switched over from one to another, and the clamp-driving cylinder 102 is operated to reciprocally move the piston 111 in the direction of the Y-axis by the switching-over control of the fluid pressure.

Coaxially connected to the piston 111 are a rod 111a provided fluid-tightly and axially movably through the one end wall of the cylinder body 109, and a rod 111b provided fluid-tightly and axially movably through the cylinder cap 110. A stroke detector 118 is mounted to the cylinder body 109 for detecting a situation of operation of the clamp-driving cylinder 102 by detection of a portion to be detected 117 provided at a tip end of one 111a of these rods. A tip end of the other rod 111b protruding from the cylinder cap 110 is connected to the other end of the clamp arm 100 through a shaft 119 having an axis parallel to the rotational axis 64 of the retaining frame 55.

A bracket 120 is integrally provided on the cylinder cap 110, and a link 122 is connected at one end thereof to the bracket 120 through a shaft 121 parallel to the shaft 119 and at the other end thereof to an intermediate portion of the clamp arm 100 through a shaft 123 parallel to the shafts 119 and 121.

In such clamp means 66, the clamp arm 100 can be operated upwards and downwards by the clamp-driving cylinder 102, and the clamp means 66 is capable of being switched over between a state in which the connecting rod 41 with the larger end 41a and the smaller end 41b put into abutment against the reference support faces 62 and 63 is urged to the reference support faces 62 and 63 by the clamper 101 and fixedly retained on the retaining frame 55, and a state in which the urging of the connecting rod 41 by the damper 101 is released, whereby the retaining of the connecting rod 41 on the retaining frame 55 is released.

Moreover, the clamp means 66 and the clamp-driving cylinder 102 are disposed on the retaining frame 55 in such a manner that in the mounting and removing position SH, the clamper 101 lies above the clamp-driving cylinder 102 and in the processing position SP, the damper 101 lies below the clamp-driving cylinder 102.

Figure 7:
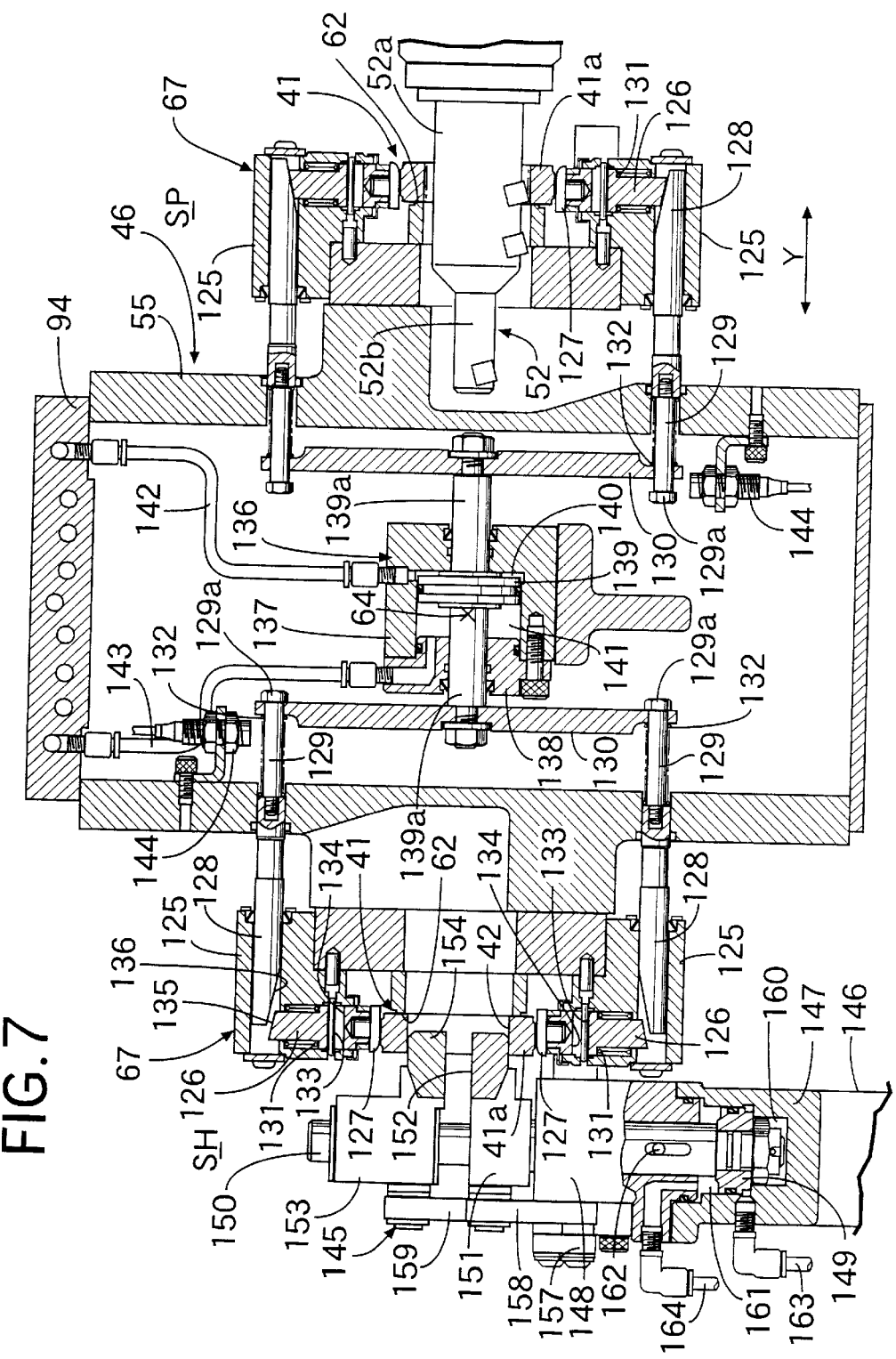
Figure 8:
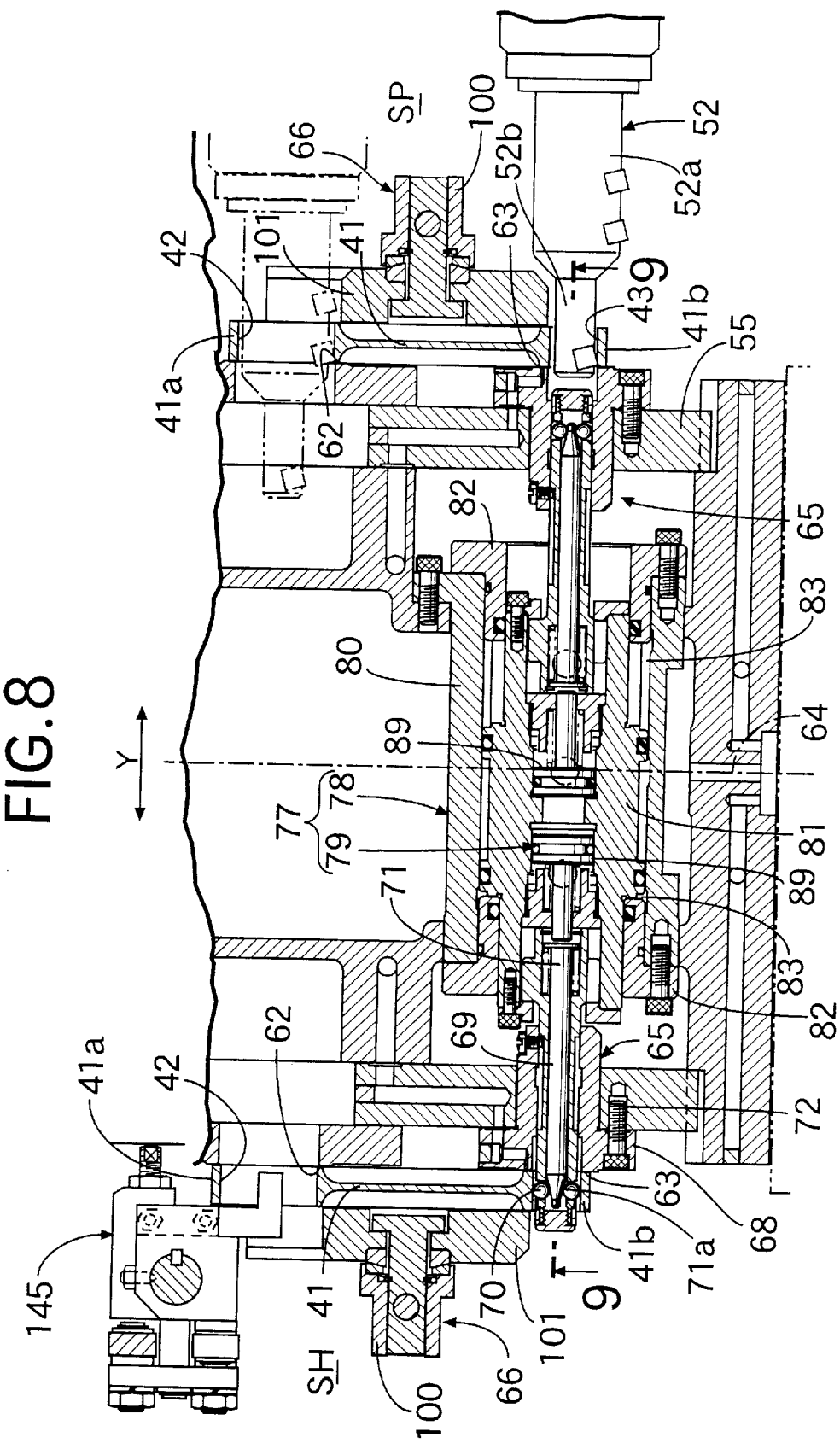

Referring particularly carefully to FIG. 7, the natural lock means 67 is switched over between an unlocking state in which the outer side of the larger end 41a is resiliently retained, while enabling the mounting and removal of the connecting rod 41 by an operator's power, and a locking state in which the larger end 41a is fixedly retained. In this manner, the larger end 41a of the connecting rod 41 is retained.

The natural lock means 67 includes a pair of housings 125, 125 fixed to the retaining frame 55 in such a manner that they are disposed on opposite sides of the larger end 41a in a direction perpendicular to the X-axis and the Y-axis, plungers 126, 126 carried in the housings 125, 125 respectively for movement in a limited region in the direction perpendicular to the X-axis and the Y-axis, abutment members 127, 127 detachably mounted at tip ends of the plungers 126, 126, so that they can be put into abutment against the outer side of the larger end 41a, urging pins 128, 128, each of which is inserted into each of the housings 125, 125 with one end opposed to a rear end of each of the plungers 126, 126, and which are carried on the retaining frame 55 for movement in the direction of the Y-axis, bolts 129, 129 each threadedly engaged at one end with the other end of each of the urging pins 128, 128, a connecting plate 130 through which the other ends of the bolts 129, 129 are inserted for engagement with the enlarged heads 129a, 129a at the other ends of the bolts 129, 129, first springs 131, 131 mounted under compression between the housings 125, 125 and the plungers 126, 126, and second springs 132, 132 mounted under compression between the other ends of the urging pins 128, 128 and the connecting plate 130.

A limiting bore 134 is defined in the plunger 126 to extend along one diametrical line of the plunger 126 and to become long in an axial direction of the plunger 134, and a limiting pin 133 inserted through the housing 125 is passed through the limiting bore 134. Thus, the axial movement of the plunger 126 is limited by the limiting pin 133 and the limiting bore 134. The abutment member 127 is mounted at the tip end of the plunger 126 protruding from the housing 125, but in order to enable replacement of the abutment member 127 depending on the type of the connecting rod 41, the abutment member 127 is detachably mounted to the plunger 126.

The first spring 131 exhibits a spring force for biasing the plunger 126 in a direction to bring the abutment member 127 into abutment against the outer side of the larger end 41a. The spring load of the first spring 131 is set such that in a state in which no urging force is applied from the urging pin 128 to the plunger 126, the first spring 131 exhibits a spring force enough to temporarily clamp the larger end 41a of the connecting rod 41 from opposite sides by the pair of abutment members 127, 127.

A receiving face 135 is formed at a rear end of the plunger 126 and inclined to face to one end of the urging pin 128, and an urging face 136 is formed at one end of the urging pin 128 and inclined in correspondence to the receiving face 135.

The urging pin 128 is axially movably inserted at one end thereof into the housing 125, and axially slidably fitted at the other end thereof into the retaining frame 55. When the urging pin 128 is moved to the axially one end, the urging face 136 is put into abutment against the receiving face 135, whereby the plunger 126 is urged in such a direction that the abutment member 127 at the tip end of the plunger 126 is brought into close contact with the outer side of the larger end 41a.

The second spring 132 is capable of exhibiting a spring force for moving the urging pin 128 to the axial one end, i.e., a spring force for bringing the abutment member 127 into close contact with the outer side of the larger end 41a. As the connecting plate 130 is operated toward the other end of the urging pin 128 in the lengthwise direction of the bolts 129, 129, the second spring 132 is compressed to exhibit the spring force for bringing the abutment member 127 into close contact with the outer side of the larger end 41a. The pair of natural lock means 67, 67 disposed symmetrically with respect to the rotational axis 64 of the retaining frame 55 are driven commonly by a natural lock driving means 136.

The natural lock driving means 136 includes a cylinder 137 which has an axis in the direction of the Y-axis and is formed into a bottomed cylindrical shape with one end closed and which is supported on the retaining frame 55, a cylinder cap 138 which closes an opening at the other end of the cylinder 137, and a piston 139 slidably received in the cylinder 137. Rods 139a, 139a are coaxially connected to opposite ends of the piston 139; fluid-tightly and axially movably passed through one end wall of the cylinder 137 and the cylinder cap 138, and connected to the connecting plates 130, 130 of both the natural lock means 67, 67.

Within the cylinder 137, a fifth fluid pressure chamber 140 is defined between the one end wall of the cylinder 137 and the piston 139, and a sixth fluid pressure chamber 141 is defined between the cylinder cap 138 and the piston 139. Fifth and sixth fluid pressure conduits 142 and 143 extending from the fluid pressure dispensing plate 94 of the retaining frame 55 are connected to the cylinder 137 to individually lead to the fifth and sixth fluid pressure chambers 140 and 141. Therefore, the application of a fluid pressure to one of the fifth and sixth fluid pressure chambers 140 and 141 and the releasing of a fluid pressure from the other of the fifth and sixth fluid pressure chambers 140 and 141 can be switched over, and the natural lock driving means 136 is operated to reciprocally move the piston 139 in the direction of the Y-axis by such fluid pressure switching-over control.

With such natural lock driving means 136, both the natural lock means 67, 67 can be driven in such a manner that one of the pair of natural lock means 67, 67 connected to the natural lock driving means 136, which is adjacent the mounting and removing position SH, is brought into the locking state, and the natural lock means 67 adjacent processing position SP is brought into the unlocking state.

Operation detectors 144 are mounted to the retaining frame 55 for detecting the operated positions of the connecting plates 130 to detect the operational states of the natural lock means 67.

A pair of second positioning means 145, 145 are provided on the side of the retaining frame 55 adjacent the mounting and removing position SH, and are capable of being switched over between locking states in which the larger ends 41a of the pair of connecting rods 41, 41 are positioned by the contact with the inner surfaces of the larger-diameter bores 42 at a plurality of circumferential points, and unlocking states in which the positioning of the larger ends 41a is released, whereby the larger ends 41a are removed out of the larger-diameter bores 42.

Referring to FIGS. 11 to 13B in combination, the second positioning means 145 includes a turnable arm 146 carried at its base end on the retaining frame 55 for upward and downward movement about an axis parallel to the X-axis, a bottomed cylindrical cylinder 147 integrally formed at a tip end of the turnable arm 146, a cylinder cap 148 fastened to the cylinder 147 to close an opened end of the cylinder 147, a piston 149 slidably received in the cylinder 147, a rod 150 coaxially connected to the piston 149 and fluid-tightly and axially movably passed through the cylinder cap 148, a first moving piece 151 fixed to a protrusion of the rod 150 from the cylinder cap 148 at an intermediate location on the protrusion, a first clamper 152 integrally formed on the first moving piece 151, so that it can be inserted into the larger-diameter bore 42 in the connecting rod 41, a second moving piece 153 carried on the rod 150 at a location outer than the first moving piece 151 for movement in an axial direction of the rod 150, a second clamper 154 integrally formed on the second moving piece 153, so that it can be inserted into the larger-diameter bore 42 in the connecting rod 41, a pivotal link 158 pivotally supported at intermediate portion through a shaft 156 perpendicular to an axis of the rod 150, a first link 158 which connects one end of the pivotal link 157 and the first moving piece 151, and a second link 159 which connects the other end of the pivotal link 157 and the second moving piece 153.

Within the cylinder 147, a seventh fluid pressure chamber 160 is defined between a closed wall at one end of the cylinder 147 and the piston 149, and an eighth fluid pressure chamber 160 is defined between piston 149 and the cylinder cap 148. A seventh fluid pressure conduit 163 leading to the seventh fluid pressure chamber 160 is connected to the cylinder 147, and an eighth fluid pressure conduit 164 leading to the eighth fluid pressure chamber 161 is connected to the cylinder cap 148.

A limiting pin 162 is inserted through and fixed in the cylinder cap 148. The limiting pin 162 is passed along one diametrical line through the rod 150, while permitting the axial movement of the rod 150 in a limited region and the rotations of the rod 150 and the piston 149 about an axis are inhibited by the limiting pin 162.

In such second positioning means 145, when the turnable arm 146 is in a righted state, a fluid pressure is applied to the seventh fluid pressure chamber 160. When a fluid pressure is released from the eighth fluid pressure chamber 161, the first and second moving pieces 151 and 152 are moved to positions closer to each other, as shown in FIG. 13a. In this state, it is possible to insert and remove the first and second dampers 152 and 154 into and out of the larger-diameter bore 42.

When the fluid pressure is released from the seventh fluid pressure chamber 160 and the fluid pressure is applied to the eighth fluid pressure chamber 161, the second moving piece 153 is moved away from the first moving piece 151 with movement of the first moving piece 151 toward the cylinder cap 148, so that the first and second lampers 152 and 154 are brought into strong close contact with the inner surface of the larger-diameter bore 42, whereby the larger end 41a of the connecting rod 41 is positioned.

Base ends of the turnable arms 146, 146 in both the second positioning means 145, 145 are connected at right angles to opposite ends of connecting tube 165 having an axis extending along the X-axis, and a rotary shaft 166 are relatively irrotatably inserted into the rotary shaft 165. Thus, the turnable arms 146, 146 of the second positioning means 145, 145 are turned along with the rotary shaft 166.

The rotary shaft 166 is rotatably supported at its opposite ends on shaft supports 167 and 168 mounted on retaining frame 55. An arm 170 is fixed to the rotary shaft 166 at a location closer to one of the shaft supports 167. On the other hand, a cylinder 169 having an axis perpendicular to the axis of the rotary shaft 166, i.e., an axis extending in the direction of the Y-axis is supported on the base 45 through a clevis pin 171, and has a piston rod 169a which is connected to the arm 170. Therefore, the rotary shaft 166 is rotated about its axis by the expansion and contraction of the cylinder 169, whereby the second positioning means 145, 145 are driven upwards and downwards.

To position the connecting rod 41 on the retaining frame 55 in the mounting and removing position SH, such second positioning means 145 is brought into the locking state in which the turnable arm 146 is brought into its righted state to bring the first and second dampers 152 and 154 into abutment with the inner surface of the larger-diameter bore 42 in the connecting rod 41 at two circumferential points to position the larger end 41a of the connecting rod 41. However, before the retaining frame 55 is turned through 180 degrees-to bring the connecting rod 41 to the processing position SP, i.e., before finishing of the larger-diameter bore 42, the positioning means 145 is brought into unlocking state in which the turnable arm 146 is in a tilted-down state, so that the first and second dampers 152 and 154 are retracted from the larger-diameter 42 to release the positioning of the larger end 41a.

A pair of guide rails 174, 174 extending in the direction of the X-axis are mounted on the base 45 adjacent the processing position SP, and a first movable table 175 is disposed above the base 45 and guided in movement in the direction of the X-axis by the guide rails 174, 174. A threaded shaft 176 is mounted in a threadedly engaged manner in the first movable table 175 to extend in the direction of the X-axis between the guide rails 174, 174, and rotatably carried at one end thereof on the base 45, and a motor 177 having a decelerator is fixedly supported on the base and connected to the other end of the threaded shaft 176. Therefore, the first movable table 175 is moved in the direction of the X-axis by rotating the threaded shaft 176 by the motor 177 having the decelerator.

The processing means 48 includes the spindle 47 having an axis extending in the direction of the Y-axis, a drive unit 178 connected to the spindle 47 and capable of rotating the spindle 47 about the axis, and a combination tool 52 mounted at the tip end of the spindle 47. The drive unit 178 is fixed to a second movable table 179 disposed above the first movable table 175.

A pair of guide rails 180, 180 are mounted on the first movable table 175 to extend in a direction along the axes of the larger-diameter and smaller-diameter bores 42 and 43 provided in the connecting rod 41 positioned and retained on the retaining frame 55 in the processing position SP, i.e., in the direction of the Y-axis. The second movable table 179 is capable of being moved along the guide rails 180, 180. Moreover, a threaded shaft 181 is mounted in a threadedly engaged manner in the second movable table 179 to extend in the direction of the Y-axis between the guide rails 180, 180, and rotatably carried at one end thereof on the first movable table 175, and a motor 182 having a decelerator is fixedly supported on the first movable table 175 and connected to the other end of the threaded shaft 181. Therefore, the second movable table 179 is moved in the direction of the Y-axis by rotating the threaded shaft 181 by the motor 182 having the decelerator, and the spindle 47 is disposed on the first movable table 175 for advancing and retracting movement in the axial directions of the larger-diameter and smaller-diameter bores 42 and 43 in the connecting rod 41.

The combination tool 52 is formed into a stepped shape and has a larger-diameter bore 52a for finishing the inner surface of the larger-diameter bore 42 in the connecting rod 41 and a smaller-diameter bore 52b for finishing the inner surface of the smaller-diameter bore 43 in the connecting rod 41, and both the inner surfaces of the larger-diameter and smaller-diameter bores 42 and 43 can be subjected to the finishing treatment by the change in positions of combination tool 52 inserted through the larger-diameter and smaller-diameter bores 42 and 43.

The measuring means 51 comprises the pair of inside-diameter measurers 49 and 50 disposed on a third movable table 183 disposed above the first movable table 175 for individually measuring the inside diameters of the larger-diameter and smaller-diameter bores 42 and 43 in the connecting rod 41 after completion of the finishing treatment, respectively.

A pair of guide rails 184, 184 are mounted on the first movable table 175 at locations displaced in the direction of the X-axis from the pair of guide rails 180, 180 for guiding the processing means 48, and extend in the direction of the Y-axis. The third movable table 183 is guided by the guide rails 184, 184, and moved in the direction of the Y-axis, i.e., in the directions of the axes of the larger-diameter and smaller-diameter bores 42 and 43 in the connecting rod 41 retained on the retaining frame 55 in the processing position SP.

A threaded shaft 185 is mounted in a threadedly engaged manner in the third movable table 183 to extend in the direction of the Y-axis between the guide rails 184, 184, and rotatably carried at one end thereof on the first movable table 175, and a motor 186 having a decelerator is fixedly supported on the base and connected to the other end of the threaded shaft 185. Therefore, the third movable table 183 is moved in the direction of the Y-axis by rotating the threaded shaft 185 by the motor 186 having the decelerator, and the inside-diameter measurers 49 and 50 are disposed on the first movable table 175 for advancing and retracting movements in the directions of the axes of the larger-diameter and smaller-diameter bores 42 and 43 in the connecting rod 41.

Figure 14:
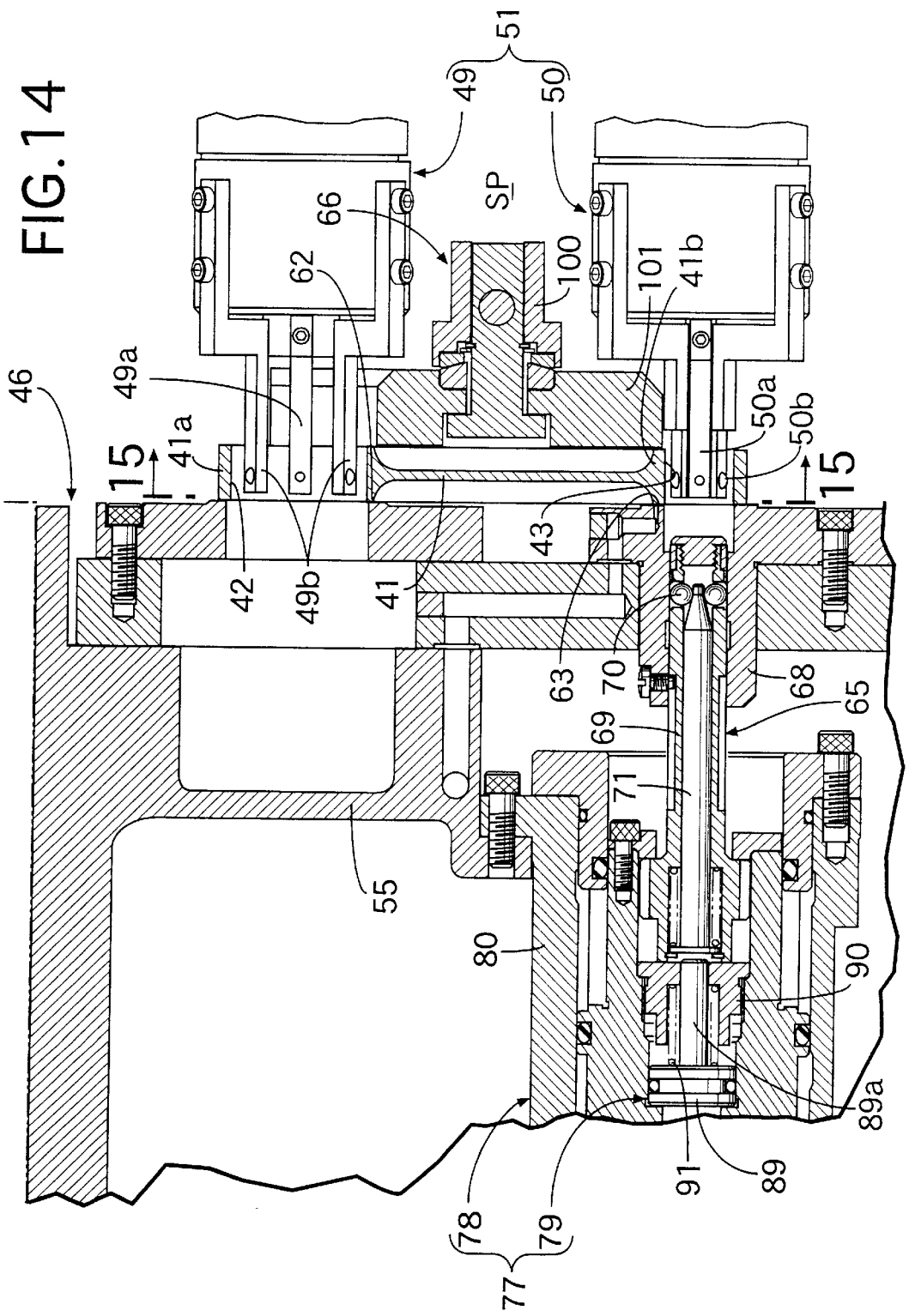
Figure 15:
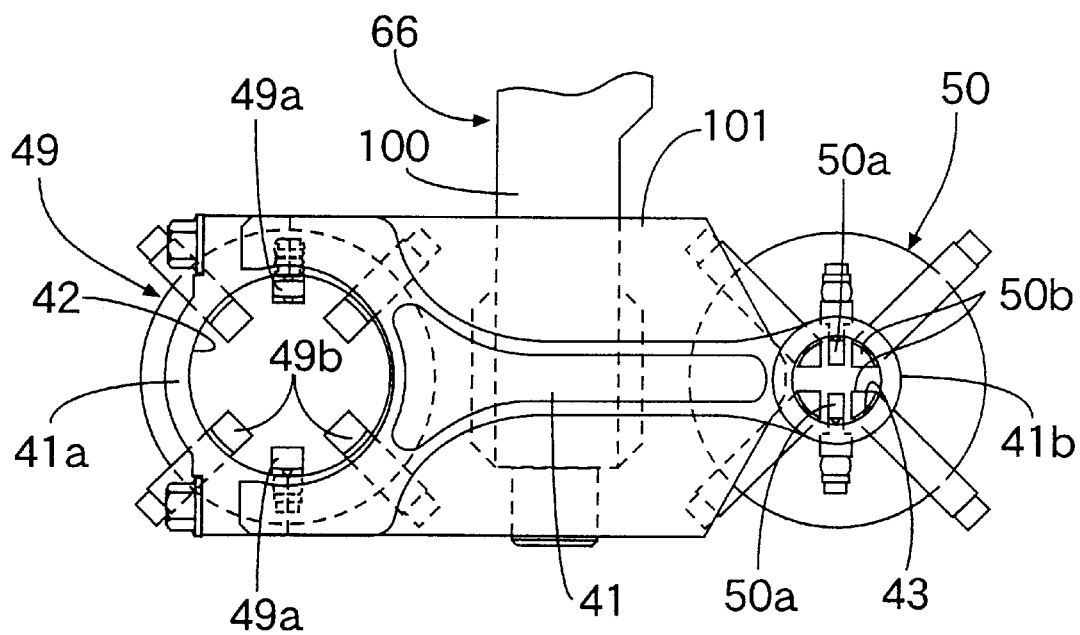

Referring to FIGS. 14 and 15, one of the inside-diameter measurers 49 includes a pair of detectors 49a opposed in proximity to the inner surface of the larger-diameter bore 42 on a diametrical line of the larger-diameter bore 42 in the connecting rod 41 upon insertion of the detectors 49a into the larger-diameter bore 42, and a plurality of guide portions 49b for guiding the insertion and removal of the detectors 49a into and from the larger-diameter bore 42, and the inside diameter of the larger-diameter bore 42 is measured by rotating the detectors 49a about axes.

The other measurer 50 includes a pair of detectors 50a opposed in proximity to the inner surface of the smaller-diameter bore 43 on a diametrical line of the smaller-diameter bore 43 in the connecting rod 41 upon insertion of the detectors 50a into the smaller-diameter bore 43, and a plurality of guide portions 50b for guiding the insertion and removal of the detectors 50a into and from the smaller-diameter bore 43, and the inside diameter of the smaller-diameter bore 43 is measured by rotating the detectors 50a about axes.

The inside-diameter measurer 50 is fixedly disposed on the third movable table 183, while the inside-diameter measurer 49 is movably supported on the third movable table 183, so that the distance from the inside-diameter measurer 49 to the inside-diameter measurer 50 in the direction of the X-axis can be regulated. Thus, it is possible to simultaneously measure the inside diameters of the larger-diameter and smaller-diameter bores 42 and 43 spaced at different distances apart from each other in any of a plurality of types of the connecting rods 41.

The tool stocker 53 includes a disk-shaped rotor 191 rotatable about an axis parallel to the axis of the spindle 47 included in the processing means 48, and is disposed on the base 45 at one end of a moving direction of the processing means 48 along the X-axis.

Referring to FIGS. 16 to 19, an index motor 193 as a rotor driving means having a rotational axis extending in a vertical direction is supported on an upper portion of a support post 192 raised on the base 45. A transmitting box 194 having a transmitting mechanism (not shown) incorporated therein is fixed to the upper portion of the support post 192 at a location adjacent the index motor 193. An output shaft 195 protrudes from the transmitting box 194 and has an axis extending in a direction parallel to the axis of the spindle 47, i.e., in the direction of the Y-axis, and the rotor 191 is coaxially fastened at its center portion to the output shaft 195. A vertically extending input shaft 196 protrudes from an upper end of the transmitting box 194, and the transmitting mechanism transmits a rotational power input from the input shaft 196 in such a manner that it is converted into a power for rotating the output shaft 195 having the axis extending in the direction of the Y-axis and the rotor 191.

The index motor 193 includes a vertically extending rotary shaft 197, and an endless transmitting belt 200 is reeved around a driving pulley 198 mounted at an upper end of the rotary shaft 197, and a follower pulley 199 mounted at an upper end of the input shaft 196. Therefore, the rotor 191 is driven in an indexing manner about an axis extending in the direction of the Y-axis by the rotation of the index motor 193.

Tool grasping means 201 capable of releasably grasping the combination tool 52 are mounted on an outer peripheral portion of the rotor 191 at most of a plurality of points circumferentially spaced at equal distances apart from one another, e.g., at most of nine points excluding a particular one point (at eight points in the present embodiment). A spindle cleaning mans 202 capable of cleaning the tip end of the spindle 47 is mounted at the particular one point.

An exchanging position SC, where the tip end of the spindle 47 in the processing means 48 can be disposed, is established outside the rotor 191, and the index motor 193 drives the rotor 191 in the indexing manner such that one of the plurality of tool grasping means 201 and the spindle cleaning means 202 is alternatively brought into the exchanging position SC.

Figure 20:
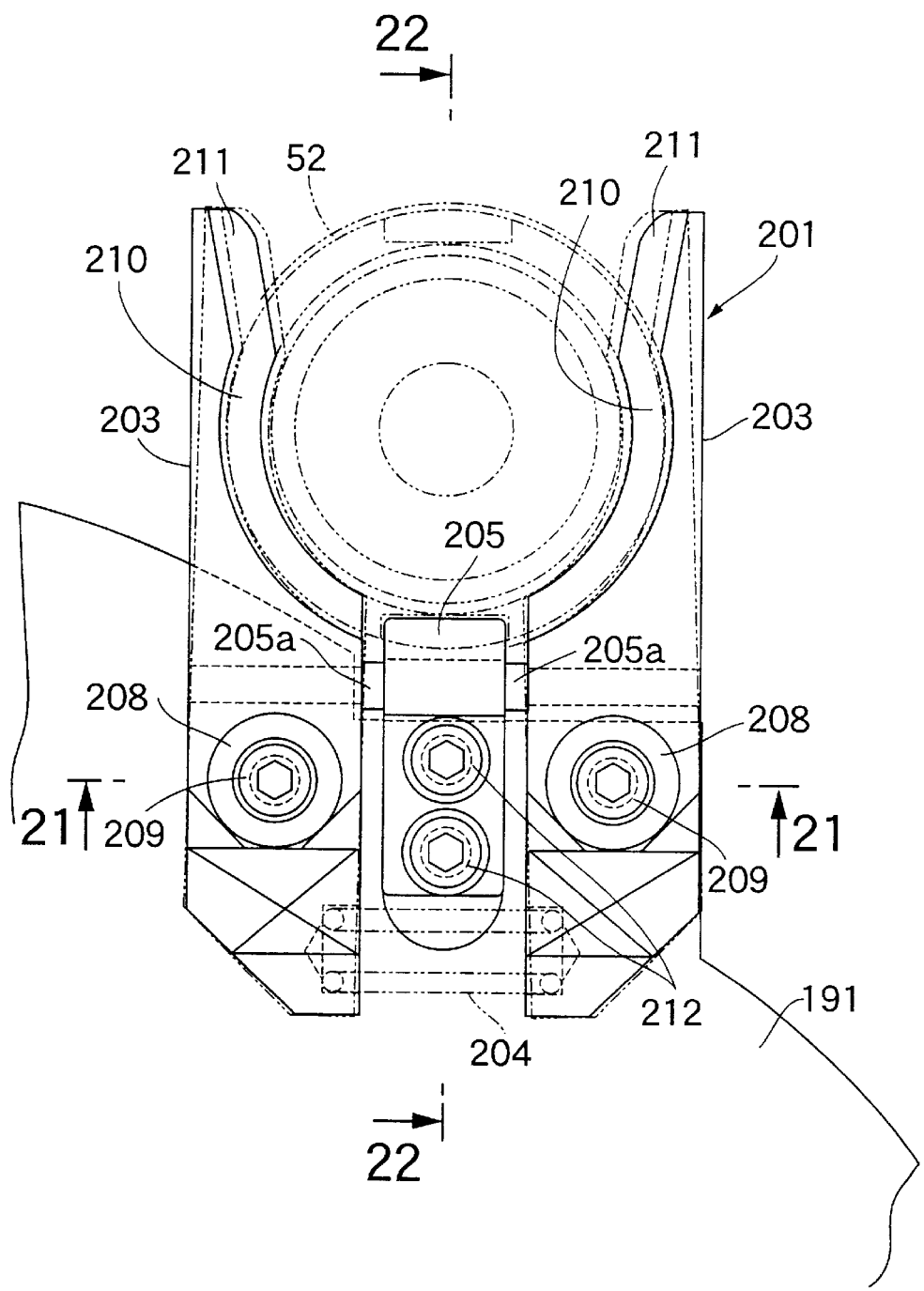
Figure 21:
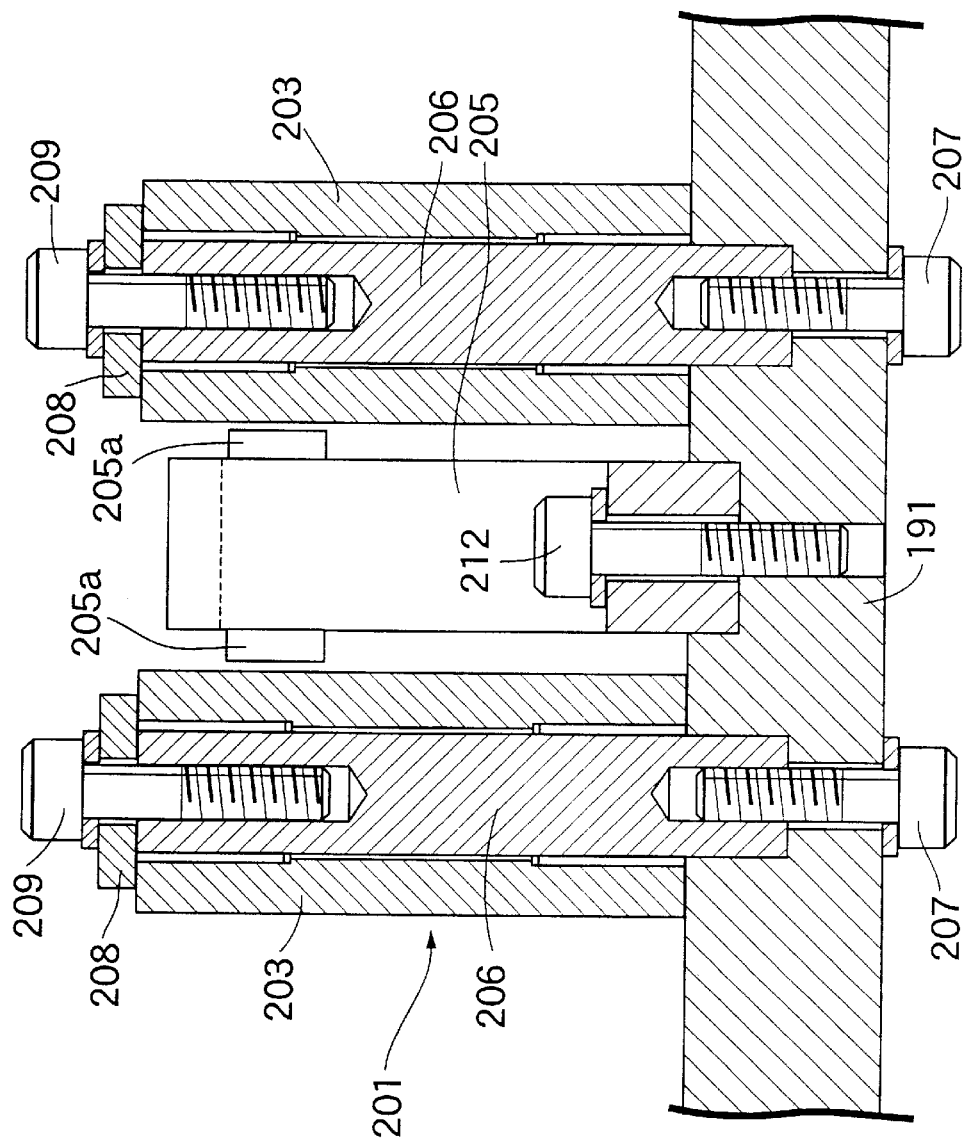
Figure 22:
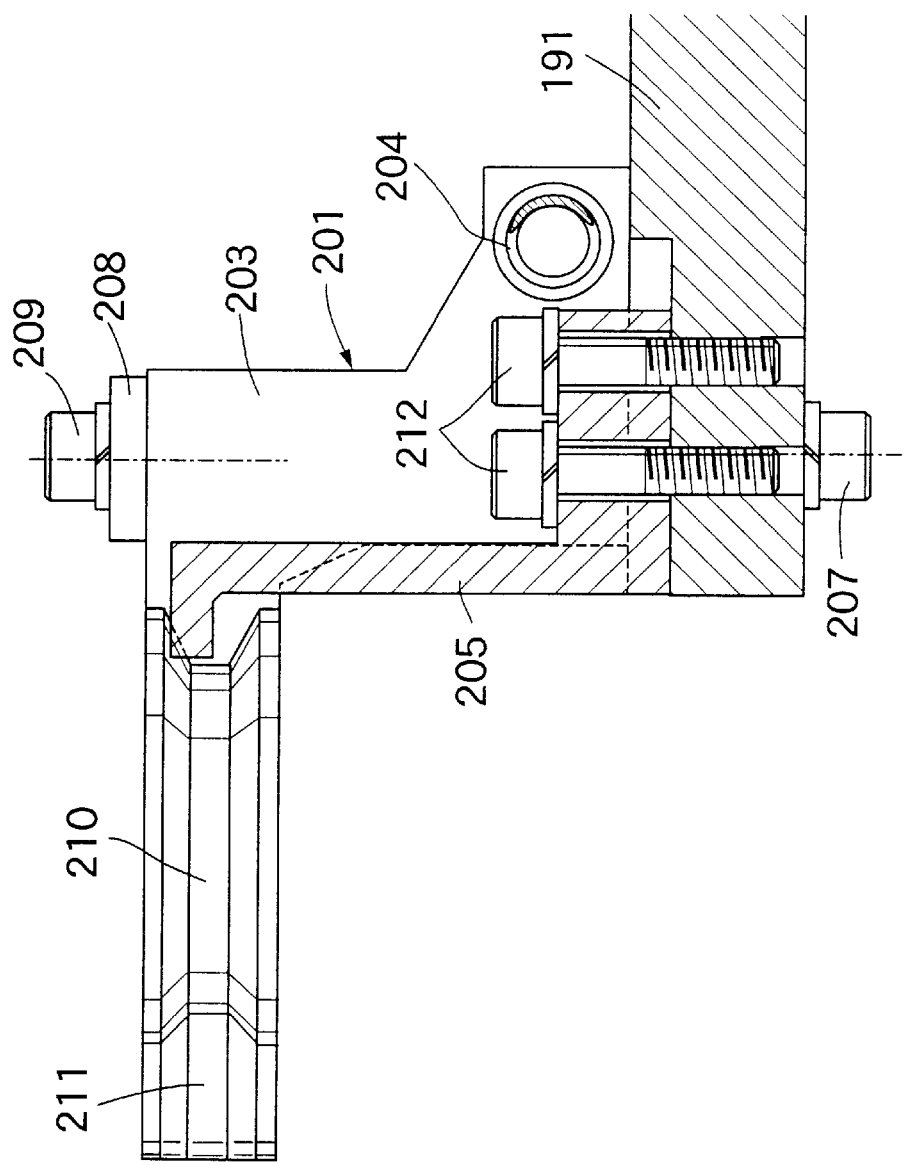

Referring to FIGS. 20 to 22, the tool grasping means 201 includes a pair of grasping arms 203, 203 turnably carried on the rotor 191 and capable of clamping the combination tool 52 from opposite sides, a spring 204 for biasing the grasping arms 203, 203 in directions to clamp the combination tool, a stopper 205 fastened to the rotor 191 between both the grasping arms 203, 203.

A pair of support shafts 206, 206 each having an axis parallel to the rotor 191 are fixed at their base ends to the rotor 191 by bolts 207, 207, and the grasping arms 203, 203 are supported at their intermediate portions on the rotor 191 through the support shafts 206, 206. Moreover, disk-shaped limiting plates 208, 208 are fastened to tip ends of the support shafts 206, 206 by bolts 209, 209 for inhibiting the leaving of the grasping arms 203, 203 from the support shafts 206, 206.

One end of each of the grasping arms 203, 203 protrudes outwards from the rotor 191, and opposed portions of the grasping arms 203, 203 on one-end sides are provided with grasping portions 210, 210 which are each formed into an arcuate as shape such that they can be fitted into annular grooves (not shown) provided in the combination tool 52 to grasp the combination tool 52 from the opposite sides, and guide portions 211, 211 each connected to one end of each of the grasping portions 210, 210 and extending rectilinearly. Each of the grasping portions 210, 210 and the guide portions 211, 211 is formed to have a trapezoidal cross-sectional shape. Moreover, the guide portions 211, 211 are formed in an inclined fashion such that they are more spaced apart from each other as they go farther from the grasping portions 210, 210, in order to facilitate the insertion into and removal from the grasping portions 210, 210 of the combination.

The spring 204 is mounted under compression between the other ends of the grasping arms 203, 203 and the grasping arms 203, 203 are biased by the spring 204 in directions away from each other, i.e., in directions to grasp the combination tool 52 by the grasping portions 210, 210.

The stopper 205 is fastened to the rotor 191 by a pair of bolts 212, 212 and the end of insertion of the combination tool 52 into between one-end portions of the grasping arms 203, 203 is defined by the stopper 205. Limiting protrusions 205a, 205a are integrally provided in a projecting manner on opposite sides of the stopper 205 and each capable of being put into abutment against a side of each of the grasping arms 203, 203 at one end thereof to define an end of turning movement of each of the grasping arms 203, 203 biased by the spring 204.

Figure 17:
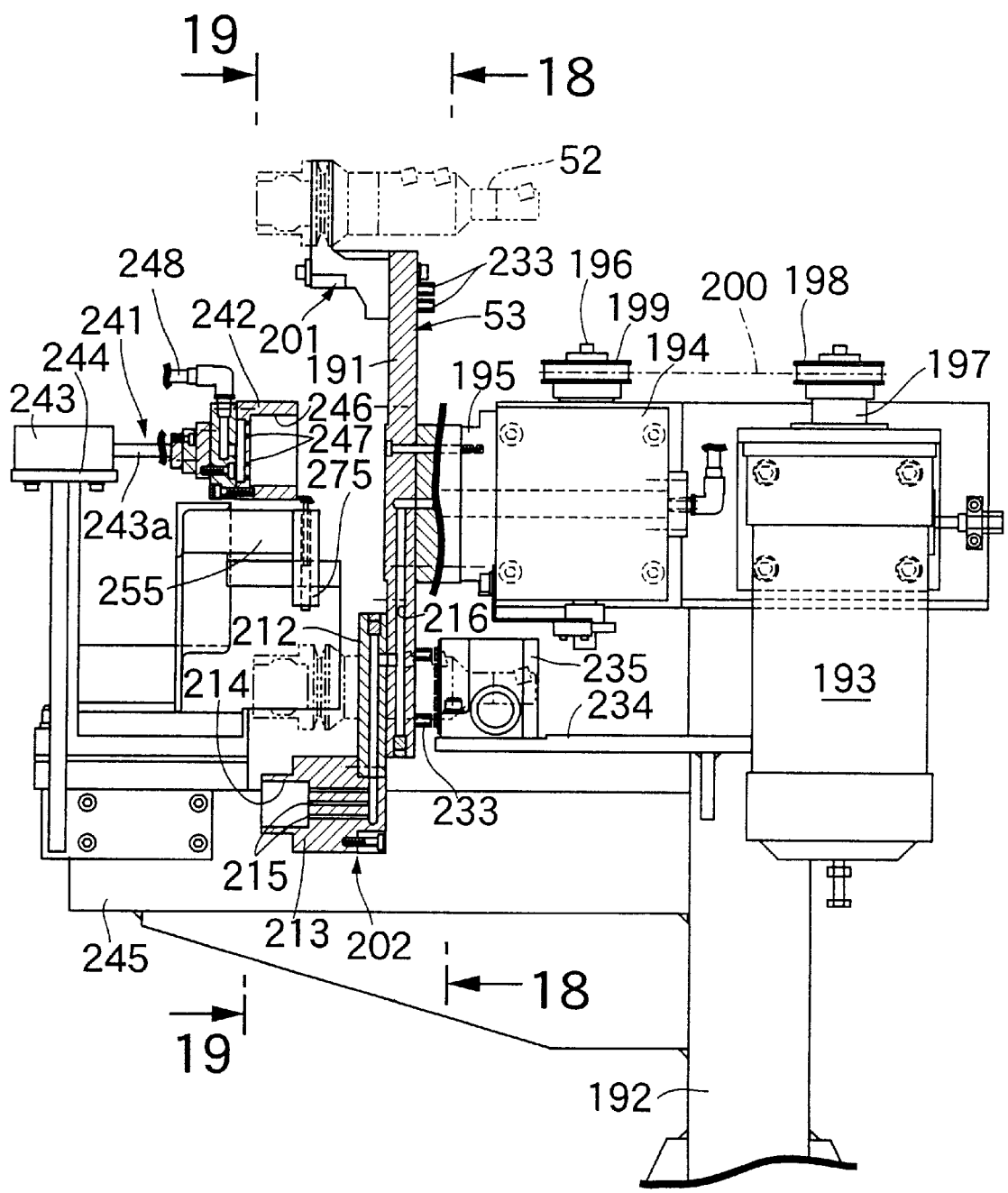
Figure 18:
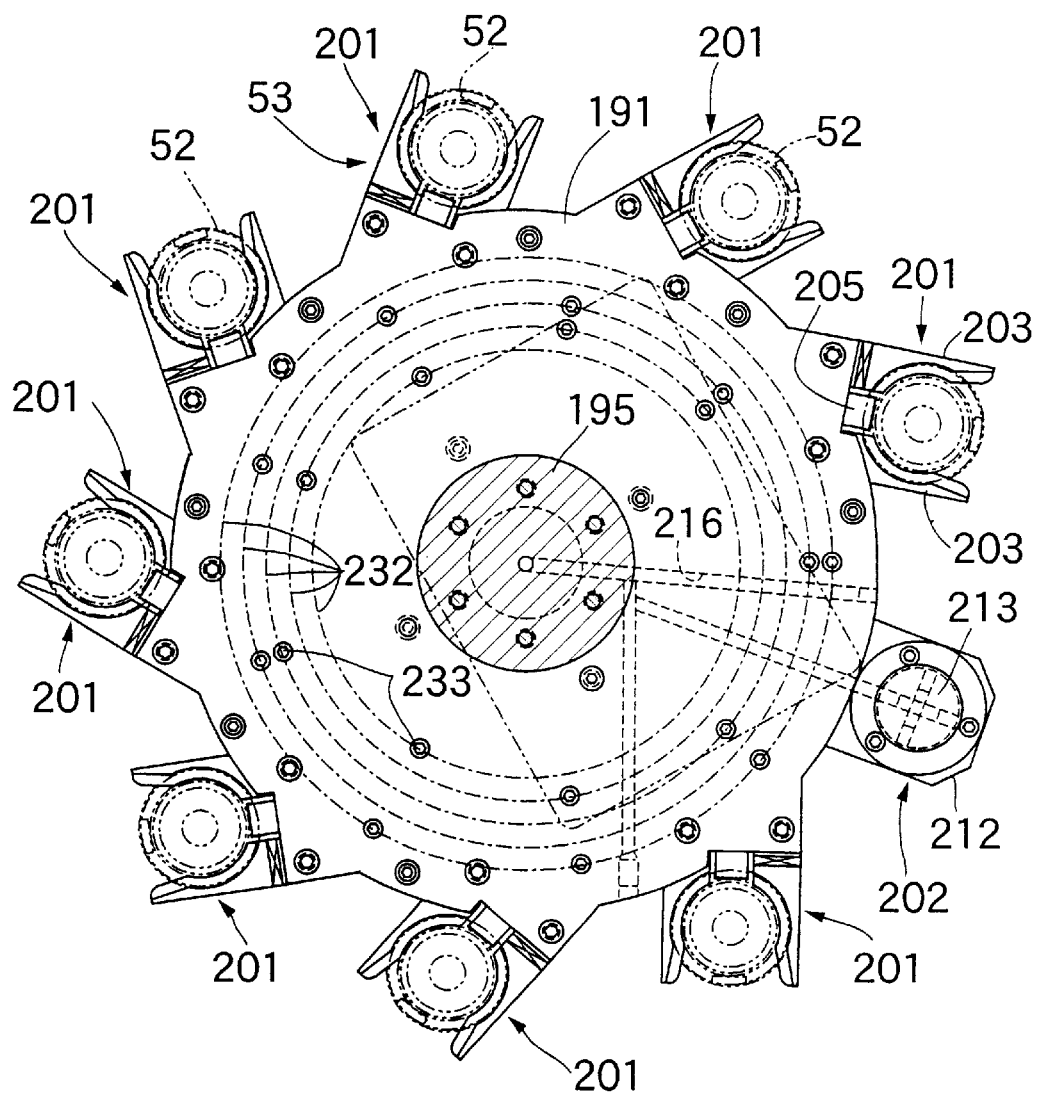
Figure 19:
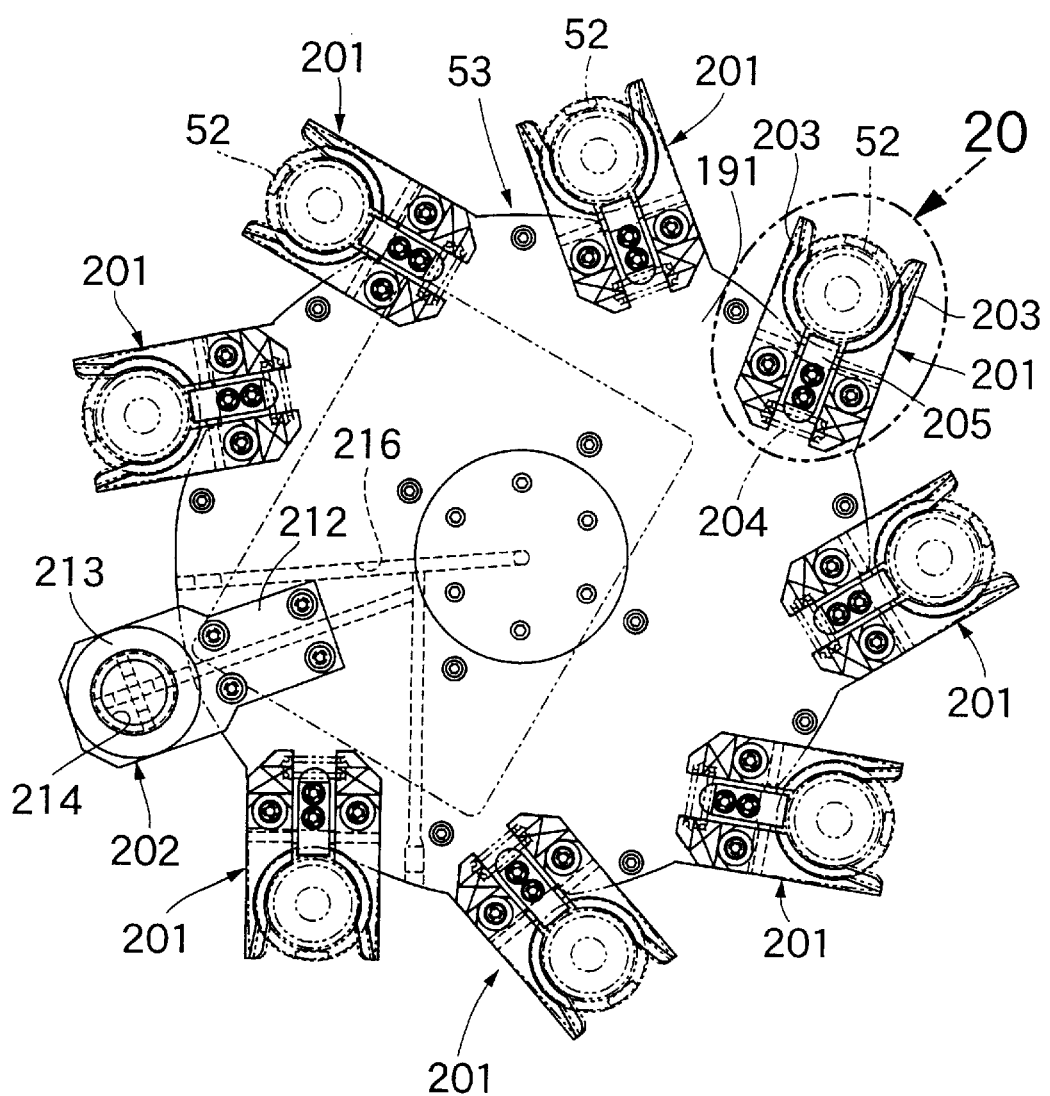

Referring particularly carefully to FIGS. 17 and 19, the spindle cleaning means 202 includes a support plate 212 fastened to the rotor 191 to partially protrude outwards of the rotor 191, and a cleaner 213 fastened to an outer end of the support plate 212 and having a bottomed insertion hole 214 into which the tip end of the spindle 47 can be inserted.

The cleaner 213 is provided with a plurality of air ejection bores 215 which open into an inner surface of the insertion bores 214, and an air passage 216 is provided in the cleaner 213, the support plate 212, the rotor 191 and the output shaft 195 to lead to the air ejection bores 215, and compressed air can be supplied from a compressed-air supply source (not shown) into the air passage 216.

When the spindle 47 with no combination tool 52 mounted thereto is brought into the exchanging position SC and advanced in the direction of the Y-axis in a state the spindle cleaning means 202 has been disposed in the exchanging position SC, and the compressed air is supplied into the air passage 216 in a state in which the tip end of the spindle 47 has been inserted into the insertion hole 214, the tip end of the spindle 47 can be cleaned by the compressed air ejected from the air ejection bores 215, whereby chips, an cutting oil and the like deposited on the tip end of the spindle 47 can be removed.

A plurality of phantom circles 232 about the rotational axis of the rotor 191 and having different radii are established on a surface of the rotor 191 adjacent the transmitting box 194, and pins to be detected 233 are embedded in the rotor 191 on the phantom circles 232. Moreover, the pins to be detected 233 are embedded at selected some of a plurality of points circumferentially spaced apart from one another on each of the phantom circles 232 at distances equal to the circumferential distances determined between the tool grasping means 201 and the spindle cleaning means 202. A pin detector 235 for detecting the pins to be detected 233 is disposed on a support arm 234 protruding from the support post 192 toward the rotor 191.

Thus, it is possible to confirm that which of the plurality of tool grasping means 201 and the spindle cleaning means 202 has been brought into the exchanging position SC, by the combination of the pins 233 to be detected on each of the phantom circles 233 by the pin detectors 235.

A tool cleaning means 241 is mounted in association with the tool stocker 53 and capable of cleaning a rear portion of one of the plurality of combination tools stocked ion the tool stocker 53, i.e., a portion to be mounted to the spindle 47.

Figure 16:
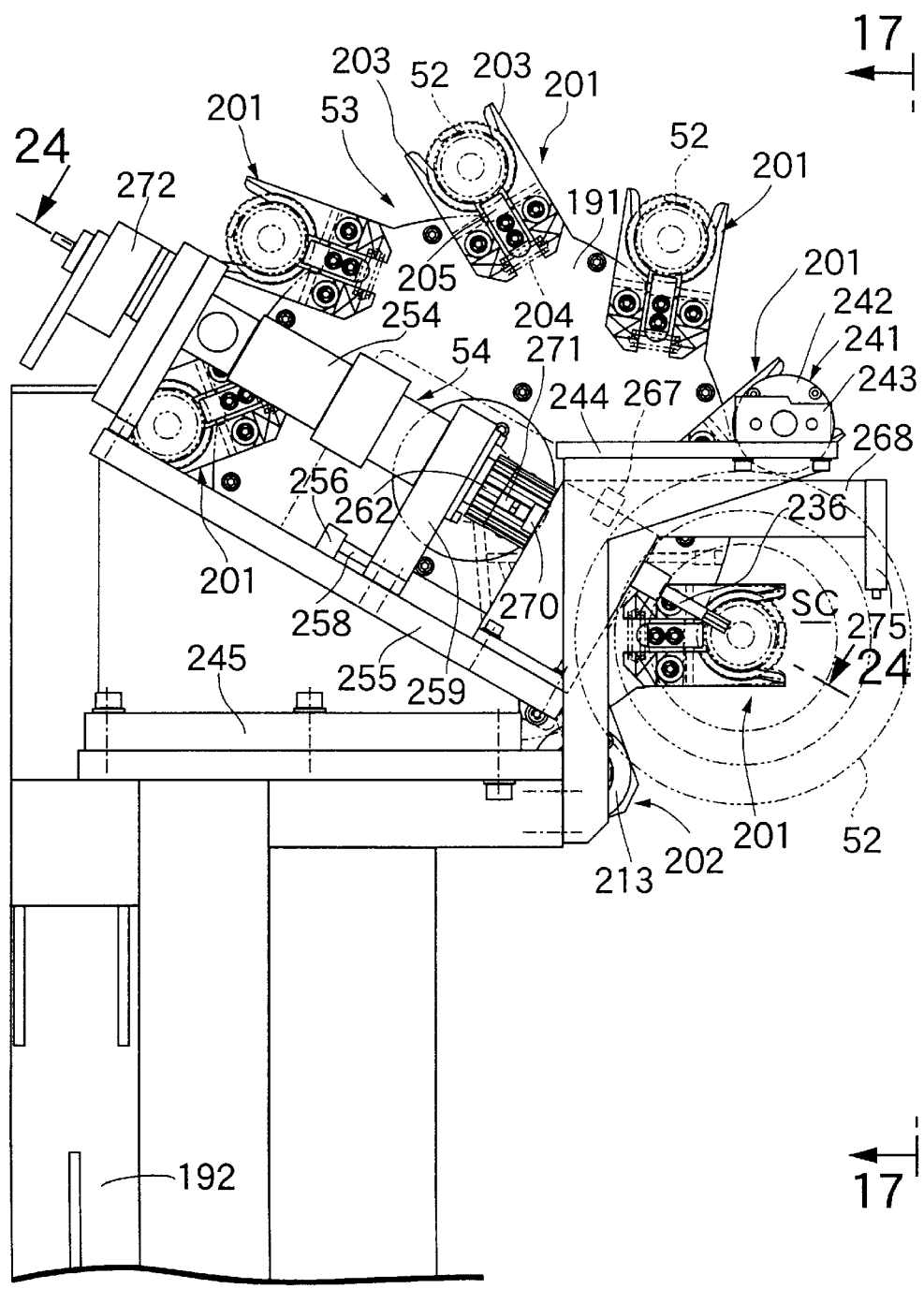

Referring particularly carefully to FIGS. 16 and 17, the tool cleaning means 241 includes a cleaner 242 disposed in an opposed relation to the rotor 191 on a side opposite from the transmitting box 194, and a cylinder 243 which is disposed on a side opposite to the rotor 191 with respect to the cleaner 242 and includes a piston rod 243a having an axis extending in the direction of the Y-axis and connected to the cleaner 242.

The cylinder 243 is fixedly disposed on a support 244, which is secured to a support frame 245 protruding sideways from the support post 192 to extend upwards from a tip end of the support frame 245.

Provided in a surface of the cleaner 242 opposed to the rotor 191 are a bottomed insertion hole 246, into which the rear portion of the combination tool 52 can be inserted, and a plurality of air ejection bores 247 which open into an inner surface of the insertion hole 246. An air supply pipe 248 leading commonly to the air ejection bores 247 is connected to the cleaner 242, and compressed air can be supplied from a compressed-air supply source (not shown) into the air supply pipe 248. Such tool cleaning mans 241 is disposed in the circumferential direction of the rotor 191 in correspondence to a combination tool 52 lying in the exchanging position SC or a combination tool 52 lying in a position adjacent to the spindle cleaning means 202, when one of the plurality of combination tools 52 in the tool stocker 53 and the spindle cleaning means 202 has been brought into the exchanging position SC. Thus, the rear portion of the combination tool 52 can be cleaned to remove chips, a cutting oil and the like, by advancing the cleaner 242 toward the combination tool 52 by the action of the cylinder 243 and supplying the compressed air through the air supply pipe 248 to each of the air ejection bores 247 to eject the compressed air in a state in which the rear end of the combination tool 52 has been inserted into the insertion hole 246.

Figure 23A:
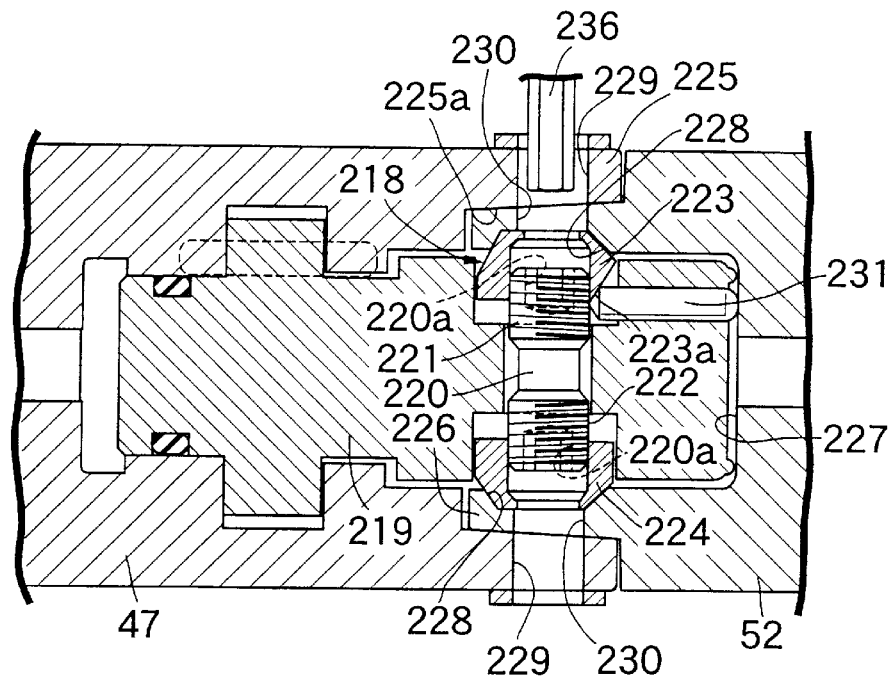
FIGS. 23A and 23B are sectional views showing a cam clamp mechanism at a tip end of a spindle.
Figure 23B:
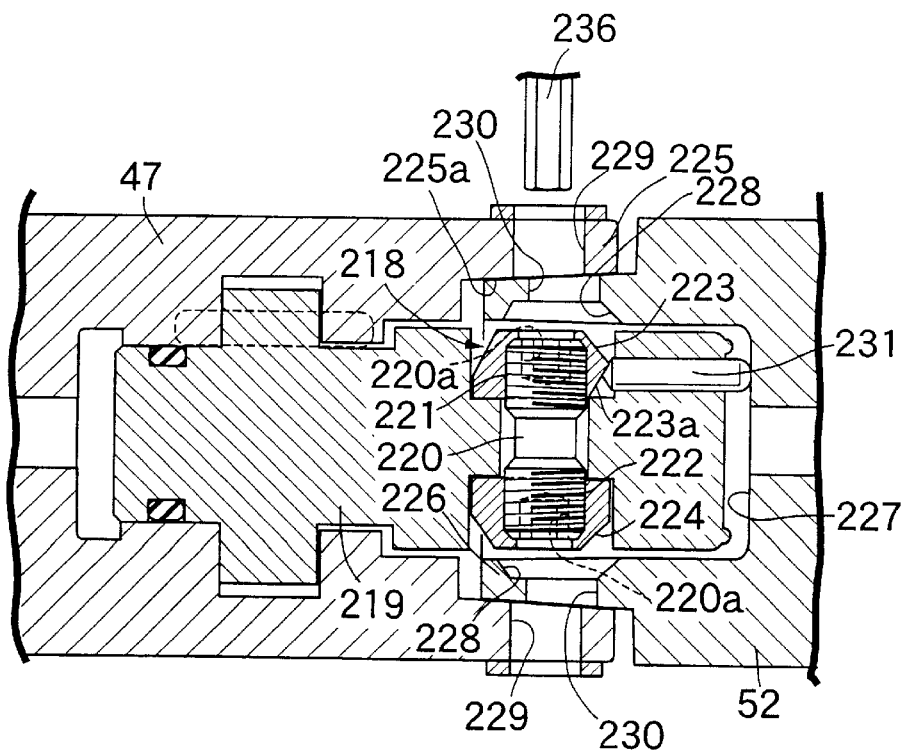

In FIGS. 23A and 23B, a cam clamp mechanism 218 is provided at the tip end of the spindle 47 and capable of being switched over between a clamping state in which it clamps the combination tool 52 and an unclamping state in which the clamping of the combination tool is released.

The cam clamp mechanism 218 includes a support 219 mounted at the tip end of the spindle 47 for non-rotation about an axis and non-movement in an axial direction, a clamp bolt 220 which has an axis perpendicular to the axis of the spindle 47 and which is rotatably supported at an intermediate portion of the support 219 and has external threads 221 and 222 provided on an outer surface at its opposite ends, and nuts 223 and 224 supported on the support 219 against rotation about axes but for movement in an axial direction and threadedly fitted over the external threads 221 and 222.

The spindle 47 is integrally provided at its tip end with a cylindrical portion 225, which surrounds an area where the nuts 23 and 224 are disposed. The cylindrical portion 225 has an inner surface 225a, which is formed into a tapered shape such that the diameter thereof is increased gradually toward the combination tool 52. On the other hand, the combination tool 52 is coaxially provided at its rear end with an insertion tube 226 formed into cylindrical shape and having a tapered outer surface corresponding to the inner surface 225a of the cylindrical portion 225, and a recess 227 into which a tip end of the support 219 can be inserted. Moreover, fitting recesses 228 are provided in an inner surface of the insertion tube 226, into which the nuts 223 and 224 can be fitted respectively.

The cylindrical portion 225 at the tip end of the spindle 47 is provided with insertion bores 229, 229 coaxial with the clamp bolt 220, and the insertion tube 226 at the rear end of the combination tool 52 is provided with insertion bores 230, 230 which is connected to the insertion bores 229, 229 upon insertion of the insertion tube 226 into the cylindrical portion 225.

The clamp bolt 220 is provided at its opposite end face with engage holes 220a, 220a into which a tip end of a wrench 236 can be engaged. When the wrench 236 inserted through one of sets of the insertion bores 229 and 230 with the insertion tube 226 inserted in the cylindrical tube 225 is engaged into one of the engage holes 220a and rotated in a normal direction, as shown in FIG. 23A, the nuts 223 and 224 are moved in a direction away from each other and fitted into the fitting recesses 228 by the normal rotation of the clamp bolt 220, whereby the cam clamp 218 is brought into the clamping state and thus, the combination tool 52 can be mounted to the tip end of the spindle 47.

When the wrench 236 inserted through the one set of the insertion bores 229 and 230 is engaged into the one engage hole 220a and rotated in a reverse direction in the clamping state, the nuts 223 and 224 are moved in a direction coming close to each other by the reverse rotation of the clamp bolt 220 and removed out of the fitting recesses 228, whereby the cam clamp mechanism 218 is brought into the unclamping state, and thus, the combination tool 52 can be removed from the tip end of the spindle 47.

One 223 of the nuts 223 and 224 is provided with a cam face 223a, and a push-out pin 231 is axially movably retained at a tip end of the support 219 to abut at its one end against the cam face 223a. The other end of the push-out pin 231 is capable of being put to abut against a closed end of the recess 227 in the rear end of the combination tool 52. The cam face 223a is formed, so that its urges the push-out pin 231 forwards, i.e., toward the combination tool 52 by the movement of the nut 223, when the cam clamp mechanism 218 is changed from the clamping state to the unclamping state. In the unclamping state, the combination tool 52 is pushed out in a direction away from the spindle 47 by the push-out pin 231.

Figure 24:
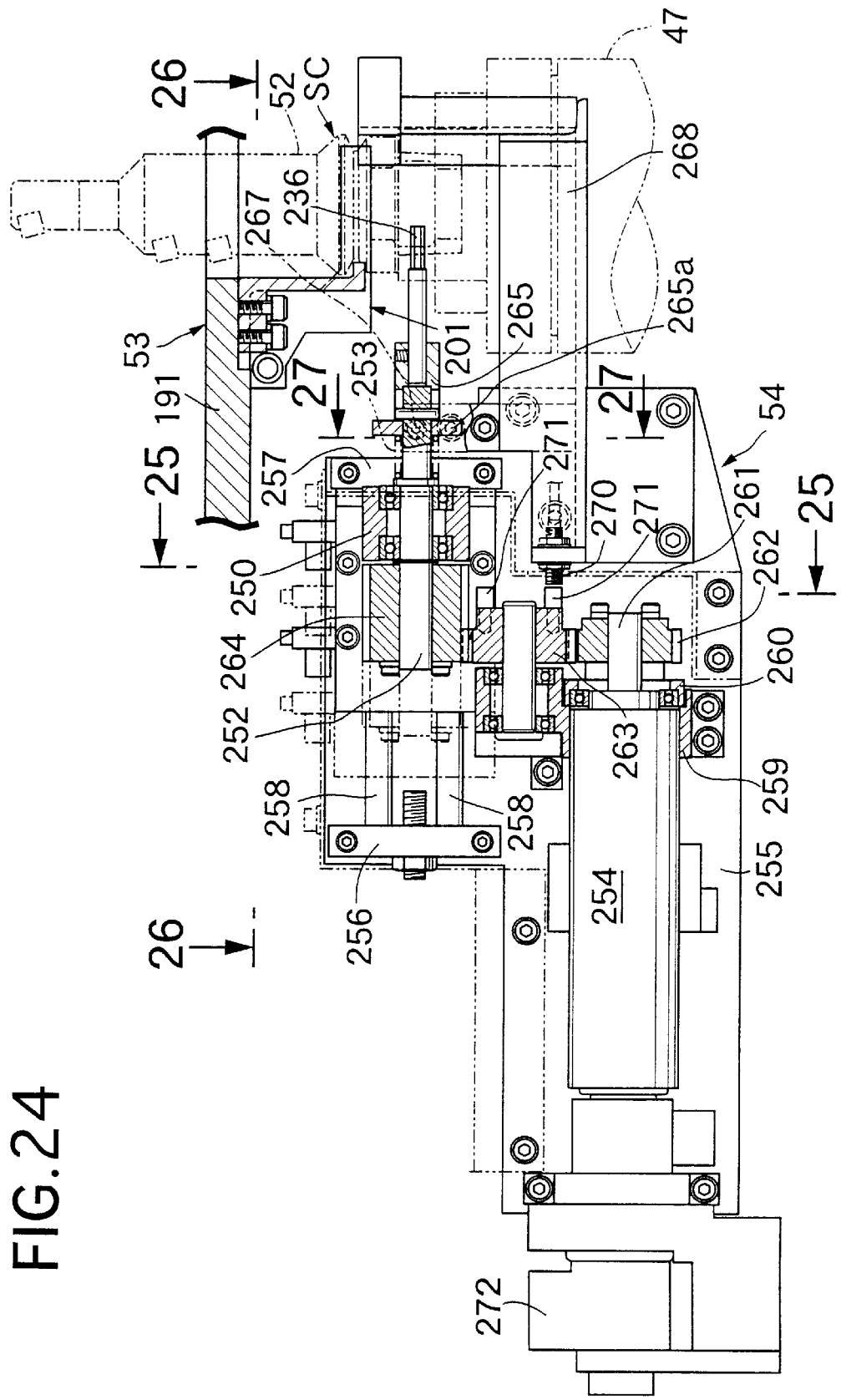
Figure 25:
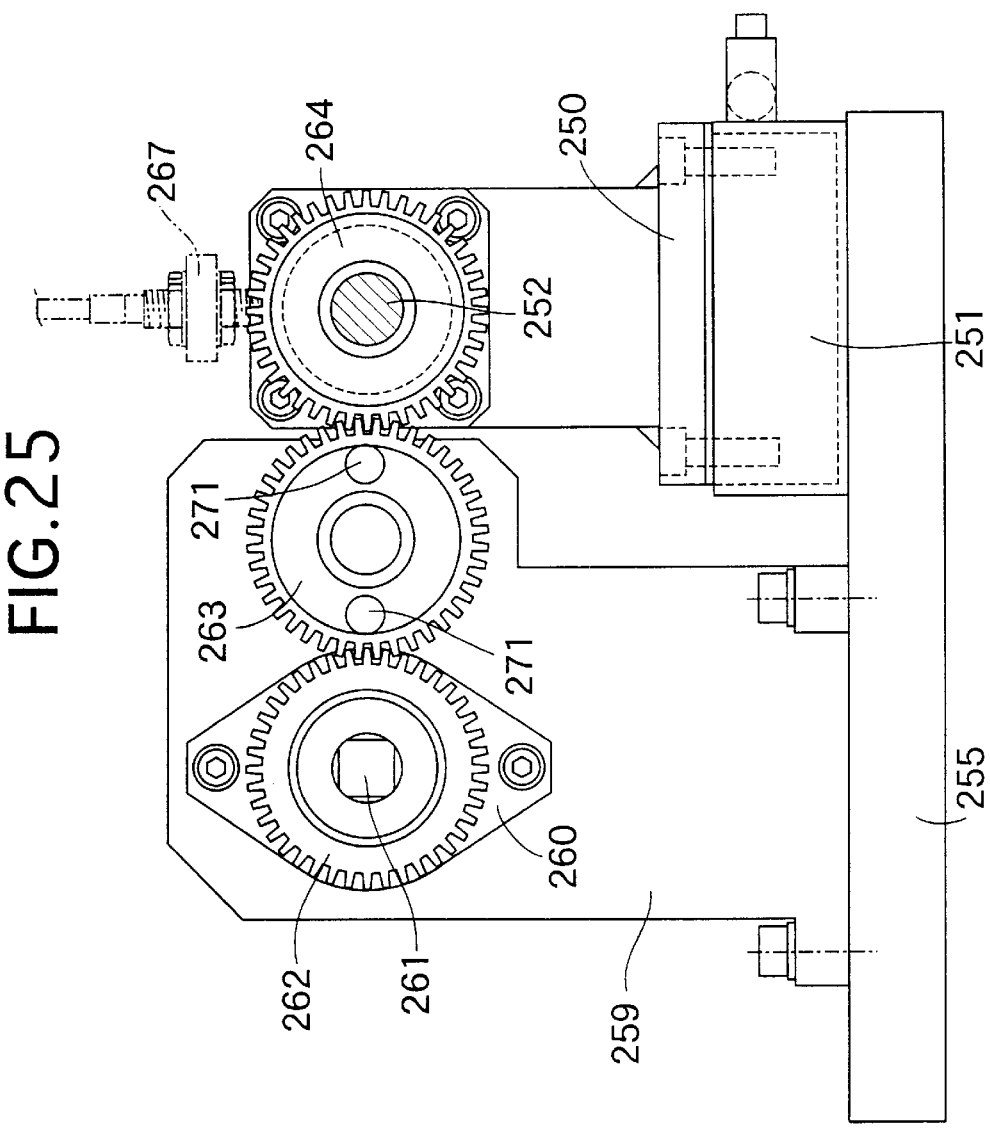
Figure 26:
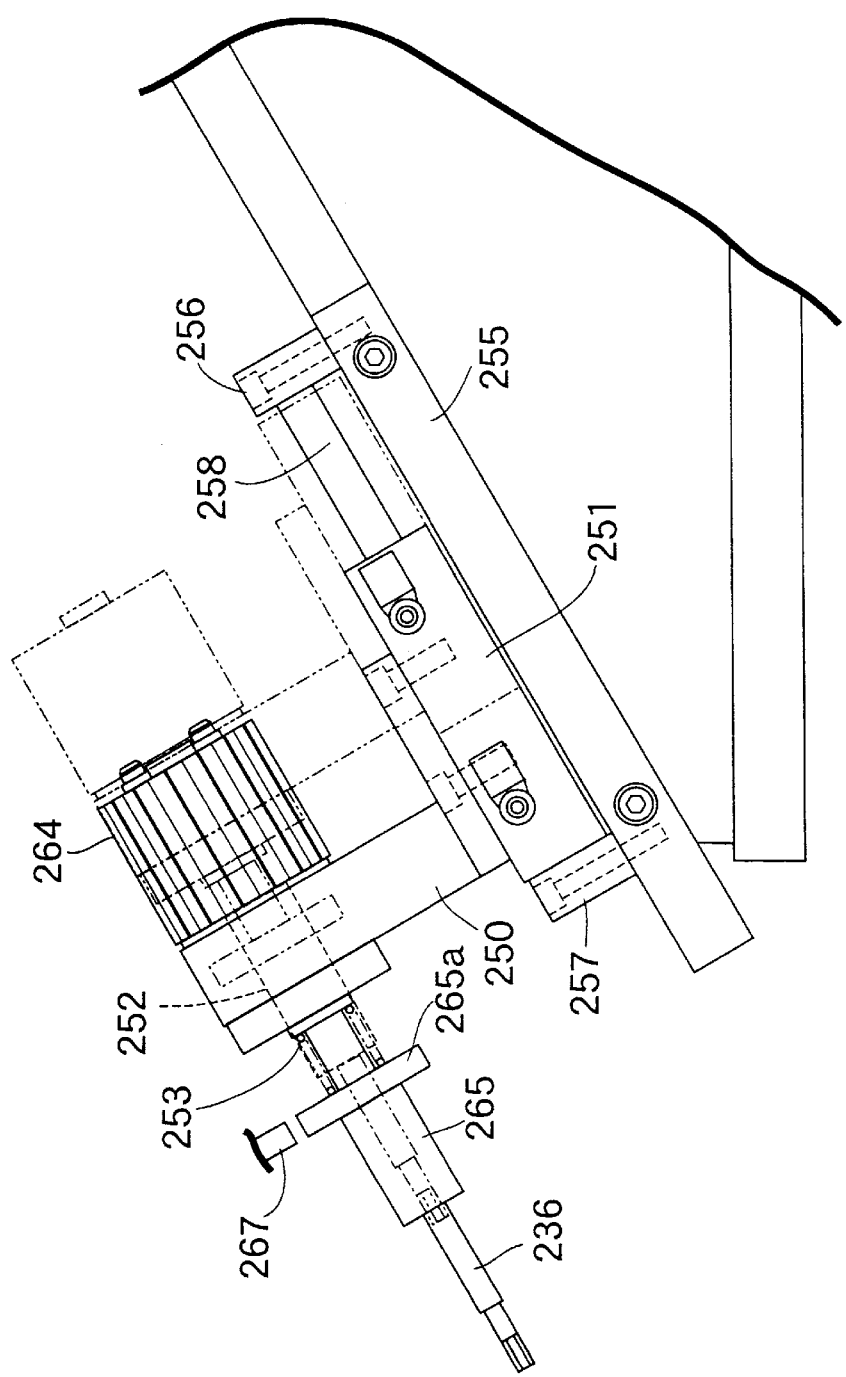

Referring to FIGS. 24 to 26, the tool-mounting and removing unit 54 includes a moving member 250 capable of being reciprocally moved in a direction perpendicular to the rotational axis of the spindle 47 in the exchanging position SC into the cam clamp mechanism 218 of the spindle 47 can be brought, and a cylinder 251 as a moving-member drive means for reciprocally driving the moving member 250, a rotary shaft 252 carried in the moving member 250 for rotation about an axis perpendicular to the rotational axis of the spindle 47, a wrench 236 coaxially connected at its base end to one end of the rotary shaft 252 against relative rotation about the axis of the rotary shaft 252 and for relative movement in a limited region in an axial direction of the rotary shaft 252, a spring 253 mounted under compression between the base end of the wrench 236 and the one end of the rotary shaft 252, and a nut runner 254 as a rotary shaft drive means capable of rotating the rotary shaft 252 in either normal and reverse directions irrespective of the moved position of the moving member 250.

A support plate 255 is mounted on the support frame 245 in parallel to a plane including the rotational axis of the spindle 47 lying in the exchanging position SC and the rotational axis of the rotor 191 in the tool stocker 53. A rod support member 256 and a limiting member 257 are secured to the support plate 255 at a distance in a direction perpendicular to the rotational axis of the spindle 47 lying in the exchanging position SC. The cylinder 251 is disposed on the support plate 255 between the rod support member 256 and the limiting member 257, and a pair of piston rods 258, 258 included in the cylinder 251 are secured to the rod support member 256. Therefore, the cylinder 251 is moved in a direction perpendicular to the rotational axis of the spindle 47 lying in the exchanging position SC in response to the expansion and contraction of the cylinder 251, and an end of movement of the cylinder 251 toward the spindle 47 is defined by the limiting member 257.

The moving member 250 is fixed to the cylinder 251 and is moved together with the cylinder 251 in the direction perpendicular to the rotational axis of the spindle 47 in response to the expansion and contraction of the cylinder 251.

The nut runner 254 is fixedly disposed on the support plate 255 and has a rotational axis parallel to the directions of movement of the cylinder 251 and the moving member 250. A shaft support member 259 for supporting a rotary shaft 261 of the nut runner 254 is fastened to a support member 259, which is fastened to the support plate 255 in such a manner that one end of the nut runner 254 is supported thereon. The rotary shaft 252 is rotatably carried in the moving member 250 for non-movement in the axial direction thereof, and protrudes at one end thereof from the moving member 250 toward the spindle 47 in the exchanging position SC.

A drive gear 262 is fixed to the output shaft 261 of the nut runner 254, and an idle gear 263 is rotatably carried on the support member 259 and meshed with the drive gear 262. A driven gear 264 is fixed to the other end of the rotary shaft 252 and meshed with the idle gear 263. Moreover, the driven gear 263 is formed to have a width larger than an axial width of the idle gear 263 such that the meshed state of the idle gear 263 is maintained irrespective of the movement of the moving member 250. Therefore, the nut runner 254 is capable of rotating the rotary shaft 252 in either normal and reverse directions irrespective of the moved position of the moving member 250.

The base end of the wrench 263 is fixed to a connecting member 265, and the rotary shaft 252 is connected at one end thereof to the connecting member 265 for relative movement in a limited region in an axial direction but against relative rotation about the axis. The spring 253 is mounted under compression between the connecting member 265 secured to the base end of the wrench 236 and the one end of the rotary shaft 252. Namely, the one end of the rotary shaft 252 is coaxially connected to the base end of the wrench 236 against relative rotation about the axis of the rotary shaft 252 and for relative movement in the limited region in the axial direction of the rotary shaft 252, and the spring 253 exhibits a spring force for biasing the wrench 236 toward the spindle 47 in the exchanging position SC.

Figure 27:
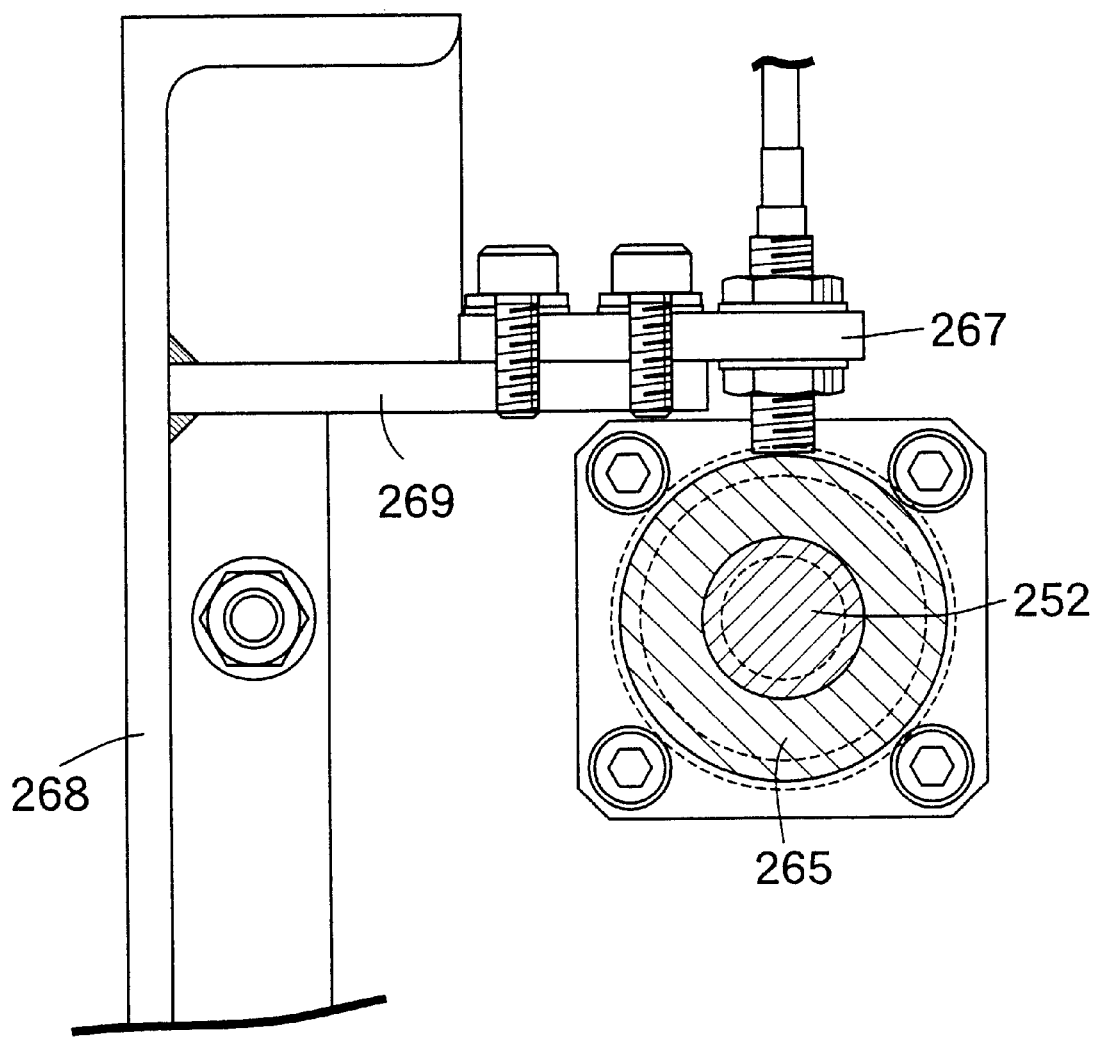

With such structure of connection between the wrench 263 and the rotary shaft 252, when the rotary shaft 252 has been advanced toward the spindle 47 in order to switch over the clamping state and the unclamping state of the cam clamp mechanism 218 provided at the tip end of the spindle 47 from one to another, the connecting member 265 is advanced to a predetermined position without compression of the spring 253 in a state in which the tip end of the wrench 236 inserted through the insertion bores 229 and 230 has been brought into engagement with the clamp bolt 220. However, when the tip end of the wrench 236 could not be brought into engagement with the clamp bolt 220, the connecting member 265 is advanced and stopped at a position displaced from the predetermined position, while compressing the spring 253. Therefore, it is possible to detect whether the tip end of the wrench 236 has been engaged with the clamp bolt 220 by detecting the position of the connecting member 265. An engaged-state detector 267 for detecting the axial relative position of a collar to be detected 265a provided on the connecting member 265 relative to the rotary shaft 252 is mounted to a stay 269 secured to an instrument support plate 268, as shown in FIG. 27. The instrument support plate 268 is secured to the support plate 255.

A rotation-number detector 270 is mounted to the instrument support plate 268 at a location corresponding to the idle gear 263, and detects a number of rotations of the wrench 236 in a reverse direction for bringing the cam clamp mechanism 218 into the unclamping state by detecting a plurality of, e.g., a pair of projections 271, 271 provided on a surface of the idle gear 263 adjacent the rotation-number detector 270.

A torque detector 272 is mounted in association with the nut runner 254 for detecting a rotational torque of the nut runner 254 in a normal direction for bringing the cam clamp mechanism 218 into the clamping state.

A deflection detector 275 is mounted to the instrument support plate 268 at a location adjacent to the exchanging position SC, and the deflection of a combination tool 52 newly mounted to the tip end of the spindle 47 in the exchanging position SC is detected by the deflection detector 275 by rotating the spindle 47 in a state in which the deflection detector 275 has been brought into contact with the outer periphery of the spindle 47.

Referring to FIG. 28, the spindle 47 is provided with a correcting means 277 capable of regulating the position of the combination tool 52 in a radial direction of the spindle 47. The operation of the correcting means 277 is controlled by an air pressure regulated by a correcting controller 278.

A detection value provided by the deflection detector 275 is input to a control means 276, which controls the operation of the correcting controller 278, i.e., the operation of the correcting means 277, based on the detection value provided by the deflection detector 275. In the controlling of the operation of the correcting means 277, when the amount of combination tool 52 deflected has exceeded a first preset range, predetermined times or more, the control means 276 operates the correcting means 277 to control the operation of the correcting controller 278 such that the position of the combination tool 52 in the radial direction of the spindle 47 is regulated.

The control means 276 is capable of also controlling the operations of the tool stocker 53, the tool mounting and removing unit 54, the spindle cleaning means 202 and the tool cleaning means 241. For example, when it has been detected by the deflection detector 275 that the amount of combination tool 52 has exceeded a second preset range larger than the first preset range, the control means 276 controls the operations of the tool stocker 53, the tool mounting and removing unit 54, the spindle cleaning means 202 and the tool cleaning means 241, so that the cleaning of the spindle 47 by the spindle cleaning means 202 and the cleaning of the combination tool 52 by the tool cleaning means 241 are carried out.

Further, the control means 276 controls the operations of the cylinder 251 and the nut runner 254 included in the tool mounting and removing unit 54, based on detection values provided by the engaged-state detector 267, the rotation-number detector 270 and the torque detector 272 to control the operation of the tool mounting and removing unit 54 for carrying out the mounting and removal of the combination tool 52 to and from the spindle 47.

The operation of the present embodiment will be described below. The positioning and retaining device 46 includes the first positioning means 65 capable of being switched over between the locking state in which it is put into abutment against the inner surface of the smaller-diameter bore 43 in the connecting rod 41 at the plurality of circumferential points to position the smaller end 41b, and the unlocking state in which the positioning of the smaller end 41b is released at the finishing treatment of the smaller-diameter bore 43, whereby the first positioning means 65 is retracted from the smaller-diameter bore 43, and the second positioning means 145 capable of being switched over between the locking state in which it is put into abutment against the inner surface of the larger-diameter bore 42 in the connecting rod 41 at the plurality of circumferential points to position the larger end 41a, and the unlocking state in which the positioning of the larger end 41a is released at the finishing treatment of the larger-diameter bore 42, whereby the second positioning means 145 is retracted from the larger-diameter bore 42. The first and second positioning means 65 and 145 are put into abutment against the inner surfaces of the smaller-diameter and larger-diameter bores 43 and 42 at the pluralities of points to position the smaller end 41b and the larger end 41a, respectively. Therefore, even if the connecting rod is an as-cast product, the larger end 41a and the smaller end 41b can be put into abutment against the reference support faces 62, 63, whereby the connecting rod 41 can be precisely positioned. Moreover, the positioning and retaining device 46 includes the clamp means 66 capable of urging the connecting rod 41 toward the reference support faces 62 and 63 to retain the connecting rod 41 on the retaining frame 55. Therefore, the connecting rod 41 precisely positioned by the first and second positioning means 65 and 145 can be retained on the retaining frame 55 by the clamp means 66.

The positioning and retaining device 46 also includes the natural lock means 67 capable of being switched over between the state in which the outer side of the larger end 41a is resiliently retained, while enabling the mounting and removal of the connecting rod 41 by the operator's power, and the state in which the outer side of the larger end 41a is fixedly retained. When the connecting rod 41 is positioned, larger end 41a can be resiliently retained by the natural lock means 67, thereby alleviating the operator's load. When the connecting rod 41 is being finished, the misalignment of the connecting rod 41 due to the application of a force caused by the finishing treatment can be prevented by the natural lock means 67.

Moreover, the reference support faces 62 and 63, the first positioning means 65, the clamp means 66 and the natural lock means 67 are provided on the side of the retaining frame 55 facing to the mounting and removing position SH and the side of the retaining frame 55 facing to the processing position SP in the arrangement symmetrical with respect to the horizontal rotational axis of the retaining frame 55. Therefore, in the mounting and removing position SH, the connecting rods 41 having the smaller ends 41b and the larger ends 41a put into abutment against the reference support faces 62 and 63 can be positioned in such a manner that the smaller ends 41b and the larger ends 41a are positioned by the firsthand second positioning means 65 and 145 in a state in which the larger ends 41a have been resiliently retained by the natural lock means 67 assuming the unlocking state. After completion of the positioning by the first and second positioning means 65 and 145, the connecting rods 41 can be fixedly retained on the retaining frame 55 by the clamp means 66. After retaining of the connecting rods 41 by the clamp means 66, the retaining frame 55 can be turned through 180 degrees by bringing the second positioning mean 145 into the unlocking states, thereby bringing the connecting rods 41 into the processing position SH.

On the other hand, in the processing position SP, the finishing treatment of the smaller-diameter bores 43 and the larger-diameter bores 42 can be carried out by bringing the first positioning means 65 into their unlocking states in a state in which the connecting rods 41 have been retained on the retaining frame by the clamp mans 66. Thus, the misalignment of the connecting rods 41 can be prevented by the natural lock means 67 from being caused by forces applied to the connecting rods 41 by the finishing treatment. Moreover, when the processing of the connecting rods 41 is being conducted in the processing position SP, the removal of the connecting rods 41 which have been processed from the retaining frame 55 and the positioning and retaining of new connecting rods 41 can be carried out, and the operator can mount and remove the connecting rods 41 easily without loss in time required for mounting and removal of the connecting rod 41 in a continuous processing cycle for the connecting rods 41. Thus, the equipment cost can be reduced by enabling the mounting and removing operation to be carried out by the operator.

The first positioning means 65 symmetrical with respect the rotational axis 64 can be driven by the common positioning drive means 77 in such manner that one of the first positioning means 65 in the mounting and removing position SH is brought into the locking state and the other first positioning means 65 in the processing position SP is brought into the unlocking state. The natural lock means 67 symmetrical with respect to the rotational axis 64 are driven by the common natural lock drive means 136 in such manner that one of the natural lock means 67 in the mounting and removing position SH is brought into the unlocking state and the other natural lock means 67 in the processing position SP is brought into the locking state. Therefore, it is possible to reduce the number of parts.

Further, the clamp means 66 includes the clamper 101 which is mounted at the one end of the clamp arm 100 carried on the retaining frame 55 for upward and downward movements about the axis parallel to the horizontal rotational axis of the retaining frame 55 and which is adapted to abut against the connecting rod 41. The clamp means 66 and the clamp-driving cylinder 102 connected to the other end of the clamp arm 100 to drive the clamp arm 101 upwards and downwards are mounted on the retaining frame 55 in the arrangement such that the damper 101 is located above the clamp-driving cylinder 102 in the mounting and removing position SH, and the damper 100 is located below the clamp-driving cylinder 102 in the processing position SP. Therefore, in the processing position SP, chips produced by the processing can be prevented to the utmost from being accumulated on the clamp arm 100 and the clamp-driving cylinder 101, whereby the arising of a trouble due to the chips can be inhibited.

The first positioning means 65 includes the plurality of steel balls 70 retained at the one end of the holder 60 inserted in the smaller-diameter bore 43 in the connecting rod 41, and the steel balls 70 are pushed up by the tapered face 71a included in the taper pin 71 axially relatively movably inserted into the holder 69, whereby they are brought into contact with the inner surface of the smaller-diameter bore 73. In such first positioning means 65, the guide member 68 is releasably fixed to the retaining frame 55 the holder 69 is connected at the other end thereof to the holder drive member 81 incapable of being turned about the axis of the smaller-diameter bore 43, so that it can be switched over between the connected state in which the axial movement of the holder 69 relative to the holder drive member 81 is inhibited, and the disconnected state in which the connected state is released by turning the holder 69 about the axis in the preset amount from the connected state relative to the holder drive member 81. The pin drive member 89 is provided to coaxially abut against the other end of the tapered pin 71.

Therefore, the guide member 68, the holder 69 whose axial reciprocal movement is guided by the guide member 68, the plurality of steel balls 70 retained on the holder 69, and the tapered pin 71 axially relatively movably inserted in the holder 69, are prepared as a single unit for every type of the connecting rod 41, whereby the unit can be exchanged easily and promptly with a new unit in accordance with the change in type of the connecting rod 41. Specifically, the connection and disconnection of the holder 69 to and from the holder drive member 81 can be switched over easily and promptly from one to another by turning the holder 69 about the axis in a state in which the fixing of the guide member 68 to the retaining frame 55 has been released. When the holder 69 is connected to the holder drive member 81, the connection and disconnection of the tapered pin 71 to and from the pin drive member 89 can be switched over easily and promptly from one to another in such a manner that the pin drive member 89 is put into coaxial abutment against the taper pin 71.

Moreover, the rotation-inhibiting means 76 is mounted between the guide member 68 and the holder 69 for inhibiting the rotation of the holder 69 connected to the holder drive member 81 about the axis. The connection between the holder drive member 81 and the holder 69 with the guide member 68 fixed to the retaining frame 55 can be maintained reliably by inhibiting the rotation of the holder 69 about the axis by the rotation-inhibiting means 76, and accordingly, the abutting connection between the pin drive member 89 and the tapered pin 71 can be maintained reliably.

In the processing position SP, the pair of connecting rods 41, 41 are supported on the retaining frame 55 side by side in the direction of the X-axis. The first movable table 175 can be moved in the direction of the X-axis, and the single spindle 47 included in the processing means 48 disposed on the first movable table 175 can be advanced and retracted axially. Moreover, the combination tool 52 mounted at the tip end of the spindle 47 is one which is formed into the stepped shape, so that it can finish either of the inner surfaces of the larger-diameter bore 42 and the smaller-diameter bore 43 in the connecting rod 41 by changing the position of insertion of the combination tool 52 into the larger-diameter bore 42 and the smaller-diameter bore 43. Therefore, the inner surfaces of the larger-diameter bores 42 and the smaller-diameter bores 43 provided in the connecting rods can be finished by the combination tool 52 mounted at the tip end of the spindle 47. When the type of the connecting rod 41 is changed, this change can be dealt with only by exchanging the combination tool 52 with a suitable combination tool 52.

The measuring means 51 can be advanced and retracted independently from the spindle 47 in the directions along the axes of the larger-diameter bore 42 and the smaller-diameter bore 43 in the position displaced in the direction of the X-axis from the spindle 47 on the first movable table 175. Therefore, when a certain connecting rod 41 is being subjected to the finishing treatment by the combination tool 52, the inside diameters of the finished larger-diameter and smaller-diameter bores 42 and 43 provided in another connecting rod 41 can be measured. Thus, as compared with the prior art in which the connecting rod 41 is transported to a measuring station by use of a large-sized loader, the time taken till the completion of the measurement can be shortened, and a reduction in equipment cost can be provided, because a large-sized loader is not required.

The tool stocker 53 includes the rotor 191 rotatable about the axis parallel to the axis of the spindle 47, the tool grasping means 201 which are disposed most of the plurality of points equally spaced apart from one another in the circumferential direction of the rotor 191, excluding the particular one point, and which are capable of releasably grasping the combination tools 52, the spindle cleaning means 202 disposed at the particular one point on the rotor 191 and capable of cleaning the tip end of the spindle 47, and the index motor 193 for driving the rotor 191 in such a manner that the tool grasping means 201 and the spindle cleaning means 202 can be alternatively brought into the exchanging position SC. Therefore, one of the plurality of combination tools 52 stocked in the tool stocker 53 can be selected and mounted at the tip end of the spindle 47 by moving the tip end of the spindle 47 to the exchanging position SC, and the combination tool 52 removed from the tip end of the spindle 47 can be newly stocked in the tool stocker 53. Moreover, when the tip end of the spindle 47 is stained, it can be cleaned automatically by bringing the spindle cleaning means 202 into the exchanging position SC. When the rear portion of the combination tool 52 is stained, it can be cleaned automatically by bringing the stained combination tool 52 to the position corresponding to the tool cleaning means 241.

The correcting means 277 capable of regulating the position of the combination tool 52 in the radial direction of the spindle 47 is provided on the spindle 47, and the removal of the combination tool 52 from the tip end of the spindle 47 in the exchanging position SC and the mounting of a new combination tool 52 to the tip end of the spindle 47 are carried out by the operation of the tool mounting and removing unit 54. The deflection of the combination tool 52 newly mounted at the tip end of the spindle 47 in the exchanging position SC is detected by the deflection detector 275. Moreover, the following means are mounted in association with the tool stocker 53: the tool cleaning means 241 capable of cleaning that portion of one of the combination tools 52 retained in the tool stocker 53, which is mounted to the spindle 47, and the spindle cleaning means 202 capable of cleaning the tip end of the spindle 47. The regulation of the position of the combination tool 52 by the correcting means 277 or the cleaning conducted by the tool cleaning means 241 and the spindle cleaning means 202 is carried out, based on the result of detection provided by the deflection detector 275 after exchange of the tool in the exchanging position SC.

Therefore, the combination tool 52 removed from the spindle 47 by the tool mounting and removing unit 54 in the state in which the spindle 47 has been moved to the exchanging position SC, can be retained in the tool stocker 53, and a new tool can be mounted at the tip end of the spindle 47 by the tool mounting and removing unit 54 in the state in which one of the combination tools 52 stocked in the tool stocker 53 has been brought into the exchanging position SC. Moreover, when it is determined that the combination tool 52 has been deflected largely to such an extent that it can be dealt with by the correction provided by the correcting means 277, as a result of detection of the deflection of the combination tool 52 by the deflection detector 275 after exchange of the combination tool 52, the correcting means 277 can be operated to regulate the position of the combination tool 52 in the radial direction of the spindle 47. When it is determined that the combination tool 52 has been deflected largely to such an extent that it is difficult to deal with it by the correction provided by the correcting means 277, it is determined that the incorporation of chips or the like has occurred. Therefore, the combination tool 52 is removed from the spindle 47, and that portion of the combination tool 52 which is mounted to the spindle 47 and the tip end of the spindle 47 are cleaned by the tool cleaning means 241 and the spindle cleaning means 202. Thereafter, a new combination tool 52 can be mounted with a good accuracy to the tip end of the spindle 47 by exchanging the combination tool 52 again. In this way, the automatic exchanging of the combination tool 52 is ensured, while confirming the accuracy of mounting of the combination-tool 52 to the tip end of the spindle 47 and hence, the combination tool 52 can be exchanged automatically, while avoiding a reduction in finishing accuracy.

The tool mounting and removing unit 54 includes the moving member 250 reciprocally movable in the direction perpendicular to the rotational axis of the spindle 47 in the exchanging position SC into which the cam clamp mechanism 218 of the spindle 47 can be brought, the cylinder 251 for reciprocally driving the moving member 250, the rotary shaft 252 carried in the moving member 250 for rotation about the axis perpendicular to the rotational axis of the spindle 47, the wrench 236 coaxially connected at its base end to the one end of the rotary shaft 252 against relative rotation about the axis of the rotary shaft and for relative movement in the limited region in the axial direction of the rotary shaft 252, the spring 253 mounted under compression between the base end of the wrench 236 and the one end of the rotary shaft 252, and the nut runner 254 capable of rotating the rotary shaft 252 in either of the normal and reverse directions irrespective of the moved position of the moving member 250. The tip end of the wrench 236 is capable of being brought into engagement with the clamp bolt 220 in the cam clamp mechanism 218 at the tip end of the spindle 47.

Moreover, it is detected by the engaged-state detector 267 in accordance with the axial relative positions of the rotary shaft 252 and the wrench 236 whether the tip end of the wrench 236 has been brought into engagement with the clamp bolt 220. The number of rotations of the wrench 236 in the reverse direction is detected by the rotation-number detector 270, and the output torque of the nut runner 254 in the normal direction is detected by the torque detector 272. Thus, the operations of the cylinder 251 and the nut runner 254 are controlled by the control means 276, based on the detection results provided by the engaged-state detector 267, the rotation-number detector 270 and the torque detector 272.

With such tool mounting and removing unit 54, to remove the combination tool 52 from the tip end of the spindle 47, the moving member 250 is first moved toward the cam clamp mechanism 218 by the action of the cylinder 251 in the state in which the cam clamp mechanism 218 at the tip end of the spindle 47 has been brought into the exchanging position SC. Then, the tip end of the wrench 236 is brought into engagement with the clamp bolt 220, and the nut runner 254 is operated in the reverse direction, whereby the cam clamp mechanism 218 can be brought into unclamping state. In this case, if the engagement of the tip end of the wrench 236 with the clamp bolt 220 has been failed, the axial relative positions of the rotary shaft 252 and the wrench 236 are changed, while compressing the spring 235. Therefore, the reliable engagement of the wrench 236 with the clamp bolt 220 can be confirmed. After the confirmation of the engagement of the wrench 236 with the clamp bolt 220, the cam clamp mechanism 218 can be brought into the unclamping state by operating the nut runner 254 in the reverse direction. When a predetermined number of rotations has been detected by the rotation-number detector 270, the operation of the nut runner 254 is stopped, and the moving member 250 is moved in a direction away from the cam clamp mechanism 218 by the action of the cylinder 251. This releases the engagement of the wrench 236 with the clamp bolt 220, whereby the wrench 236 is moved away from the cam clamp mechanism 218.

To newly mount the combination tool 52 to the tip end of the spindle 47, the moving member 250 is moved toward the cam clamp mechanism 218 which is in the exchanging position SC. The tip end of the wrench 236 is brought into engagement of the clamp bolt 220, and the engagement of the tip end of the wrench 236 with the clamp bolt 220 is detected by the engaged-state detector 270. Thereafter, the cam clamp mechanism 218 can be brought into the clamping state by operating the nut runner 254 in the normal direction. When a predetermined torque has been detected by the torque detector 272, the operation of the nut runner 254 is stopped, and the moving member 250 is moved in the direction away from the cam clamp mechanism 218 by the action of the cylinder 251. This releases the engagement of the wrench 236 with the clamp bolts 220, whereby the wrench 236 is moved away from the cam clamp mechanism 218.

As described above, it is possible to switch over between the clamping state and the unclamping state of the cam clamp mechanism 218 automatically, thereby enabling an automatic mounting and removing of the combination tool 52 to and from the tip end of the spindle 47.

Although the embodiments of the present invention have been described in detail, it will be understood that the present invention is not limited to the above-described embodiments, and various modifications in design may be made without departing from the spirit and scope of the invention defined in claims.

For example, the present invention can be carried out in a wide field in connection with not only the connection rod 41 but also a work provided with a plurality of bores to be finished, which have diameters different from one another and axes parallel to one another.

What is claimed is:

1. An apparatus for finishing an inside diameter of a work, in which inner surfaces of a plurality of bores to be finished, which are provided in the work and have diameters different from one another and axes parallel to one another, are subjected to a finishing treatment, and after completion of the finishing treatment, inside diameters of said bores are measured, said apparatus comprising:

a retaining frame for retaining a plurality of the works at distances from one another in a direction of an X-axis perpendicular to the axis of each of said bores to be finished;

a table movable in the direction of said X-axis;

a single spindle having a rotational axis parallel to the axis of each of said bores and disposed on said movable table for advancing and retracting movements in an axial direction corresponding to the axes of said bores;

a combination tool mounted at a tip end of said spindle and capable of performing the finishing treatment to the inner surfaces of said bores in accordance with a change in position of the tool inserted into each of said bores; and a measuring means insertable into each of said finished bores to measure an inside diameter of each of said finished bores, said measuring means being disposed on said movable table at a location displaced in the direction of the X-axis from said spindle, and capable of being advanced and retracted in a direction along the axis of each of said bores independently from said spindle;

a correcting means provided on said spindle and capable of regulating the position of said combination tool in a radial direction of said spindle;

a tool stocker in which a plurality of said combination tools are stocked in a manner that said plurality of combination tools can be alternatively brought into a previously established exchanging position to which said spindle can be moved and at which position a combination tool removed from the tip end of said spindle can be newly retained by the spindle;

a deflection detector for detecting a deflection of said combination tool newly mounted at the tip end of said spindle in said exchanging position;

a tool mounting and removing unit for carrying out the removal of said combination tool from the tip end of said spindle and the mounting of a new combination tool to the tip end of said spindle in said exchanging position;

a tool cleaning means equipped on said tool stocker and capable of cleaning that portion of one combination tool retained in said tool stocker, which is to be mounted to said spindle;

a spindle cleaning means equipped on said tool stocker and capable of cleaning the tip end of said spindle; and a control means for controlling the operations of said correcting means, said tool stocker, said tool mounting and removing unit, said tool cleaning means and said spindle cleaning means so as to regulate the position of the combination tool by said correcting means, based on a detection result provided by said deflection detector after the exchange of the tool in said exchanging position, or to carry out the cleaning by said tool cleaning means and said spindle cleaning means, wherein said spindle is provided at the tip end with a cam clamp mechanism which includes a clamp bolt rotatable about an axis perpendicular to the a rotational axis of said spindle and which is capable of being switched over between a clamping state of clamping said combination tool provided by rotating said clamp bolt in a forward direction, and an unclamping state of unclamping said combination tool provided by rotating said clamp bolt in a reverse direction, and said tool mounting and removing unit comprises:

a moving member reciprocally movable in a direction perpendicular to the rotational axis of said spindle in said exchanging position;

a moving member driving means for reciprocally moving said moving member;

a rotary shaft carried on said moving member for rotation about an axis perpendicular to the rotational axis of said spindle;

a wrench coaxially connected at a base end thereof to one end of said rotary shaft against relative rotation about the axis of said rotary shaft but for relative movement in a limited region in an axial direction of said rotary shaft, said wrench being capable of being brought into engagement with a tip end of said clamp bolt;

a spring mounted under compression between the base end of said wrench and the one end of said rotary shaft; and a rotary shaft driving means capable of rotating said rotary shaft in either of the forward and reverse directions irrespective of the moved position of said moving member, and wherein the operations of said moving member driving means and said rotary shaft driving means are controlled by said control means, based on detection results provided by an engaged-state detector for detecting whether a tip end of said wrench has been brought into engagement with said clamp bolt, in accordance with the axial relative positions of said rotary shaft and said wrench, a rotation-number detector for detecting a number of rotations of said wrench in the reverse direction and an output torque detector for detecting an output torque in the forward direction from said rotary shaft driving means.

2. An apparatus for finishing an inside diameter of a work according to claim 1, wherein said tool stocker comprises:

a rotor rotatable about an axis parallel to the axis of said spindle;

tool grasping means disposed at a plurality of points equally spaced from one another in a circumferential direction of said rotor, excluding one point at which said spindle cleaning means is disposed, each of said tool grasping means being capable of releasably grasping said combination tool; and a rotor driving means for driving said rotor to bring said tool grasping means and said spindle cleaning means alternatively into said exchanging position.

3. An apparatus for finishing an inside diameter of a work according to claim 1, further comprising:

a first positioning means capable of being switched over between a locking state in which said first positioning means is put into abutment against an inner surface of a smaller-diameter bore provided as a bore to be finished in a smaller end of a connecting rod as a work at a plurality of circumferential points of the smaller-diameter bore, thereby positioning said smaller end, and an unlocking state in which the positioning of said smaller end is released at the finishing treatment of the smaller-diameter bore, whereby said first positioning means is retracted from said smaller-diameter bore;

a second positioning means capable of being switched over between a locking state in which said second positioning means is put into abutment against an inner surface of a larger-diameter bore provided as a bore to be finished in a larger end of said connecting rod at a plurality of circumferential points of the larger-diameter bore, thereby positioning said larger end, and an unlocking state in which the positioning of said larger end is released at the finishing treatment of the larger-diameter bore, whereby said second positioning means is retracted from said larger-diameter bore; and a clamp means for urging said connecting rod, with said larger and smaller ends put into abutment against reference support faces, toward the reference support faces and retaining said connecting rod on said retaining frame.

4. An apparatus for finishing an inside diameter of a work according to claim 3, wherein said first positioning means comprises:

a guide member releasably fixed to said retaining frame and having a reference support face against which the smaller end of said connecting rod is put into abutment;

a holder which is formed into a cylindrical shape, so that one end thereof can be coaxially inserted and removed into and out of said smaller-diameter bore, and whose axial movement is guided by said guide member;

a plurality of steel balls retained at one end of said holder for movement in a radial direction of said holder;

a tapered pin which has, at one end thereof, a tapered face for pushing up said steel balls radially outwards to put said steel balls against the inner surface of said smaller-diameter bore at a plurality of points, said tapered pin being axially relatively movably and coaxially inserted into said holder; and a rotation-inhibiting means provided between said guide member and said holder to inhibit the rotation of said holder about an axis, said holder being connected at the other end thereof to a holder drive member provided on said retaining frame for axial reciprocal movement in a direction along the axis of said smaller-diameter bore and against rotation about the axis of said smaller-diameter bore, so that said holder can be switched over between a connected state in which the axial movement of said holder relative to said holder drive member is inhibited, and a disconnected state in which said connected state is released by rotating said holder in a predetermined amount from said connected state about the axis relative to said holder drive member, said retaining frame having a pin drive member provided thereon for axial reciprocal movement in a direction along the axis of said smaller-diameter bore and connected to the other end of said tapered pin to coaxially abut against the other end of said tapered pin.

5. An apparatus for finishing an inside diameter of a work according to claim 3, further including a natural lock means for locking capable of being switched over between a state in which an outer side of either one of said larger and smaller ends is resiliently retained, so that said connecting rod can be released by a human power, and a state in which an outer side of either one of said larger and smaller ends is fixedly retained.

6. An apparatus for finishing an inside diameter of a work according to claim 5, wherein a mounting and removing position for carrying out the mounting and removal of said connecting rod and a processing position for carrying out the finishing treatment of said larger-diameter and smaller-diameter bores are established on opposite sides of said retaining frame which is rotatable through every 180 degrees about a horizontal rotational axis; a pair of said reference support faces against which said larger and smaller ends can be brought into abutment, a pair of said first positioning means, a pair of said clamp means and a pair of said natural lock means are disposed symmetrically with respect to said horizontal rotational axis on a side of said retaining frame facing said mounting and removing position and on a side of said retaining frame facing said processing position; a pair of said second positioning means are disposed in the mounting-removing position; and said retaining frame is provided with a positioning drive means for commonly driving both of said first positioning means symmetrically with respect to the horizontal rotational axis in such a manner that one of said first positioning means in said mounting and removing position is brought into the locking state and the other first positioning means in said processing position is brought into the unlocking state, and a natural lock driving means for commonly driving both of said natural lock means symmetrically with respect to said horizontal rotational axis in such a manner that one of said natural lock means in said mounting-removing position is brought into the unlocking state and the other natural lock means in said processing position is brought into the locking state.

7. An apparatus for finishing an inside diameter of a work according to claim 6, wherein one of said clamp means comprises:

a clamper provided at one end of a clamp arm carried on said retaining frame for pivotal movement in first and second directions about an axis parallel to said horizontal rotational axis of said retaining frame, said damper abutting against said connecting rod; and a clamp driving cylinder connected to the other end of said clamp arm to drive said clamp arm pivotally in said first and second directions about the axis parallel to said horizontal rotational axis of said retaining frame, wherein said clamp means and said clamp driving cylinder are mounted on said retaining frame such that said damper is located above said clamp driving cylinder in said mounting and removing position and below said clamp driving cylinder in said processing position.

8. An apparatus for finishing an inside diameter of a work, in which inner surfaces of a plurality of bores to be finished, which are provided in the work and have diameters different from one another and axes parallel to one another, are subjected to a finishing treatment, and after completion of the finishing treatment, inside diameters of said bores are measured, said apparatus comprising;

a retaining frame for retaining a plurality of the works at distances from one another in a direction of an X-axis perpendicular to the axis of each of said bores to be finished;

a table movable in the direction of said X-axis;

a single spindle having an axis parallel to the axis of each of said bores and disposed on said movable table for advancing and retracting movements in an axial direction corresponding to the axes of said bores;

a combination tool mounted at a tip end of said spindle and capable of performing the finishing treatment to the inner surfaces of said bores in accordance with a change in position of the tool inserted into each of said bores;

a measuring means insertable into each of said finished bores to measure an inside diameter of each of said finished bores, said measuring means being disposed on said movable table at a location displaced in the direction of the X-axis from said spindle, and capable of being advanced and retracted in a direction along the axis of each of said bores independently from said spindle;

a first positioning means capable of being switched over between a locking state in which said first positioning means is put into abutment against an inner surface of a smaller-diameter bore provided as a bore to be finished in a smaller end of a connecting rod as a work at a plurality of circumferential points of the smaller-diameter bore, thereby positioning said smaller end, and an unlocking state in which the positioning of said smaller end is released at the finishing treatment of the smaller-diameter bore, whereby said first positioning means is retracted from said smaller-diameter bore;

a second positioning means capable of being switched over between a locking state in which said second positioning means is put into abutment against an inner surface of a larger-diameter bore provided as a bore to be finished in a larger end of said connecting rod at a plurality of circumferential points of the larger-diameter bore, thereby positioning said larger end, and an unlocking state in which the positioning of said larger end is released at the finishing treatment of the larger-diameter bore, whereby said second positioning means is retracted from said larger-diameter bore; and a clamp means for urging said connecting rod, with said larger and smaller ends put into abutment against reference support faces, toward the reference support faces and retaining said connecting rod on said retaining frame, wherein said first positioning means comprises:
  a guide member releasably fixed to said retaining frame and having a reference support face against which the smaller end of said connecting rod is put into abutment;
  a holder which is formed into a cylindrical shape, so that one end thereof can be coaxially inserted and removed into and out of said smaller-diameter bore, and whose axial movement is guided by said guide member;
  a plurality of steel balls retained at one end of said holder for movement in a radial direction of said holder;
  a tapered pin which has, at one end thereof, a tapered face for pushing up said steel balls radially outwards to put said steel balls against the inner surface of said smaller-diameter bore at a plurality of points, said tapered pin being axially relatively movably and coaxially inserted into said holder; and
  a rotation-inhibiting means provided between said guide member and said holder to inhibit the rotation of said holder about an axis, said holder being connected at the other end thereof to a holder drive member provided on said retaining frame for axial reciprocal movement in a direction along the axis of said smaller-diameter bore and against rotation about the axis of said smaller-diameter bore, so that said holder can be switched over between a connected state in which the axial movement of said holder relative to said holder drive member is inhibited, and a disconnected state in which said connected state Breveted by rotating said holder in a predetermined amount from said connected state about the axis relative to said holder drive member, said retaining frame having a pin drive member provided thereon for axial reciprocal movement in a direction along the axis of said smaller-diameter bore and connected to the other end of said tapered pin to coaxially abut against the other end of said tapered pin.

9. An apparatus for finishing an inside diameter of a work according to claim 8, further comprising:
  a correcting means provided on said spindle and capable of regulating the position of said combination tool in a radial direction of said spindle;
  a tool stocker in which a plurality of said combination tools are stocked in ad manner that said plurality of combination tools can be alternatively brought into a previously established exchanging position to which said spindle can be moved and at which position a combination tool removed from the tip end of said spindle can be newly retained by the spindle;
  a deflection detector for detecting a deflection of said combination tool newly mounted at the tip end of said spindle in said exchanging position;
  a tool mounting and removing unit for carrying out the removal of said combination tool from the tip end of said spindle and the mounting of a new combination tool to the tip end of said spindle in said exchanging position;
  a tool cleaning means equipped on said tool stocker and capable of cleaning that portion of one combination tool retained in said tool stocker, which is to be mounted to said spindle;
  a spindle cleaning means equipped on said tool stocker and capable of cleaning the tip end of said spindle; and
  a control means for controlling the operations of said correcting means, said tool stocker, said tool mounting and removing unit, said tool cleaning means and said spindle cleaning means so as to regulate the position of the combination tool by said correcting means, based on a detection result provided by said deflection detector after the exchange of the tool in said exchanging position, or to carry out the cleaning by said tool cleaning means and said spindle cleaning means.

10. An apparatus for finishing an inside diameter of a work according to claim 9, wherein said tool stocker comprises:
  a rotor rotatable about an axis parallel to the axis of said spindle;
  tool grasping means disposed at a plurality of points equally spaced from one another in a circumferential direction of said rotor, excluding one point at which said spindle cleaning means is disposed, each of said tool grasping means being capable of releasably grasping said combination tool; and
  a rotor driving means for driving said rotor to bring said tool grasping means and said spindle cleaning means alternatively into said exchanging position.

11. An apparatus for finishing an inside diameter of a work according to claim 9, wherein
  said spindle is provided at the tip end with a cam clamp mechanism which includes a clamp bolt rotatable about an axis perpendicular to a rotational axis of said spindle and which is capable of being switched over between a clamping state of clamping said combination tool provided by rotating said clamp bolt in a forward direction, and an unclamping state of unclamping said combination tool provided by rotating said clamp bolt in a reverse direction, and said tool mounting and removing unit comprises:
a moving member reciprocally movable in a direction perpendicular to the rotational axis of said spindle in said exchanging position;
a moving member driving means for reciprocally moving said moving member;
a rotary shaft carried on said moving member for rotation about an axis perpendicular to the rotational axis of said spindle;
a wrench coaxially connected at a base end thereof to one end of said rotary shaft against relative rotation about the axis of said rotary shaft but for relative movement in a limited region in an axial direction of said rotary shaft, said wrench being capable of being brought into engagement with a tip end of said clamp bolt;
a spring mounted under compression between the base end of said wrench and the one end of said rotary shaft; and
a rotary shaft driving means capable of rotating said rotary shaft in either of the forward and reverse directions irrespective of the moved position of said moving member, and
wherein the operations of said moving member driving means and said rotary shaft driving means are controlled by said control means, based on detection results provided by an engaged-state detector for detecting whether a tip end of said wrench has been brought into engagement with said clamp bolt, in accordance with the axial relative positions of said rotary shaft and said wrench, a rotation-number detector for detecting a number of rotations of said wrench in the reverse direction and an output torque detector for detecting an output torque in the forward direction from said rotary shaft driving means.

12. An apparatus for finishing an inside diameter of a work according to claim 8, further including a natural lock means for locking capable of being switched over between a state in which an outer side of either one of said larger and smaller ends is resiliently retained, so that said connecting rod can be released by a human power, and a state in which an outer side of either one of said larger and smaller ends is fixedly retained.

13. An apparatus for finishing an inside diameter of a work according to claim 12, wherein a mounting and removing position for carrying out the mounting and removal of said connecting rod and a processing position for carrying out the finishing treatment of said larger-diameter and smaller-diameter bores are established on opposite sides of said retaining frame which is rotatable through every 180 degrees about a horizontal rotational axis; a pair of said reference support faces against which said larger and smaller ends can be brought into abutment, a pair of said first positioning means, a pair of said clamp means and a pair of said natural lock means are disposed symmetrically with respect to said horizontal rotational axis on a side of said retaining frame facing said mounting and removing position and on a side of said retaining frame facing said processing position; a pair of said second positioning means are disposed in the mounting-removing position; and said retaining frame is provided with a positioning drive means for commonly driving both of said first positioning means symmetrically with respect to the horizontal rotational axis in such a manner that one of said first positioning means in said mounting and removing position is brought into the locking state and the other first positioning means in said processing position is brought into the unlocking state, and a natural lock driving means for commonly driving both of said natural lock means symmetrically with respect to said horizontal rotational axis in such a manner that one of said natural lock means in said mounting-removing position is brought into the unlocking state and the other natural lock means in said processing position is brought into the locking state.

14. An apparatus for finishing an inside diameter of a work according to claim 13, wherein one of said clamp means comprises:
a damper provided at one end of a clamp arm carried on said retaining frame for pivotal movement in first and second directions about an axis parallel to said horizontal rotational axis of said retaining frame, said damper abutting against said connecting rod; and
a clamp driving cylinder connected to the other end of said clamp arm to drive said clamp arm pivotally in said first and second directions about the axis parallel to said horizontal rotational axis of said retaining frame,
wherein said clamp means and said clamp driving cylinder are mounted on said retaining frame such that said damper is located above said clamp driving cylinder in said mounting and removing position and below said clamp driving cylinder in said processing position.

15. An apparatus for finishing an inside diameter of a work, in which inner surfaces of a plurality of bores to be finished, which are provided in the work and have diameters different from one another and axes parallel to one another, are subjected to a finishing treatment, and after completion of the finishing treatment, inside diameters of said bores are measured, said apparatus comprising;
a retaining frame for retaining a plurality of the works at distances from one another in a direction of an X-axis perpendicular to the axis of each of said bores to be finished;
a table movable in the direction of said X-axis;
a single spindle having an axis parallel to the axis of each of said bores and disposed on said movable table for advancing and retracting movements in an axial direction corresponding to the axes of said bores;
a combination tool mounted at a tip end of said spindle and capable of performing the finishing treatment to the inner surfaces of said bores in accordance with a change in position of the tool inserted into each of said bores;
a measuring means insertable into each of said finished bores to measure an inside diameter of each of said finished bores, said measuring means being disposed on said movable table at a location displaced in the direction of the X-axis from said spindle, and capable of being advanced and retracted in a direction along the axis of each of said bores independently from said spindle;
a first positioning means capable of being switched over between a locking state, in which said first positioning means is put into abutment against an inner surface of a smaller-diameter bore provided as a bore to be finished in a smaller end of a connecting rod as a work at a plurality of circumferential points of the smaller-diameter bore, thereby positioning said smaller end, and an unlocking state in which the positioning of said smaller end is released at the finishing treatment of the smaller-diameter bore, whereby said first positioning means is retracted from said smaller-diameter bore;
a second positioning means capable of being switched over between a locking state in which said second positioning means is put into abutment against an inner surface of a larger-diameter bore provided as a bore to be finished in a larger end of said connecting rod at a plurality of circumferential points of the larger-diameter bore, thereby positioning said larger end, and an unlocking state in which the positioning of said larger end is released at the finishing treatment of the larger-diameter bore, whereby said second positioning means is retracted from said larger-diameter bore;

a clamp means for urging said connecting rod, with said larger and smaller ends put into abutment against reference support faces, toward the reference support faces and retaining said connecting rod on said retaining frame; and a natural lock means for locking capable of being switched over between a state in which an outer side of either one of said larger and smaller ends is resiliently retained, so that said connecting rod can be released by a human power, and a state in which an outer side of either one of said larger and smaller ends is fixedly retained, wherein a mounting and removing position for carrying out the mounting and removal of said connecting rod and a processing position for carrying out the finishing treatment of said larger-diameter and smaller-diameter bores are established on opposite sides of said retaining frame which is rotatable through every 180 degrees about a horizontal rotational axis; a pair of said reference support faces against which said larger and smaller ends can be brought into abutment, a pair of said first positioning means, a pair of said clamp means and a pair of said natural lock means are disposed symmetrically with respect to said horizontal rotational axis on a side of said retaining frame facing said mounting and removing position and on a side of said retaining frame facing said processing position; a pair of said second positioning means are disposed in the mounting-removing position; and said retaining frame is provided with a positioning drive means for commonly driving both of said first positioning means symmetrically with respect to the rotational axis in such a manner that one of said first positioning means in said mounting and removing position is brought into the locking state and the other first positioning means in said processing position is brought into the unlocking state, and a natural lock driving means for commonly driving both of said natural lock means symmetrically with respect to said rotational axis in such a manner that one of said natural lock means in said mounting-removing position is brought into the unlocking state and the other natural lock means in said processing position is brought into the locking state.

16. An apparatus for finishing an inside diameter of a work according to claim 15, further comprising:

a correcting means provided on said spindle and capable of regulating the position of said combination tool in a radial direction of said spindle;

a tool stocker in which a plurality of said combination tools are stocked in a manner that said plurality of combination tools can be alternatively brought into a previously established exchanging position to which said spindle can be moved and at which position a combination tool removed from the tip end of said spindle can be newly retained by the spindle;

a deflection detector for detecting a deflection of said combination tool newly mounted at the tip end of said spindle in said exchanging position;

a tool mounting and removing unit for carrying out the removal of said combination tool from the tip end of said spindle and the mounting of a new combination tool to the tip end of said spindle in said exchanging position;

a tool cleaning means equipped on said tool stocker and capable of cleaning that portion of one combination tool retained in said tool stocker, which is to be mounted to said spindle;

a spindle cleaning means equipped on said tool stocker and capable of cleaning the tip end of said spindle; and a control means for controlling the operations of said correcting means, said tool stocker, said tool mounting and removing unit, said tool cleaning means and said spindle cleaning means so as to regulate the position of the combination tool by said correcting means, based on a detection result provided by said deflection detector after the exchange of the tool in said exchanging position, or to carry out the cleaning by said tool cleaning means and said spindle cleaning means.

17. An apparatus for finishing an inside diameter of a work according to claim 16, wherein said tool stocker comprises:

a rotor rotatable about an axis parallel to the axis of said spindle;

tool grasping means disposed at a plurality of points equally spaced from one another in a circumferential direction of said rotor, excluding one point at which said spindle cleaning means is disposed, each of said tool grasping means being capable of releasably grasping said combination tool; and a rotor driving means for driving said rotor to bring said tool grasping means and said spindle cleaning means alternatively into said exchanging position.

18. An apparatus for finishing an inside diameter of a work according to claim 16, wherein said spindle is provided at the tip end with a cam clamp mechanism which includes a clamp bolt rotatable about an axis perpendicular to a rotational axis of said spindle and which is capable of being switched over between a clamping state of clamping said combination tool provided by rotating said clamp bolt in a forward direction, and an unclamping state of unclamping said combination tool provided by rotating said clamp bolt in a reverse direction, and said tool mounting and removing unit comprises:

a moving member reciprocally movable in a direction perpendicular to the rotational axis of said spindle in said exchanging position;

a moving member driving means for reciprocally moving said moving member;

a rotary shaft carried on said moving member for rotation about an axis perpendicular to the rotational axis of said spindle;

a wrench coaxially connected at a base end thereof to one end of said rotary shaft against relative rotation about the axis of said rotary shaft but for relative movement in a limited region in an axial direction of said rotary shaft, said wrench being capable of being brought into engagement with a tip end of said clamp bolt;

a spring mounted under compression between the base end of said wrench and the one end of said rotary shaft; and a rotary shaft driving means capable of rotating said rotary shaft in either of the forward and reverse directions irrespective of the moved position of said moving member, and wherein the operations of said moving member driving means and said rotary shaft driving means are controlled by said control means, based on detection results provided by an engaged-state detector for detecting whether a tip end of said wrench has been brought into engagement with said clamp bolt, in accordance with the axial relative positions of said rotary shaft and said wrench, a rotation-number detector for detecting a number of rotations of said wrench in the reverse direction and an output torque detector for detecting an output torque in the forward direction from said rotary shaft driving means.

19. An apparatus for finishing an inside diameter of a work according to claim 15, wherein said first positioning means comprises:

a guide member releasably fixed to said retaining frame and having a reference support face against which the smaller end of said connecting rod is put into abutment;

a holder which is formed into a cylindrical shape, so that one end thereof can be coaxially inserted and removed into and out of said smaller-diameter bore, and whose axial movement is guided by said guide member;

a plurality of steel balls retained at one end of said holder for movement in a radial direction of said holder;

a tapered pin which has, at one end thereof, a tapered face for pushing up said steel balls radially outwards to put said steel balls against the inner surface of said smaller-diameter bore at a plurality of points, said tapered pin being axially relatively movably and coaxially inserted into said holder; and a rotation-inhibiting means provided between said guide member and said holder to inhibit the rotation of said holder about an axis, said holder being connected at the other end thereof to a holder drive member provided on said retaining frame for axial reciprocal movement in a direction along the axis of said smaller-diameter bore and against rotation about the axis of said smaller-diameter bore, so that said holder can be switched over between a connected state in which the axial movement of said holder relative to said holder drive member is inhibited, and a disconnected state in which said connected state is released by rotating said holder in a predetermined amount from said connected state about the axis relative to said holder drive member, said retaining frame having a pin drive member provided thereon for axial reciprocal movement in a direction along the axis of said smaller-diameter bore and connected to the other end of said tapered pin to coaxially abut against the other end of said tapered pin.

20. An apparatus for finishing an inside diameter of a work according to claim 15, wherein one of said clamp means comprises:

a damper provided at one end of a clamp arm carried on said retaining frame for pivotal movement in first and second directions about an axis parallel to said horizontal rotational axis of said retaining frame, said damper abutting against said connecting rod; and a clamp driving cylinder connected to the other end of said clamp arm to drive said clamp arm pivotally in said first and second directions about the axis parallel to said horizontal rotational axis of said retaining frame, wherein said clamp means and said clamp driving cylinder are mounted on said retaining frame such that said damper is located above said clamp driving cylinder in said mounting and removing position and below said clamp driving cylinder in said processing position.

* * * * *